US008819726B2

(12) United States Patent
Wetzer et al.

(10) Patent No.: US 8,819,726 B2
(45) Date of Patent: Aug. 26, 2014

(54) METHODS, APPARATUS, AND SYSTEMS FOR PRESENTING TELEVISION PROGRAMMING AND RELATED INFORMATION

(75) Inventors: Michael Wetzer, Fayetteville, NY (US); Thomas Theriault, Baldwinsville, NY (US); Mark Dingman, Tully, NY (US)

(73) Assignee: Cyandia, Inc., Syracuse, NY (US)

(*) Notice: Subject to any disclaimer, the term of this patent is extended or adjusted under 35 U.S.C. 154(b) by 66 days.

(21) Appl. No.: 13/273,894

(22) Filed: Oct. 14, 2011

(65) Prior Publication Data
US 2012/0144416 A1    Jun. 7, 2012

Related U.S. Application Data

(60) Provisional application No. 61/393,307, filed on Oct. 14, 2010, provisional application No. 61/435,976, filed on Jan. 25, 2011, provisional application No. 61/474,942, filed on Apr. 13, 2011, provisional application No. 61/476,961, filed on Apr. 19, 2011.

(51) Int. Cl.
*H04N 7/10* (2006.01)
*H04N 7/025* (2006.01)

(52) U.S. Cl.
USPC ........ 725/32; 725/9; 725/35; 725/42; 725/80; 725/133; 725/141; 725/153; 705/14.27; 705/14.49; 705/26.81

(58) Field of Classification Search
None
See application file for complete search history.

(56) References Cited

U.S. PATENT DOCUMENTS

| | | | |
|---|---|---|---|
| 5,742,286 A | | 4/1998 | Kung et al. |
| 5,960,411 A | * | 9/1999 | Hartman et al. ........... 705/26.81 |
| 6,189,008 B1 | | 2/2001 | Easty et al. |
| 6,219,045 B1 | | 4/2001 | Leahy et al. |
| 6,259,448 B1 | | 7/2001 | McNally et al. |
| 6,396,513 B1 | | 5/2002 | Helfman et al. |
| 6,658,432 B1 | | 12/2003 | Alavi et al. |
| 6,671,715 B1 | | 12/2003 | Langseth et al. |
| 6,694,316 B1 | | 2/2004 | Langseth et al. |
| 6,724,403 B1 | | 4/2004 | Santoro et al. |
| 6,741,980 B1 | | 5/2004 | Langseth et al. |
| 6,807,675 B1 | * | 10/2004 | Maillard et al. ................ 725/35 |
| 7,028,264 B2 | | 4/2006 | Santoro et al. |

(Continued)

FOREIGN PATENT DOCUMENTS

| | | |
|---|---|---|
| EP | 2 304 584 | 4/2011 |
| JP | 06-062142 | 4/1994 |
| JP | 2006-053799 | 2/2006 |
| WO | WO-2004/066105 | 8/2004 |

OTHER PUBLICATIONS

Extended European Search Report for EP Application No. 09747470. 4, dated Oct. 12, 2011, 6 pages.

(Continued)

*Primary Examiner* — Joshua Taylor
(74) *Attorney, Agent, or Firm* — Foley & Lardner LLP

(57) ABSTRACT

Methods and apparatus for providing advertising information on a second user viewing device relating to a media program viewed on a first user viewing device. Upon determining that the media program is being presented via the first user viewing device, an ad programming signal is transmitted to the second user viewing device so as to present on the second user viewing device at least one first advertisement relating to content of the media program.

37 Claims, 61 Drawing Sheets

(56) References Cited

U.S. PATENT DOCUMENTS

| | | | |
|---|---|---|---|
| 7,136,871 B2 | 11/2006 | Ozer et al. | |
| 7,181,417 B1 | 2/2007 | Langseth et al. | |
| 7,375,678 B2 | 5/2008 | Feyereisen et al. | |
| 7,376,907 B2 | 5/2008 | Santoro et al. | |
| 7,478,337 B2 | 1/2009 | Kodosky et al. | |
| 7,546,276 B2 | 6/2009 | Randle et al. | |
| 7,564,469 B2 | 7/2009 | Cohen | |
| 7,607,150 B1 | 10/2009 | Kobayashi et al. | |
| 7,627,860 B2 | 12/2009 | Kodosky et al. | |
| 7,681,230 B2 | 3/2010 | O'Brien | |
| 7,711,475 B1* | 5/2010 | Cona et al. | 701/415 |
| 7,793,232 B2 | 9/2010 | Chaudhri et al. | |
| 7,849,226 B2 | 12/2010 | Zigmond et al. | |
| 7,873,371 B2 | 1/2011 | Oberg et al. | |
| 7,933,632 B2 | 4/2011 | Flynt et al. | |
| 7,979,854 B1 | 7/2011 | Borole et al. | |
| 7,996,862 B2 | 8/2011 | Babu | |
| 8,001,379 B2 | 8/2011 | Daskalopoulos et al. | |
| 8,028,237 B2 | 9/2011 | Schmitt | |
| 8,051,472 B2 | 11/2011 | Maes | |
| 8,086,853 B2 | 12/2011 | Warwick | |
| 8,185,819 B2 | 5/2012 | Sah et al. | |
| 8,185,830 B2 | 5/2012 | Saha et al. | |
| 8,276,196 B1 | 9/2012 | Shipley | |
| 8,302,012 B2 | 10/2012 | Schmitt | |
| 2002/0116256 A1* | 8/2002 | De Rafael et al. | 705/14 |
| 2002/0122063 A1 | 9/2002 | Weinberg et al. | |
| 2002/0152117 A1 | 10/2002 | Cristofalo et al. | |
| 2003/0018967 A1 | 1/2003 | Gorbatov et al. | |
| 2003/0018972 A1 | 1/2003 | Arora | |
| 2003/0035010 A1 | 2/2003 | Kodosky et al. | |
| 2003/0058277 A1 | 3/2003 | Bowman-Amuah | |
| 2003/0084436 A1 | 5/2003 | Berger et al. | |
| 2003/0184595 A1 | 10/2003 | Kodosky et al. | |
| 2004/0003247 A1 | 1/2004 | Fraser et al. | |
| 2004/0015367 A1 | 1/2004 | Nicastro et al. | |
| 2004/0025174 A1* | 2/2004 | Cerrato | 725/9 |
| 2004/0082345 A1 | 4/2004 | Lueckhoff | |
| 2004/0148184 A1 | 7/2004 | Sadiq | |
| 2005/0027676 A1 | 2/2005 | Eichstaedt et al. | |
| 2005/0086612 A1 | 4/2005 | Gettman et al. | |
| 2005/0114881 A1 | 5/2005 | Philyaw et al. | |
| 2005/0137981 A1 | 6/2005 | Maes | |
| 2005/0172018 A1 | 8/2005 | Devine et al. | |
| 2005/0203771 A1 | 9/2005 | Achan | |
| 2005/0246415 A1 | 11/2005 | Belfiore et al. | |
| 2005/0278741 A1 | 12/2005 | Robarts et al. | |
| 2006/0015818 A1 | 1/2006 | Chaudhri et al. | |
| 2006/0027953 A1 | 2/2006 | Nakashima | |
| 2006/0061580 A1 | 3/2006 | Fujiwara et al. | |
| 2006/0271953 A1 | 11/2006 | Jacoby et al. | |
| 2006/0271959 A1 | 11/2006 | Jacoby et al. | |
| 2006/0271960 A1 | 11/2006 | Jacoby et al. | |
| 2006/0271961 A1 | 11/2006 | Jacoby et al. | |
| 2006/0271997 A1 | 11/2006 | Jacoby et al. | |
| 2006/0277469 A1 | 12/2006 | Chaudhri et al. | |
| 2006/0282312 A1 | 12/2006 | Carlson et al. | |
| 2007/0018887 A1 | 1/2007 | Feyereisen et al. | |
| 2007/0082707 A1 | 4/2007 | Flynt et al. | |
| 2007/0083616 A1 | 4/2007 | Madden | |
| 2007/0083911 A1 | 4/2007 | Madden et al. | |
| 2007/0088952 A1 | 4/2007 | Hewitt et al. | |
| 2007/0101291 A1 | 5/2007 | Forstall et al. | |
| 2007/0101297 A1 | 5/2007 | Forstall et al. | |
| 2007/0101368 A1 | 5/2007 | Jacoby et al. | |
| 2007/0101433 A1 | 5/2007 | Louch et al. | |
| 2007/0118813 A1 | 5/2007 | Forstall et al. | |
| 2007/0124663 A1 | 5/2007 | Fischer et al. | |
| 2007/0130541 A1 | 6/2007 | Louch et al. | |
| 2007/0162850 A1 | 7/2007 | Adler et al. | |
| 2007/0186103 A1 | 8/2007 | Randle et al. | |
| 2007/0189737 A1 | 8/2007 | Chaudhri et al. | |
| 2007/0192823 A1 | 8/2007 | Andersen et al. | |
| 2007/0223462 A1 | 9/2007 | Hite et al. | |
| 2007/0266400 A1* | 11/2007 | Rogers et al. | 725/42 |
| 2008/0005798 A1 | 1/2008 | Ross | |
| 2008/0028338 A1 | 1/2008 | Kodosky et al. | |
| 2008/0034309 A1 | 2/2008 | Louch et al. | |
| 2008/0034314 A1 | 2/2008 | Louch et al. | |
| 2008/0066011 A1 | 3/2008 | Urrabazo et al. | |
| 2008/0104513 A1 | 5/2008 | Krogh | |
| 2008/0111818 A1 | 5/2008 | Stambaugh | |
| 2008/0120327 A1 | 5/2008 | Bhat | |
| 2008/0126989 A1 | 5/2008 | Flores et al. | |
| 2008/0129725 A1 | 6/2008 | Stambaugh | |
| 2008/0134256 A1* | 6/2008 | DaCosta | 725/62 |
| 2008/0141170 A1 | 6/2008 | Kodosky et al. | |
| 2008/0141174 A1 | 6/2008 | Kodosky et al. | |
| 2008/0150963 A1 | 6/2008 | Stambaugh | |
| 2008/0168185 A1 | 7/2008 | Robbin et al. | |
| 2008/0168245 A1 | 7/2008 | De Atley et al. | |
| 2008/0168391 A1 | 7/2008 | Robbin et al. | |
| 2008/0168526 A1 | 7/2008 | Robbin et al. | |
| 2008/0172173 A1 | 7/2008 | Chang et al. | |
| 2008/0172625 A1 | 7/2008 | Montgomery | |
| 2008/0172632 A1 | 7/2008 | Stambaugh | |
| 2008/0207327 A1 | 8/2008 | Van Luchene et al. | |
| 2008/0235601 A1 | 9/2008 | Fried et al. | |
| 2008/0256643 A1 | 10/2008 | Jones et al. | |
| 2008/0319828 A1* | 12/2008 | Southam et al. | 705/10 |
| 2009/0013263 A1 | 1/2009 | Fortnow et al. | |
| 2009/0018712 A1 | 1/2009 | Duncan et al. | |
| 2009/0025025 A1 | 1/2009 | Vleck et al. | |
| 2009/0091578 A1 | 4/2009 | Carnahan et al. | |
| 2009/0094118 A1* | 4/2009 | Antonucci et al. | 705/14 |
| 2009/0113481 A1 | 4/2009 | Friedman | |
| 2009/0132942 A1 | 5/2009 | Santoro et al. | |
| 2009/0231128 A1 | 9/2009 | Watson et al. | |
| 2009/0233542 A1* | 9/2009 | Gratton et al. | 455/3.06 |
| 2009/0249069 A1 | 10/2009 | Daskalopoulos et al. | |
| 2009/0254842 A1 | 10/2009 | Leacock et al. | |
| 2009/0259972 A1 | 10/2009 | Kodosky et al. | |
| 2009/0287914 A1 | 11/2009 | Shah et al. | |
| 2009/0288131 A1 | 11/2009 | Kandekar et al. | |
| 2009/0298535 A1* | 12/2009 | Klein et al. | 455/556.1 |
| 2009/0313578 A1 | 12/2009 | Roh et al. | |
| 2009/0315807 A1* | 12/2009 | Hsu | 345/1.3 |
| 2010/0017722 A1 | 1/2010 | Cohen | |
| 2010/0023398 A1* | 1/2010 | Brown et al. | 705/14.49 |
| 2010/0031334 A1 | 2/2010 | Shaikh | |
| 2010/0057907 A1 | 3/2010 | Ross et al. | |
| 2010/0058188 A1 | 3/2010 | Shah et al. | |
| 2010/0080298 A1 | 4/2010 | Hang et al. | |
| 2010/0083189 A1 | 4/2010 | Arlein et al. | |
| 2010/0122196 A1 | 5/2010 | Wetzer et al. | |
| 2010/0131443 A1 | 5/2010 | Agarwal et al. | |
| 2010/0162172 A1 | 6/2010 | Aroner | |
| 2010/0175081 A1 | 7/2010 | Boylan, III et al. | |
| 2010/0254370 A1 | 10/2010 | Jana et al. | |
| 2010/0274859 A1 | 10/2010 | Bucuk | |
| 2010/0281107 A1 | 11/2010 | Fallows et al. | |
| 2010/0299640 A1 | 11/2010 | Titus | |
| 2010/0313146 A1 | 12/2010 | Nielsen et al. | |
| 2011/0081008 A1 | 4/2011 | Lawson et al. | |
| 2011/0161234 A1 | 6/2011 | Cuellar et al. | |
| 2011/0252132 A1 | 10/2011 | Wetzer et al. | |
| 2011/0252460 A1 | 10/2011 | Wetzer et al. | |
| 2011/0252461 A1 | 10/2011 | Wetzer et al. | |
| 2011/0258573 A1 | 10/2011 | Wetzer et al. | |
| 2011/0283259 A1 | 11/2011 | Lawson et al. | |
| 2012/0096267 A1 | 4/2012 | Daskalopoulos et al. | |
| 2012/0210349 A1* | 8/2012 | Campana et al. | 725/32 |

OTHER PUBLICATIONS

International Search Report and Written Opinion for International Application No. PCT/US2009/043790, mailed Jun. 24, 2009, 8 pages.

International Search Report and Written Opinion for PCT Application No. PCT/US2012/022406, mailed May 10, 2012, 12 pages.

Linden Lab, How Meeting in Second Life Transformed IBM's Technology Elite Into Virtual World Believes, 8 pages.

(56) References Cited

OTHER PUBLICATIONS

Premium Agency, Inc. Develops Majua, Japan's First 3-D HD-Quality In-Browser Plugin, Dec. 1, 2008, http://www.premiumagency.com/majua/.
Project Darkstar, Project Darkstar Community-Home, Mar. 5, 2009, http://www.projectdarkstar.com/.
Project Wonderland Toolkit for Building 3D Virtual Worlds, lg3d-wonderland: Project Wonderland, Mar. 5, 2009, https://lg3d-wonderland.dev.java.net/.
US Notice of Allowance on DTD May 23, 2013.
US Notice of Allowance on DTD Jun. 21, 2013.
US Notice of Allowance on DTD Aug. 5, 2013.
US Office Action on DTD May 23, 2012.
US Office Action on DTD Sep. 7, 2011.
US Office Action on DTD Dec. 4, 2012.
US Office Action on DTD Dec. 18, 2012.
US Office Action on DTD Jan. 3, 2013.
US Notice of Allowance on DTD Jan. 30, 2014.
US Notice of Allowance on DTD Sep. 17, 2013.
US Office Action on DTD Sep. 17, 2013.
US Office Action on DTD Oct. 1, 2013.

\* cited by examiner

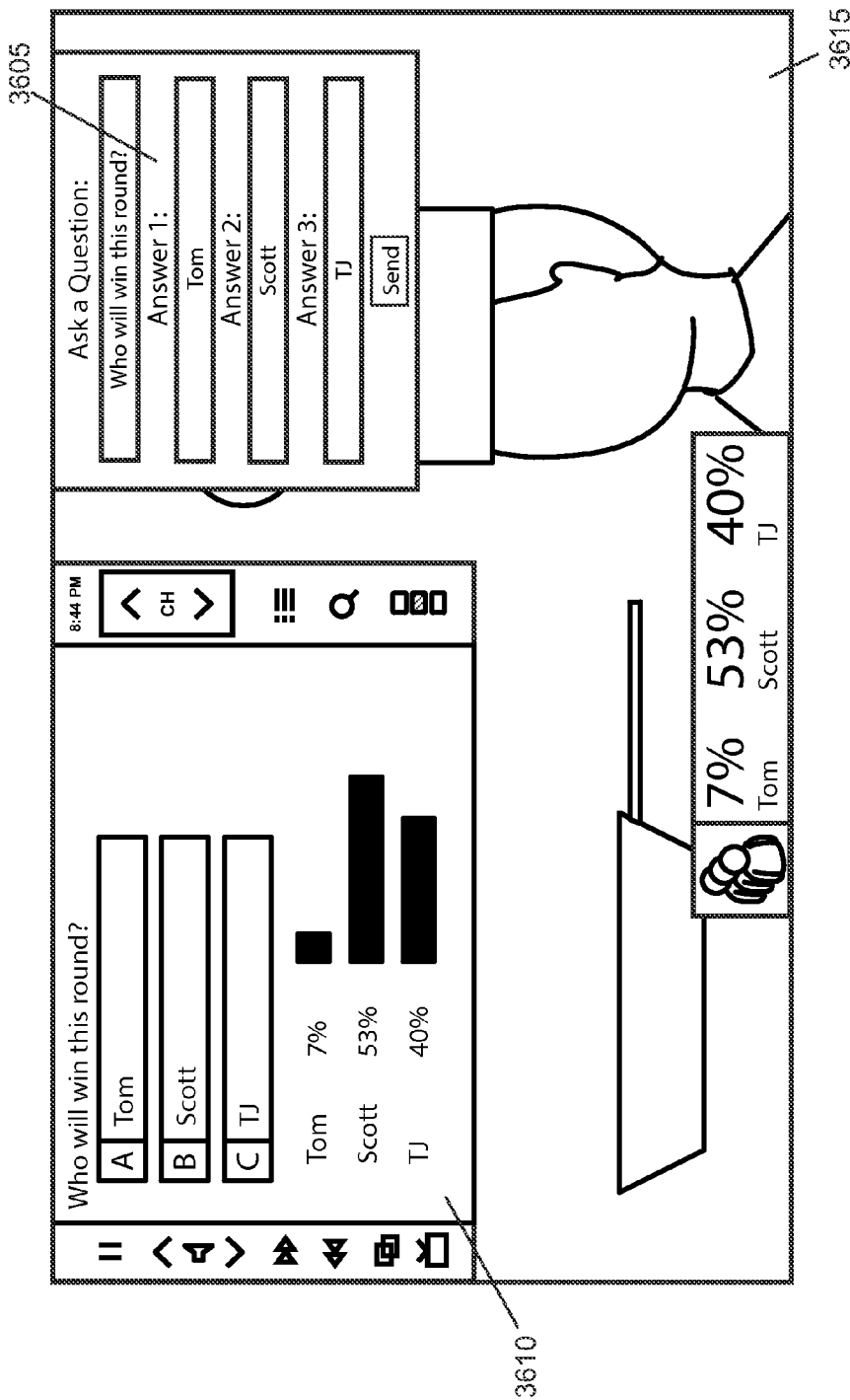

METHODS, APPARATUS, AND SYSTEMS FOR PRESENTING TELEVISION PROGRAMMING AND RELATED INFORMATION

CROSS-REFERENCES TO RELATED APPLICATIONS

This application claims a priority benefit, under 35 U.S.C. §119(e), to the following U.S. provisional applications:

Ser. No. 61/393,307, filed Oct. 14, 2010, entitled "6thSpaceTV;"

Ser. No. 61/435,976, filed Jan. 25, 2011, entitled "Information Delivery System for, and Methods of, Interaction with Multiple Information Forms Across Multiple Types and/or Brands of Electronic Devices, such as Televisions, Mobile Phones, and Computing Devices;"

Ser. No. 61/474,942, filed Apr. 13, 2011, entitled "Information Delivery System for, and Methods of, Eventing and Alerting Using Multiple Information Forms and Sources Across Multiple Types and/or Brands of Electronic Devices;" and Ser. No. 61/476,961, filed Apr. 19, 2011, entitled "Information Delivery System for, and Methods of, Interaction with Multiple Information Forms Across Multiple Types and/or Brands of Electronic Devices, such as Televisions, Mobile Phones, and Computing Devices."

Each of the above-identified applications is incorporated herein by reference in its entirety.

BACKGROUND

Consumer and business users currently access digital information (e.g., broadcast TV, internet text, graphics, video, social networking content) across a variety of different electronic communication devices (e.g., laptop computers, smart phones, TVs, tablets). Each device has its own interface, content metaphor, format, and access method. Users' experience with digital content over different devices is poor for two reasons: 1) the quality of the information delivery is varied; and 2) users are required to learn how to use each device in order to receive their desired information. This learning process is time consuming and does not guarantee the users' success.

In addition, although certain technologies, such as Internet browsers and multimedia players, provide some centralized manner of accessing digital information, such technologies are largely static. As a result, these technologies cannot be customized for individual user preferences.

For example, in the broadcast TV environment, users select and receive information using traditional channel guides. With this technology, user interaction and information customization is extremely limited. The ability to combine broadcast TV content with other forms of information, such as social media, is restricted.

SUMMARY

Various embodiments of the present invention are directed to methods, apparatus, systems and computer-readable media for facilitating presentation of information to users in a user-friendly manner and enable enhanced user interaction with various types of information. In various aspects discussed in greater detail below, multiple types of content, such as television programming and information relating to the programming, may be presented together in a synchronized fashion and/or otherwise combined to enhance user interaction with such information.

In particular, in some exemplary embodiments, media programming (e.g., television shows) may be presented in conjunction with other types of information, such as advertising data. For example, advertising data may be displayed while a media program is being presented, wherein the advertising data may be related to a context such as the subject matter of the media program being viewed and/or advertisements presented in the media program, time of day, characteristics of a user (e.g., as stored in a user profile), and/or other types of information. In some implementations, the media program and advertisements may be presented on separate devices.

In some exemplary embodiments, features may be provided to a user to allow the user to interact socially with other co-users of a system, for example, when viewing media programming. For example, an interface may be provided that may be used to identify other co-users (e.g., contacts or friends of a user) who are watching the same or similar programming and interact with the co-users. In various aspects, the users may interact with one another via text, audio, video, and/or other methods of interaction. In other aspects, users may additionally or alternatively be enabled to use established social and/or messaging networks to interact with other co-users on those networks.

In some embodiments, polling and/or voting features may be provided to users (e.g., in real time or near-real time). For example, users, content providers, and/or other parties or entities may be enabled to present a poll question (e.g., true/false, multiple choice, inviting entry of individual answers by users, etc.) to one or more users, to which the users may provide responses. In one implementation, a poll organizer may post a poll relating to a media program such as a game show to users that have established a social media chat based around viewing the game show, and the poll may request user input as to which contestant will or should win the show.

One exemplary embodiment relates to an apparatus for providing advertising information relating to a media program. The apparatus includes at least one communication interface, a memory configured to store processor-executable instructions, and at least one processing unit communicatively coupled to the memory and the at least one communication interface. Upon execution of the processor-executable instructions, the at least one processing unit is configured to determine that the media program is currently being presented using a first user viewing device that is communicatively coupled to the at least one communication interface. The at least one processing unit is further configured to transmit an ad programming signal to a second user viewing device communicatively coupled to the at least one communication interface, so as to configure the second user viewing device to present at least one first advertisement while the media program is being presented on the first user viewing device.

Another exemplary embodiment relates to a method of providing advertising information relating to a media program. The method may be implemented in a system including a server computing device, a first user viewing device communicatively coupled to the server computing device, and a second user viewing device communicatively coupled to the server computing device. The method includes determining, at the server computing device, that the media program is currently being presented using the first user viewing device. The method further includes transmitting, from the server computing device, an ad programming signal to the second user viewing device. Responsive to receiving the ad programming signal, the second user viewing device is configured to present at least one first advertisement while the media program is being presented on the first user viewing device.

Another exemplary embodiment relates to at least one computer-readable storage medium encoded with processor-executable instructions that, when executed by at least one processing unit, perform a method of providing advertising information relating to a media program. The method includes determining that the media program is currently being presented using a first user viewing device. The method further includes transmitting an ad programming signal to a second user viewing device. Responsive to receiving the ad programming signal, the second user viewing device is configured to present at least one first advertisement while the media program is being presented on the first user viewing device.

Yet another exemplary embodiment relates to an apparatus to provide secure information via at least one user platform operated by a user. The apparatus includes at least one communication interface to facilitate wired and/or wireless communications with the at least one user platform via one or more transmission media. The apparatus further includes at least one memory to store processor-executable instructions and at least one processor communicatively coupled to the at least one communication interface and the at least one memory. Upon execution of the processor-executable instructions by the at least one processor, the at least one processor establishes a user session to manage provision of and interaction with the secure information. The processor establishes the user session by implementing a plurality of channels through which the user receives and/or interacts with, via the at least one user platform, respective portions of the secure information. The processor further establishes the user session by controlling the at least one communication interface to receive, from the at least one user platform, a user identity for the user and a platform identity for the at least one user platform. The processor further establishes the user session by authenticating the user and the user platform to receive the secure information based at least in part on the user identity and the platform identity. The processor further establishes the user session by determining that a media program is being presented via a user viewing device communicatively coupled to the at least one communication interface. The processor further establishes the user session by, if the user and the user platform are authenticated in C), controlling the at least one communication interface so as to transmit to the at least one user platform first authenticated channel information relating to at least one authorized channel of the plurality of channels implemented in A), based at least in part on information access rights respectively associated with the corresponding plurality of channels, the user, and the user platform. The first authenticated channel information includes advertising information that, when displayed on the at least one user platform, presents at least one advertisement relating to the media program while the media program is being presented on the user viewing device.

Further exemplary embodiments relate to apparatus, methods, and computer-readable media for enabling user interaction relating to a media program. An exemplary apparatus includes at least one communication interface, a memory configured to store processor-executable instructions, and at least one processing unit communicatively coupled to the memory and the at least one communication interface. Upon execution of the processor-executable instructions, the at least one processing unit is configured to determine that the media program is currently being displayed to a plurality of users on a plurality of user viewing devices that are communicatively coupled to the at least one communication interface. The at least one processing unit is further configured to receive an indication that two or more of the plurality of users to which the media program is currently being displayed wish to communicate with other co-users. The at least one processing unit is further configured to, for each of the two or more users who wish to communicate with other co-users, transmit a messaging signal to a user viewing device of the user that is communicatively coupled to the at least one communication interface, so as to configure the user viewing device to present a messaging interface through which the user can communicate with other co-users to which the media program is being displayed.

Still further exemplary embodiments related to apparatus, methods, and computer-readable media for collecting user input relating to a type of content. An exemplary apparatus includes at least one communication interface, a memory configured to store processor-executable instructions, and at least one processing unit communicatively coupled to the memory and the at least one communication interface. Upon execution of the processor-executable instructions, the at least one processing unit is configured to determine that a same type of content is currently being displayed to a plurality of users on a plurality of user viewing devices that are communicatively coupled to the at least one communication interface. The at least one processing unit is further configured to transmit a poll signal to user viewing devices of each of the plurality of users, so as to configure the user viewing devices to display a poll message to the users inviting the users to input a response to the message. The at least one processing unit is further configured to receive one or more responses to the poll message from one or more of the users and determine a poll result based on the one or more responses received from the one or more users.

The following U.S. published patent application is incorporated herein by reference in its entirety:

U.S. published application no. 2010-0122196, published May 13, 2010, Ser. No. 12/465,331, filed May 13, 2009, entitled "Apparatus and Methods for Interacting with Multiple Information Forms Across Multiple Types of Computing Devices."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive methods, apparatus, and systems for presenting television programming and related information. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In various aspects, inventive embodiments of the methods, apparatus and systems disclosed herein provide for the display of and access to secure user-centric information via the construct of a channel grid framework serving as a desktop on a user device. The channel grid framework includes multiple user-selectable items that provide access to corresponding "channels" by which respective portions of user-centric information are delivered to a user. The user and the user device are first authenticated to receive the secure user-centric information, and the user-selectable items included in the channel grid framework on the desktop for the user device are based on information access rights and security protocols defined for the corresponding channels, the user, and the user device.

Figure 1:
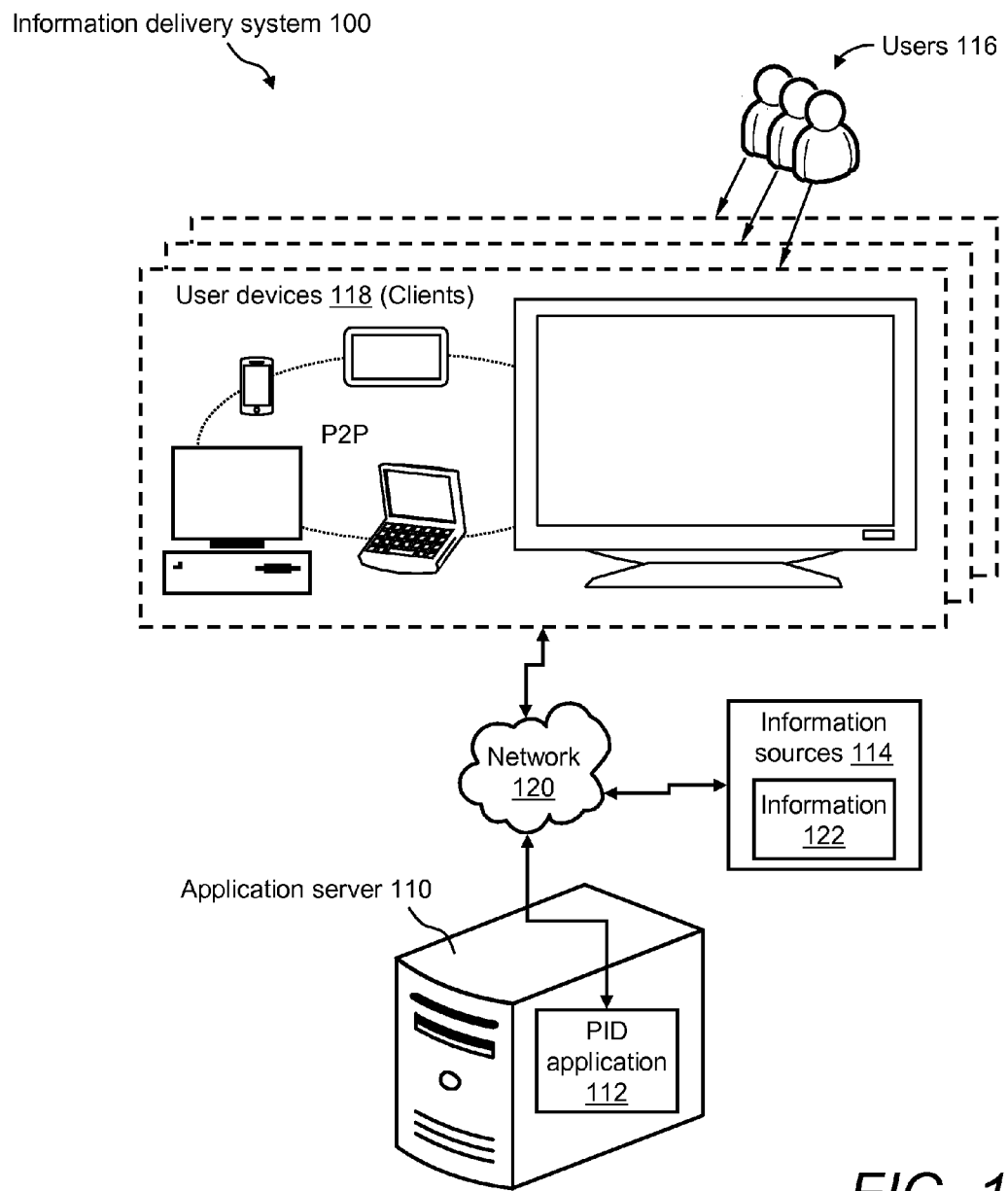
FIG. 1 illustrates a high level block diagram of an example of an information delivery system that includes a personal information delivery application for interaction with multiple information forms across multiple types, brands, and/or models of electronic devices, according to an exemplary embodiment.

Referring to FIG. 1, a high level block diagram of an example of an information delivery system 100 that includes a personal information delivery (PID) application 112 for interaction with multiple information forms across multiple types, brands, and/or models of electronic devices is presented. Information delivery system 100 may include an application server 110 upon which is installed the PID application 112 that has access to one or more information sources 114. One or more users 116 are associated with information delivery system 100. Users 116 may be, for example, individuals or groups of individuals. Each user 116 may have one or more user devices 118. Application server 110, the one or more information sources 114, and user devices 118 may be connected to a network 120 by any wired and/or wireless means. Network 120 may be, for example, any local area network (LAN) and/or wide area network (WAN) for connecting to the Internet.

Application server 110 may be a networked computer, such as the networked server of the owner and/or provider of PID application 112. The one or more information sources 114 may be, for example, networked computers of the owners and/or providers of the information stored thereon. For example, certain information 122 may be stored on information sources 114. Information 122 may be any information that can be delivered electronically over network 120 and that is capable of being consumed by users 116 via their user devices 118. More particularly, information 122 of the one or more information sources 114 may include different types and/or forms of information, data, and/or content. Examples of information 122 may include, but are not limited to, text, graphics, pictures, 3D graphic visualization of objects, sound, sensor data, streaming media data (e.g., streaming video and audio data), web-services data, Really Simple Syndication (RSS) feeds, image data, eventing and alerting, raw data, any type of information, and the like.

Information 122 of information sources 114 may be any information that resides outside of the application server 110 environment. However, with regard to information to be consumed by users 116 via their user devices 118, the present invention is not limited to "external" information sources, such as information sources 114. Users 116 may also consume information from "internal" information sources (not shown), which are any information sources that reside directly at application server 110 and/or directly at user devices and/or from sensors contained on or communicating with user devices 118.

PID application 112 is a software application that facilitates user interaction with multiple information forms across multiple types, brands, and/or models of electronic devices (e.g., user devices 118). Generally, PID application 112 is operating under a client-server model of computing in which application server 110 is the server and each user device 118 is the client.

Preferably, user devices 118 have a runtime environment that includes, but is not limited to, the following attributes: 1) capability to access multiple different operating systems; 2) capability to access any information that is exposed at the device level; 3) capability to allow software and/or information updates without interrupting the device and/or service (i.e., "hot" updates); 4) capability to operate offline; 5) capability to maintain state information; and 6) any combinations thereof.

An example of such a runtime environment is the Adobe® AIR® 2.5 runtime (available from Adobe Systems Inc, San Jose, Calif.) and the HTML5 runtime. HTML5 is the next major revision of the HTML standard, which is currently under development.

System Architecture Supporting the "Flex" Presentation Framework

For the purpose of illustration, FIGS. 1 through 11 describe the system architecture of information delivery system 100 according to some embodiments of the present invention implemented for supporting the Flex presentation framework. In one example, the Flex presentation framework may be implemented using Adobe® Flex® from Adobe Systems Incorporated (San Jose, Calif.). Adobe® Flex® is an open source framework for building highly interactive, expressive web applications that deploy consistently on all major browsers, desktops, and operating systems by leveraging the Adobe Flash Player and Adobe AIR® runtimes. In this example, user devices 118 (i.e., client devices) are any Adobe AIR-enabled devices. Examples of user devices 118 may include, but are not limited to, any type, brand, and/or model of Adobe AIR-enabled desktop computer; Adobe AIR-enabled laptop computer; Adobe AIR-enabled tablet computer; Adobe AIR-enabled net-book computing device; Adobe AIR-enabled handheld computing device; Adobe AIR-enabled personal digital assistant; Adobe AIR-enabled enterprise digital assistant; Adobe AIR-enabled portable digital assistant; Adobe AIR-enabled telecommunications device including one of an Adobe AIR-enabled telephone, Adobe AIR-enabled cell phone, and Adobe AIR-enabled smart phone; Adobe AIR-enabled personal navigation device; Adobe AIR-enabled vehicle-based device; Adobe AIR-enabled optical disk player; Adobe AIR-enabled television; Adobe AIR-enabled game console; and the like.

Therefore, an aspect of information delivery system 100 is that its operation is not limited to any particular type, brand, and/or model of client device and/or to any particular operating system (OS). That is, the operation of information delivery system 100 is substantially device-agnostic and/or OS-agnostic because it may operate, for example, on substantially any Adobe AIR-enabled client device. Additionally, information delivery system 100 is substantially information type-agnostic and/or information source-agnostic.

User devices 118 serve as a user platform operated by a user 116 to facilitate display of, and interaction with, secure user-centric information. Preferably, the set of user devices 118 belonging to each respective user 116 is connected in a peer-to-peer (P2P) fashion. In one example, the user devices 118 of a certain user 116 may include a mobile device (e.g., cell phone), a portable device (e.g., tablet, laptop computer), a desktop computer, and a television (e.g., set top box, intelligent TV). In this example, the user's cell phone, tablet, laptop computer, desktop computer, and television are connected (wired and/or wirelessly) in a P2P fashion.

PID application 112 provides a personalized information delivery utility that includes one or more sets of processor-executable instructions executing on one or more processors controlling various other hardware devices, with client-server system architecture, to facilitate delivery of a wide variety of information to a user, via one or more user devices or "platforms" (clients). Information is displayed on a graphical user interface (GUI) of a given user platform in a "presentation framework" that is customized based on a "user context." The presentation framework is homogenous amongst different user platforms so as to facilitate user familiarity and ease of interaction with displayed information. The presentation framework also facilitates the user's ability to take meaningful "real-time" action(s) in response to the displayed information.

The "user context" may be with respect to user attributes, such as, but not limited to, identity of the user, an identifier for one or more user devices associated with the user, location, activity, role, event, and any combinations thereof. Further, the "user context" may be with respect to user preferences, such as, but not limited to, source(s) of information of interest to the user, category/type of information of interest to the user, priority and/or importance of information, time (of day, week, month, year) at which information is displayed, and any combinations thereof.

The mechanism of PID application 112 for providing the user access to and interaction with, for example, information 122 and/or any other information is referred to as a "channel." That is, the channel is a conduit for delivering information to a user (e.g., providing access to and interaction with information), and is an elemental feature (basic building-block) of PID application 112. With respect to the PID application 112, the channel two pieces (1) a visualization piece that is presented on the client device (e.g., user devices 118) and (2) the integration piece residing at the server (e.g., application server 110). More details of the channel with respect to PID application 112 are described with reference to FIGS. 2, 3, 4, and 5.

Figure 2:
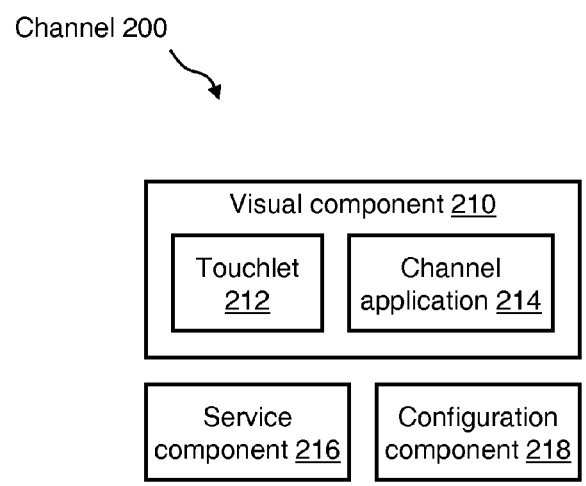
FIG. 2 illustrates a functional block diagram of an example of a channel of a personal information delivery application for providing users access to and interaction with information, according to an exemplary embodiment.

Referring to FIG. 2, a functional block diagram of an example of a channel 200 of PID application 112 for providing users access to and interaction with information is presented. PID application 112 may provide at least one channel 200. Preferably, PID application 112 provides one or more function-specific channels 200. There may be a server portion of channel 200 that is resident at application server 110 and a client portion of channel 200 that is resident at each user device 118. The client side portion of channel 200 is for presenting and interacting with content. There is a server side portion of channel 200 which provides services that are always running More details of the client architecture and server architecture underlying the client and server portions of any channel 200 are described with reference to FIGS. 5 through 11.

Any channel 200 of PID application 112 provides a gateway to content, such as information 122 of information sources 114. Additionally, each channel 200 has a built in eventing and alerting feature, which will be described in subsequent text. Each channel 200 may include a visual component 210 that is formed of a touchlet 212 and a channel application 214. Additionally, channel 200 may include one or more service components 216 and a configuration component 218.

Visual component 210 may be any text and/or graphic element that may be presented to users 116 for viewing on the display, screen, and/or GUI of any user device 118. With respect to a certain function-specific channel 200, the design and implementation of visual component 210 may be channel-specific. That is, visual component 210 may be used to visually render at least some of the function-specific information on a GUI of a user device 118 via one or more text and/or graphic elements, and provide for interaction with the displayed channel information. Embodiments of the present invention are not limited to presenting information to users 116 in a visual fashion only. Other ways (not shown) of conveying information to users 116 may be, for example, audible indicators (i.e., sound) and/or tactile indicators (e.g., vibration).

Channel application 214 may be any application software that is designed to perform singular and/or multiple related specific tasks and/or functions of a certain channel 200. Channel application 214 is used to manage the visual rendering of at least some of the channel-specific information on a GUI of a user device 118. Channel application 214 is also designed and used to manage user interaction with the displayed channel information.

Figure 3:
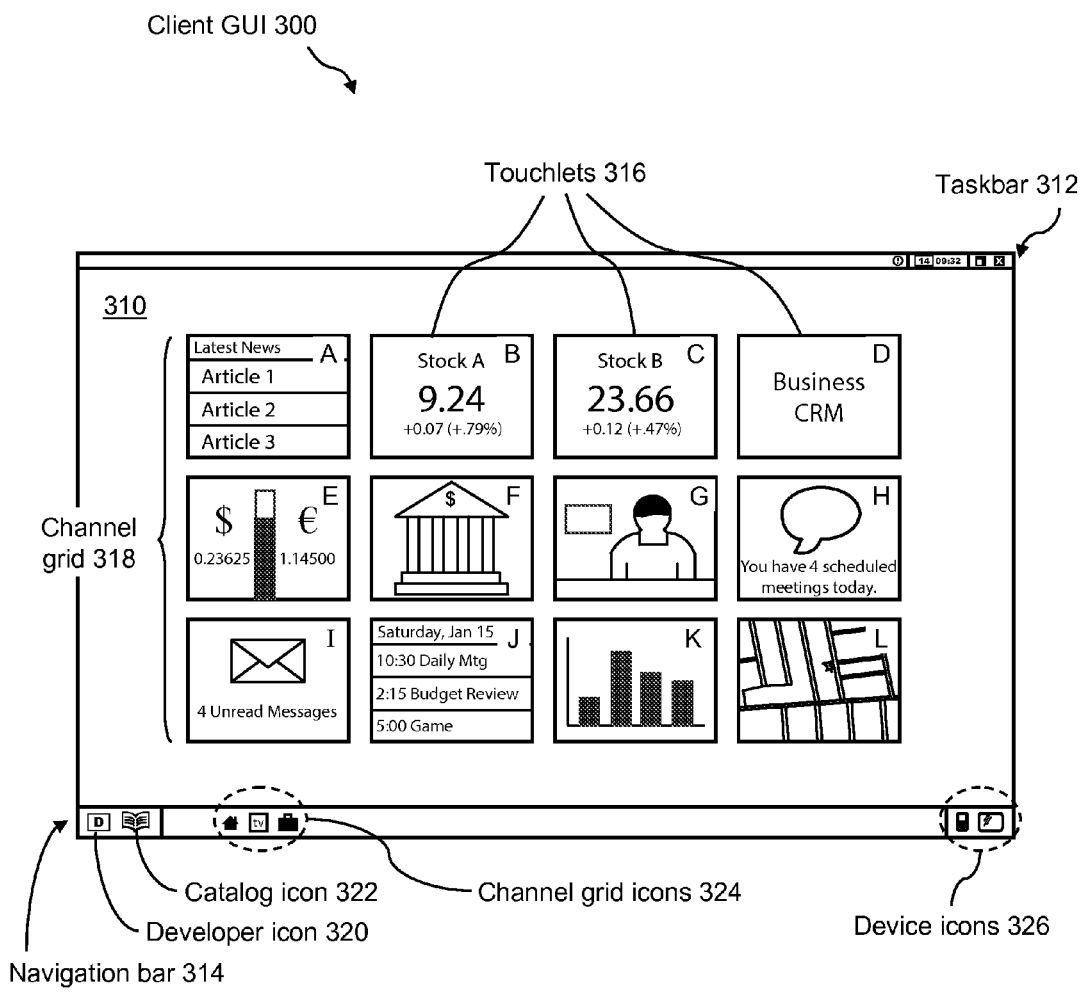
FIG. 3 illustrates a screenshot of an example of a client GUI of the personal information delivery application and shows an example of a channel grid, according to an exemplary embodiment.

Some channel applications 214 support implementation of the channel in a "full screen mode" on the GUI of a user device 118 once the channel 200 is deployed on the platform of PID application 112 and a channel 200 is invoked by a user (i.e., selected by the user to operate in substantially full-screen mode). A user invokes a certain channel 200 via its respective touchlet 212. Touchlet 212 includes a graphic element associated with its channel 200 that appears on a portion of the GUI of a user device 118, as part of the presentation framework, to provide a gateway/portal to its channel 200. A touchlet 212 has multiple behaviors as described with reference to FIG. 3. Examples of function-specific channels 200 and their associated touchlets 212 are described with reference to FIG. 3. Additionally, FIG. 3 shows an example presentation framework of channels 200 on the GUI of a user device 118. More details of an example of a function-specific channel 200 with its visual components 210, touchlet 212, and channel application 214 are described with reference to FIG. 4.

The one or more service components 216 of a channel 200 are used to access information from outside the environment of PID application 112. For example, service components 216 are used to retrieve the information 122 from the authorized information source(s) 114 and securely provide the retrieved information 122 to any visual components 210 of a channel 200 for display to user. Additionally, service components 216 may be used to monitor/process the channel information (e.g., via event processing and/or complex event processing (CEP)) to derive "secondary" information (e.g., events—particular changes in state or content of channel information), and provide secondary information to any visual components 210 for conveying to the user (e.g., alerts).

Every channel 200 has at least one service that is invoked via service components 216. For example, one service is an identity service. The identity service may be used for (1) authenticating and authorizing users 116 to use a channel 200 and (2) authenticating channels 200 to invoke one or more services (at the server) in order to access content from, for example, authorized information source(s) 114. Every service has an identity. The authorization and authentication is by channel; in this way, authorization and authentication does not have to occur for each information request.

Configuration component 218 of any channel 200 includes information that defines the behaviors and "personality" of the channel 200. Configuration component 218 also includes user preferences. Further, the information in configuration component 218 defines the services being used, the data being used, alerts, user preferences for the content and alerts, state information, synchronization information, versioning information, and the like.

There are additional authorization aspects of each channel 200. For example, user authorization may be based on user identity, user role, user device, user/device location, time, date, day of week, and the like. For example, a certain user 116 is authorized to access certain content at his/her workplace location between 8 am and 8 pm, and only with his/her laptop computer that has a certain MAC address. At application server 110, configuration queries the identity subsystem (shown in FIG. 6) to understand any user permissions. The user may be generally authorized to use a channel 200, but there may be conditions.

Because there are two pieces to each channel 200, the client side visualization piece and the server side integration piece, an aspect of the present invention is that there is operational persistence at the server. Client devices may be shut down, but the channels are still operating on the server and services are still being run. As client devices become available, content will begin to stream.

A "presentation framework" is the manner in which information (generally multiple types or classes of information) is visually rendered (displayed to a user via a GUI of a user device 118) by PID application 112. The presentation framework is customized at least in part based on a user context (e.g., user attributes and/or preferences) and the presentation framework may sometimes purposefully constrain the scope and/or type of the information displayed on a GUI of a user device at any given time. The presentation framework thereby allows a user to interact with more limited information that may be particularly important to them in a given user context. This purposeful limitation on displayed information facilitates the user's ability to meaningfully absorb and respond to the information (e.g., take real-time action and/or make decisions in response to the displayed information).

PID application 112 provides a presentation framework that is homogenous amongst different user platforms so as to facilitate user familiarity and ease of interaction with available information; i.e., the presentation framework "follows a user around" from user device 118 to user device 118 and appears the same or substantially the same to the user on any GUI of any user device 118 on which the "client portion" of PID application 112 is installed.

A presentation framework includes one or more user-selectable items, or "touchlets" that are selectable by a user (e.g., via touch-screen and/or point and click, sound recognition, movement recognition or image recognition user interfaces) so as to invoke a "channel," through which one or more particular types of information are displayed to the user on the GUI of the user platform in a substantially full-screen mode. More details of one example of a presentation framework of PID application 112 are described with reference to FIG. 3, as well as other Figures to follow.

Referring to FIG. 3, a screenshot of an example of a client GUI 300 is presented that shows an example of a channel grid, which is one example of a presentation framework of PID application 112. Client GUI 300 may include, for example, a main viewing panel 310. Additionally, a taskbar 312 may be provided along the top of main viewing panel 310 and a navigation bar 314 may be provided along the bottom of main viewing panel 310.

Taskbar 312 may include, for example, standard calendar, time, window controls, and the like. Navigation bar 314 may include, for example, icons for launching other applications, icons of other user devices 118, and the like. For example, navigation bar 314 may include a developer icon 320, a catalog icon 322, and certain device icons 326. The developer icon 320 may be used to launch a "developer environment" that may be built into the framework of PID application 112. The catalog icon 322 may be used to launch an "application store" by which users 116 may acquire (e.g., purchase) and then install and synchronize specific channels 200. Device icons 326 may depict any types, brands, and/or models of user devices 118 in the user's P2P network, such as a mobile phone, a tablet device, any computing device, a television, and the like.

Once acquired from the application store, the user's preferences may cause the acquired channel(s) 200 to automatically load and synchronize across all user devices 118. Alternatively, a user 116 may drag and drop any channel 200 (e.g., drag and drop its touchlet 316) from the current user device 118 to, for example, the telephone device icon 326, the tablet device icon 326, the television device icon 326, and so on. Thereby, installing and synchronizing or copying the channel 200 on another user device 118. Therefore, an aspect of the present invention is that any channel on any user device can be quickly replicated and synchronized on any other user devices.

Client GUI 300 shows an example of a presentation framework that is organized into a grid for presenting channels 200 to a user 116 on any user device 118. In this example, multiple touchlets 316 are presented in a 3×4 channel grid 318 in the main viewing panel 310 of client GUI 300. For example, 3×4 channel grid 318 includes touchlets 316A through 316L. Each touchlet 316 in the 3×4 channel grid 318 of client GUI 300 represents a channel 200 of a specific purpose and/or function. User 116 may have multiple channel grids of information, which are accessible via the navigation bar 314. For example, navigation bar 314 may include certain channel grid icons 324, which are icons of other channel grids of the user.

In one example, channel grid icons 324 may include an "At Home" channel grid icon, a "My TV" channel grid icon, and an "At Work" channel grid icon. A user 116 may specify a certain default channel grid in his/her profile. Additionally, as defined in the user's profile, the default channel grid may change based upon, for example, device type, time, location, prior activities, and the like. Further, user 116 may be presented an option of several different channel grids from which to select. In one example, the channel grid 318 shown in main viewing panel 310 of client GUI 300 of FIG. 3 may be the user's "At Work" channel grid.

Presentation of channel grids may change based upon user context or preferences. Generally, PID application 112 is capable to combine, screen, and/or synthesize information in any way to present information in an intelligent manner to the user. The present invention is not limited to presenting content in a 3×4 or any other n×n channel grid. Other presentation styles are possible. For example, the touchlets of channels may be presented in a tiled fashion on a 3D cube, a tiled fashion on a 3D globe, a stacked tiled fashion, and the like.

Each touchlet 316 in the 3×4 channel grid 318 of client GUI 300 represents a channel 200 of a specific purpose and/or function. In one example, channel grid 318 includes a "News Reader" touchlet 316A, a "Stock Watch" touchlet 316B, another "Stock Watch" touchlet 316C, a "Business CRM" touchlet 316D, a "Currency" touchlet 316E, a "Banking" touchlet 316F, a "Live News" touchlet 316G, a "Business Calendar" touchlet 316H, an "Email" touchlet 316I, a "Personal Calendar" touchlet 316J, a "Business Finance" touchlet 316K, and an "Around Me" touchlet 316L. Further to the example, more details of the "Around Me" touchlet 316L and its associated channel application are described with reference to FIG. 4.

Each touchlet 316 of client GUI 300 is an example of a touchlet 212 of channel 200 of FIG. 2. Additionally, each touchlet 316 of client GUI 300 as well as the 3×4 channel grid 318 itself are examples of visual components 210 of channel 200 of FIG. 2.

A touchlet 212 of channel 200 of FIG. 2, such as touchlets 316A through 316L of FIG. 3, has multiple behaviors—(1) a touchlet 212 may serve as an icon to launch its associated channel application 214 to full screen mode, (2) a touchlet 212 may receive dynamically streaming data, such as audio and video data, sensor data, any web-services data, RSS feeds, eventing and alerting, raw data, any type of information, and the like. Data may be pushed to the channel 200 and its touchlet 212 in near real time, and (3) a touchlet 212 may serve as a viewer for presenting information dynamically in near real time.

Additionally, a touchlet 212 may include substantially all the functionality of a full channel application. The "touchlet information" typically is related to or derived from the channel information provided by the corresponding channel associated with the touchlet, so that when visually rendered, the touchlet information provides a more limited but nonetheless intuitive representation of the channel information. Therefore, an aspect of the present invention is that the construct of a channel 200 includes two levels of presentation (1) information that is streaming and/or displayed at the touchlet level and (2) information that is streaming and/or displayed at the full screen level that is launched via the touchlet.

Unlike standard icons and windows that are static and have little or no built-in intelligence, touchlets 212 have both static and dynamic behaviors, as well as intelligence. For example, touchlets 212 can provide information in context (e.g., context based on certain relationships between different data sources, time of day, day of week, geographic location, devices, users, user's role, and the like). Therefore, an aspect of the present invention is that touchlets may be designed to present only information that is most interesting and/or meaningful to the user, and with context. Another aspect of the present invention is that touchlets provide mechanisms for taking action and/or making decisions on that information.

An aspect of the present invention is that multiple touchlets in a channel grid may be displaying near real-time dynamic content to the user simultaneously. For example, the twelve touchlets 316 in 3×4 channel grid 318 of client GUI 300 may be displaying near real-time dynamic content simultaneously (e.g., 12 streaming videos) to the user 116. Again, the content presented in each touchlet is designed to present only what is important to the user without saturating the user with content he/she does not want or need.

Another purpose and/or function of a touchlet 212, such as touchlets 316A through 316L of FIG. 3, is that a touchlet 212 is capable of visually presenting static and/or dynamic content to a user 116 in a small window, until such time that the user 116 launches the associated channel application 214 in full-screen mode. For example, in near real time, application server 110 is pushing dynamic information from any sources to one or more touchlets 316 in near real time.

For example, in near real time, application server 110 is pushing dynamic information from a news web-service to "News Reader" touchlet 316A, dynamic stock information to "Stock Watch" touchlet 316B and "Stock Watch" touchlet 316C, streaming video data to "Live News" touchlet 316G, and so on. Further to the example and referring to FIG. 4, various screenshots of certain components of an example of an "Around Me" channel 400 of PID application 112 are presented.

Figure 4:
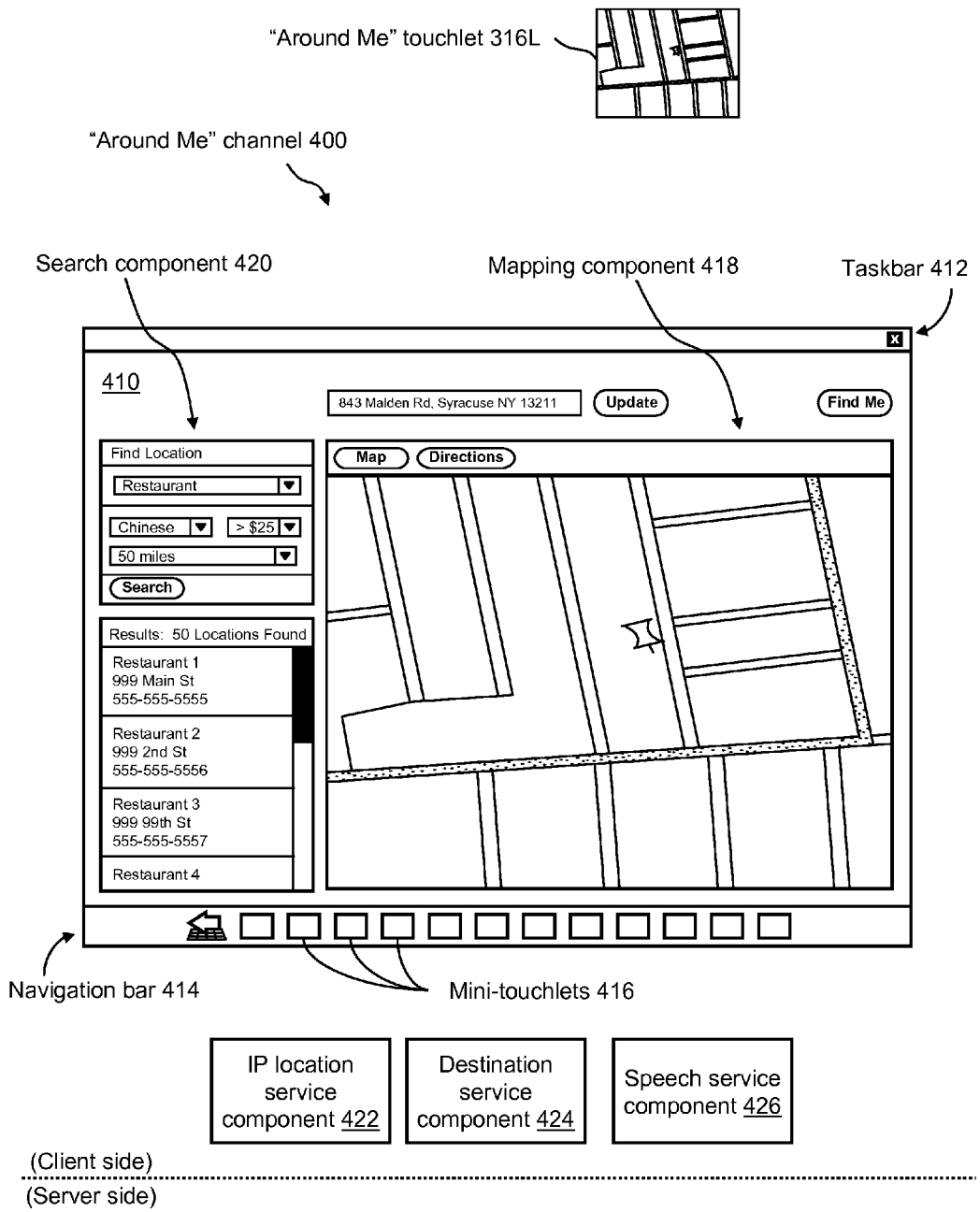
FIG. 4 illustrates various screenshots of certain components of an example of an "Around Me" channel of the personal information delivery application, according to an exemplary embodiment.

FIG. 4 shows the "Around Me" touchlet 316L, which is an example of a visual component 210 of a channel 200. The "Around Me" touchlet 316L displays a pin marker on a map to visually represent to the user that "Around Me" channel 400 may be a mapping application. When a user touches, clicks on, or otherwise selects the "Around Me" touchlet 316L of channel grid 318, the underlying "Around Me" channel application 214 is launched and renders a substantially full-screen GUI of the "Around Me" channel 400. The "Around Me" channel 400 then presents substantially more information to the user than shown in the "Around Me" touchlet 316L alone.

The substantially full-screen display of any channel application, such as an "Around Me" channel application 214, may include, for example, a main viewing panel 410. Additionally, a taskbar 412 may be provided along the top of main viewing panel 410 and a navigation bar 414 may be provided along the bottom of main viewing panel 410. Navigation bar 414 may include, for example, a set of mini-touchlets 416, which are substantially the same as, for example, touchlets 316 of channel grid 318 of FIG. 3 but presented in miniature form. A user may navigate directly to any channel application by selecting one of the mini-touchlets 416.

Main viewing panel 410 of "Around Me" channel 400 may include, for example, a visual mapping component 418 and a search component 420. The GUI itself, along with its visual mapping component 418 and search component 420 are all examples of visual components 210 of a channel 200. While contextually related to one another and able to communicate to one another, the "Around Me" channel GUI and the "Around Me" touchlet 316L are two separate and distinct entities.

"Around Me" channel 400 first acquires geo-location information. In one example, current geo-location information is automatically acquired from a user device 118 (e.g., geo-location data of a cell phone). In another example, geo-location information is acquired by the user 116 manually entering an address. Once the "Around Me" channel 400 has acquired the geo-location information, a map of the user's location is presented via the visual mapping component 418. Additionally, search component 420 may be used for locating places of interest (restaurants, gas station, hospital, ATM, theater, etc) near this location. If the user selects certain places of interest using search component 420, these places of interest are highlighted or otherwise indicated on the map. Further, if the user selects a particular place of interest, driving directions may be indicated on the map. The driving directions may be presented in text form, image form (e.g., displayed pictures and/or videos), and/or audible form (e.g., spoken directions).

In order to accomplish the aforementioned functionality, certain services may be associated with "Around Me" channel 400. For example, associated with "Around Me" channel 400 may be an IP location service component 422, a destination service component 424, and a speech service component 426. Additionally, the operation of "Around Me" channel 400 is an example of using intra-client interactions as well as client-server interactions. Any interaction with the components of "Around Me" channel 400 is passing messages through what may be termed a "GUI conversation."

For example, when the user 116 pushes a "Find Me" button on the GUI, a message is passed (via the GUI conversation) to the IP location service component 422. The IP location service component 422 then communicates with its related server channel component at application server 110. For example, IP location service component 422 passes the IP address to the server and requests the corresponding geographic location information. The related server channel component queries a mapping service (e.g., Bing) and returns a location (e.g., Syracuse, N.Y.) to the IP location service component 422. The IP location service component 422 passes this Syracuse, N.Y. mapping data (via the GUI conversation) back to the visual mapping component 418 of the "Around Me" channel 400.

Similarly, when the user requests driving directions, a message is passed (via the GUI Conversation) to the destination service component 424. The destination service component 424 then communicates with its related server channel component at application server 110. The related server channel component queries a mapping service (e.g., Bing) and returns turn-by-turn driving directions to the destination service component 424. The destination service component 424 passes the turn-by-turn driving directions data (via the GUI conversation) back to the visual mapping component 418 of the "Around Me" channel 400 and a driving route is indicated. Additionally, a text-to-speech conversion may be performed remotely at application server 110 and the results passed to speech service component 426 of the "Around Me" channel 400. The user then hears audible driving directions accordingly.

The "Around Me" channel 400 also illustrates the capability of performing updates without interrupting the device and/or service (i.e., "hot" updates). For example, the default visual mapping component 418 may be supported by the Bing Maps web-service. However, the visual mapping component 418 may include a selector that allows the user and/or developer to select from a list of map services, such as Google Maps, Yahoo Maps, MapQuest, and the like. If Google Maps is selected, the Google Maps data is automatically sent to the visual mapping component 418 with no client interaction. As a result, the visual mapping component 418 is updated with no device and/or service interruption.

Figure 5:
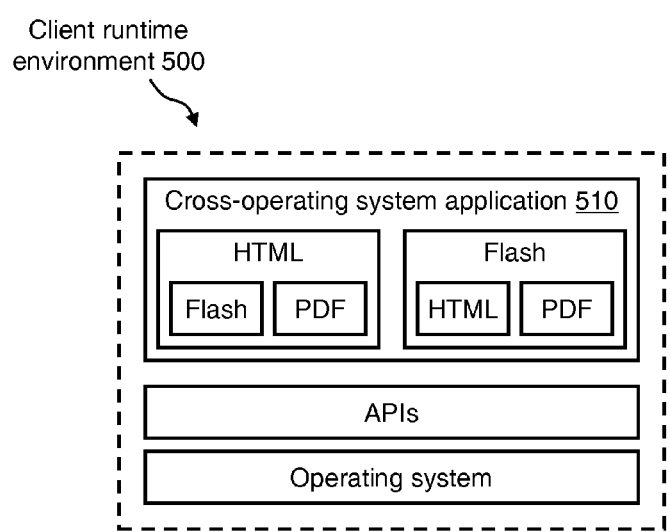
FIG. 5 illustrates a functional block diagram of an example of a client runtime environment, which is the runtime environment of the user devices of the information delivery system, according to an exemplary embodiment.

Referring to FIG. 5, a functional block diagram of an example of a client runtime environment 500 is presented, which is the runtime environment of user devices 118 of PID application 112. Client runtime environment 500 may include a cross-operating system application 510. In one example, when user devices 118 of PID application 112 are Adobe AIR-enabled devices, cross-operating system application 510 is based on Adobe® AIR®, which is described in FIG. 1. Therefore, client runtime environment 500 of user devices 118 may take advantage of all the capabilities that come with Adobe AIR, such as, but not limited to, HTML, Flash, Adobe AIR APIs, messaging, and the like. For example, Flash allows access the Hulu website to play streaming videos and because Adobe AIR includes a web browser, it can run HTML. Further, the Adobe AIR runtime is suitable for use with many different operating systems. For example, the Adobe AIR runtime is suitable for use with desktop operating systems, such as Mac, Windows, and Linux; mobile operating systems, such as RIM, WebOS, Windows Phone7, Symbian, and Android; and TV-related operating systems, such as Internet Protocol Television (IPTV) operating systems.

Figure 6:
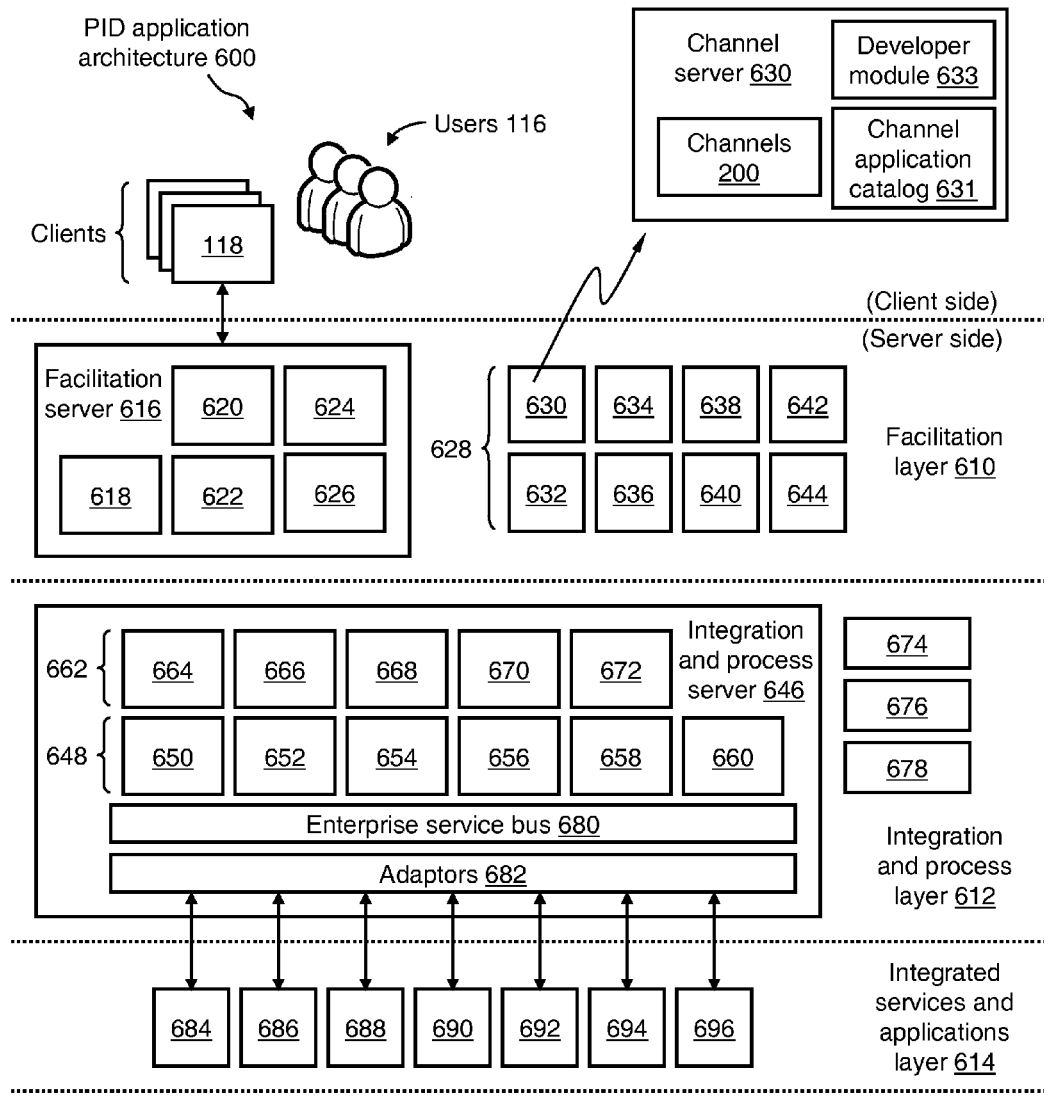
FIG. 6 illustrates a functional block diagram of an example of a personal information delivery application architecture for supporting the Flex presentation framework, according to an exemplary embodiment.

Referring to FIG. 6, a functional block diagram of an example of a PID application architecture 600 for supporting the Flex presentation framework is presented. PID application architecture 600 is an example of the application architecture of the server side of PID application 112. PID application architecture 600 may include a facilitation layer 610 through which all messaging of user devices 118 (the clients) pass, an integration and process layer 612, and an integrated services and applications layer 614.

Facilitation layer 610 further includes a facilitation server 616 and certain other servers 628. Generally, facilitation server 616 manages the communication between the client (e.g., user devices 118) and the server (e.g., application server 110). Facilitation server 616 serves as the gate keeper. In a sense, facilitation server 616 introduces the client to the integration and process server 646 and then goes away. Facilitation server 616 serves as the client representative to the rest of the server stack. In one example, facilitation server 616 is implemented using a Java server component that provides a set of real-time data management and messaging capabilities. One example of this Java server component may be Adobe® LiveCycle® Data Services.

Facilitation server 616 of the facilitation layer 610 may include, for example, a client gateway 618, proxy services 620, invocation services 622, inter-client messaging/synchronization 624, and a facilitation processor 626.

Client gateway 618 may be the direct interface with the client (e.g., user devices 118) for handling messaging operations. In one example, client gateway 618 uses Action Message Format (AMF) and/or Java Message Service (JMS) for exchanging messages and/or data between the client and server and/or between one client and another client.

Servers 628 of the facilitation layer 610 may include, for example, a channel server 630, a content delivery server 632, a collaboration media server 634 (e.g., video conferencing server), a stream sync server 636, an analytics server 638, an advertising server 640, a transcoding server 642, and a media server 644.

Figure 12:
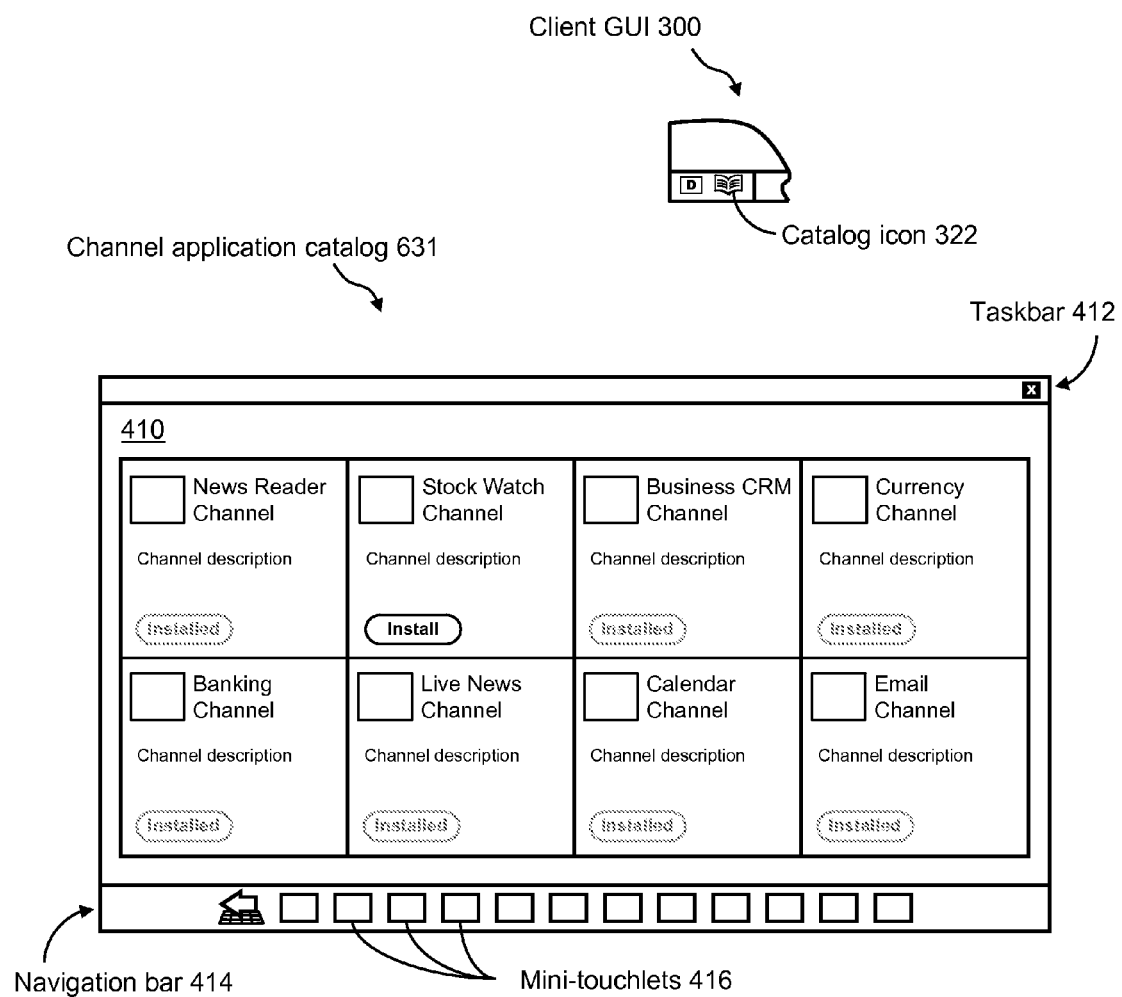
FIG. 12 illustrates a screenshot of an example of the GUI of channel application catalog of the personal information delivery application by which users may acquire channels for use with their devices, according to an exemplary embodiment.

Generally, channel server 630 is used for the creation and consumption of channels 200. Channel server 630 is not utilized in the operation of channels 200. For example, channel server 630 may include a repository of channels 200, a channel application catalog 631, and a developer module 633. Channel application catalog 631 may be an "application store" of available channels 200 from which users 116 may acquire (e.g., purchase), download, and install and synchronize specific channels 200. An example of channel application catalog 631 is shown in FIG. 12.

Developer module 633 may be the "developer environment" that may be built into the framework of PID application 112. For example, developer module 633 may be used by software developers to design specific channels 200. In one example, the developer icon 320 of client GUI 300 of FIG. 3 may be used to launch the developer module 633. Therefore, an aspect of the present invention is that PID application 112 provides a developer environment (e.g., developer module 633) in the same framework as the user environment and without having to exit the user environment.

Content delivery server 632 may be a server for storing and/or managing any other content that is not managed by, for example, collaboration media server 634, advertising server 640, and media server 644. Collaboration media server 634 is used to facilitate video conferencing. Stream sync server 636 is the server that integrates with advertising and analytics as it relates to the client and content that is being presented. An example of using stream sync server 636 is synchronizing and/or relating ads on one user device 118 (e.g., TV) with ads on another user device 118 (e.g., tablet). Analytics server 638 is used to configure and administer analytics applications. Advertising server 640 may be a dedicated server for storing and/or managing advertising content. Media server 644 may be a dedicated server for storing and/or managing various digital media, such as digital videos/movies, audio/music, and picture files.

Transcoding server 642 may be a dedicated server for performing transcoding operations. Transcoding is the ability to adapt digital files so that content can be viewed on different playback devices. Working like an interpreter, a transcoder translates files to a suitable format for the end user. Transcoding servers (e.g., transcoding server 642) and services reformat material that would otherwise have to be developed separately for different platforms. Transcoding servers and services are commonly used for adapting content for mobile devices or serving video.

Integration and process layer 612 may be organized in a standard service-oriented architecture (SOA). Integration and process layer 612 further includes an integration and process server 646 along with certain hosting applications 674, hosted communications applications 676, and integral identity provider SSO provider 678. Integration and process server 646 of integration and process layer 612 further includes certain platform service components 648 and certain server channel components 662.

Platform service components 648 may include, but are not limited to, a data management subsystem 650, an eventing and alerting subsystem 652, a configuration server 654, a session manager 656, an administration subsystem 658, and an identity subsystem 660.

Data management subsystem 650 performs the master data management operations of PID application architecture 600. Master data management may include, for example, correlating user ID (which user are you?) to content and/or correlating user devices (user has 6 phones, which phone are you?) to content. Associated with data management subsystem 650 may be an operational data store (ODS) (not shown) and/or a data warehouse (not shown) for storing temporary data or long term data. The ODS may serve two purposes (1) the ODS is used to store data for historical purposes, because data may not persist or be stored at the source. For example, a channel 200 may poll a service every few minutes and store the data in the ODS; and (2) the ODS is used in general application usage. For example, there is a background process of any channel 200 of PID application 112 that is retrieving data and pushing it to the ODS. Therefore, any data that is presented to the user at the user device 118 (i.e., at the client device) may be supplied by the ODS. This ensures good response time for the end-user because the network will not have to be continually interrogated for information.

Eventing and alerting subsystem 652 is used to collect and/or analyze information from any one or more disparate data sources with respect to certain predetermined or dynamic event conditions. Examples of types of information that may be evaluated/monitored by eventing and alerting subsystem 652 may include, but are not limited to, text information, graphic information, one or more pictures, one or more videos, audio or digital sound, streaming data, audio or video, content associated with an executing computer application, voice-over-IP communication, instant messaging/SMS information, video-conferencing information, environmental monitoring information, financial services information, enterprise resource planning information, enterprise content management information, building information, project management information, product lifecycle management information, RSS reader information, remote device control/interaction information, a three-dimensional graphic visualization of one or more objects and/or immersive environments, one or more word processing documents, one or more spreadsheets, one or more presentation/slide shows, email, address book information, and any combinations thereof CEP systems may also be utilized to evaluate/monitor event conditions.

Upon detecting the presence of an event condition, eventing and alerting subsystem 652 transmits alert notifications to users 116 via one or more user devices 118. Eventing and alerting subsystem 652 may include, for example, an event manager component, a notification manager, and a complex event processor. Further, events maybe stored for delivery at a later time or for use in a CEP system.

Once an event is registered in the event manager of the eventing and alerting subsystem 652, the event manager uses CEP (e.g., via complex query language (CQL) programming) to continually monitor the ODS of data management subsystem 650 based on event(s) that have been set and/or to perform a direct query of any external system and/or service.

Once the event manager recognizes that a certain event condition is present, the notification manager checks the user's configuration, which is at configuration server 654, as well as the user's session information at session manager 656 in order to determine how best to notify the end-user. Then, the alert notification is pushed through the client gateway 618 of the facilitation server 616 (e.g., via AMF) and to one or user devices 118 (client devices). As a result, the one or user devices 118 receive the alert notification and the alert presented to the user 116 via one or user devices 118.

Example of types of alerts that may be generated by eventing and alerting subsystem 652 may include, but are not limited to, visual alerts, auditory alerts, tactile alerts, email messages, SMS text messages, activation of at least one channel of a plurality of channels, and notifications to a law enforcement agency.

A main aspect of a channel 200 is that eventing and alerting subsystem 652 provides actionable eventing and alerting capability to the user 116. That is, channels 200 of PID application 112 provide users the ability to take action upon receiving an alert, in which the mechanism for user response to an alert may be conveniently built into the channel itself.

Configuration server 654 manages device configurations, user profiles, data configurations, application configurations, and the like. Configuration server 654 is the counterpart to configuration component 218 of any channel 200.

Session manager 656 performs session management and/or handles state. Session manager 656 may include, for example, a session module and a policy module. In one example of managing state, a user 116 is watching TV (one user device 118) and decides to pause the TV show and resume watching the TV show on his/her laptop computer (another user device 118). Session manager 656 stores state information and communicates this state information between user devices 118 so that the user 116 can resume watching the TV show at his/her laptop computer from the same point in the broadcast.

Administration subsystem 658 is used to perform standard system administration tasks. For example, when a channel 200 is accepted into the channel application catalog 631, the administration subsystem 658 associates what users 116 are allowed to access in the channel. With respect to authorizations, channels are assigned to groups and users. For example, anyone working in the accounting department of a company has access to a certain channel or only a certain user's family members are allowed access to a certain channel.

Identity subsystem 660 manages the authorization of users, places, times, and things. Identity subsystem 660 may include, for example, an authorize module and an authenticate module. For example, users must be authorized for content and services must be authorized for content. Accordingly, services check to ensure that users are authorized to access their services.

An exemplary aspect of PID application 112 of the present invention is single sign-on (or universal sign-on) capability, wherein once the user 116 is activated on the system, the user 116 is automatically authenticated when accessing any applications that normally require user login, i.e., unified access to all applications. That is, once the user 116 logs into information delivery system 100, the user will not be prompted for any other login operations when accessing information and/or services via PID application 112. For example, the user 116 may have one or more secure email services, one or more secure banking and/or financial accounts, one or more secure web-services accounts, and the like. Login information of all the user's secure accounts is stored, for example, in identity subsystem 660. When a user access these secure accounts, identity subsystem 660 automatically provides the necessary login credentials to the requesting entity, thereby automatically logging in the user with no further action on the user's part. Because multiple user devices 118 may be associated with a user 116, PID application 112 requires that the user 116 login on each of his/her user devices 118 as they become available in order to ensure the identity of the user 116.

In a location-based example, a user 116 is authorized to use a certain user device 118 and/or service only when inside his/her place of business. Therefore, upon leaving the building, the authorization is revoked. In a time-based example, a user 116 is authorized to use a certain user device 118 and/or service only at a certain time of day, perhaps during off-peak hours. Therefore, during off-peak hours the authorization is allowed, but during peak hours the authorization is revoked.

Generally, server channel components 662 are used to perform the integration. Server channel components 662 may include Java-based components, such as, but not limited to, a Camel server channel component 664, a Spring server channel component 666, a Java server channel component 668, a JavaScript server channel component 670, a business process execution language (BPEL) server channel component 672.

Camel server channel component 664 may be, for example, the Apache Camel server channel component (available from The Apache Software Foundation). Camel server channel component 664 is used for the orchestration and integration of services. Spring server channel component 666 is used for implementing Inversion of Control (IoC) and aspect-oriented programming (AOP). For example, when passing information from one component to another, the components involved have placeholders for data to be injected (or inserted). Spring server channel component 666 is used to manage this process. Java server channel component 668 may be implemented via (e.g., Java 2 Platform Standard Edition (J2SE)). JavaScript server channel component 670 is used for running JavaScript on the server side of PID application 112. BPEL server channel component 672 is used to export and import information by using web service interfaces.

With respect to integration and process layer 612, certain unique tasks are possible, independent of the source of the content. For example, sensor data and streaming media data are being normalized, which allows the capability to combine content. Therefore, an exemplary aspect of the present invention is that PID application 112 is agnostic to the source of the content and agnostic to the user device on which it is presented. From a client perspective, PID application 112 is agnostic to what content sources are connected.

The components of PID application architecture 600 communicate via an enterprise service bus 680 of integration and process server 646. Enterprise service bus 680 manages "calls" in and out of the PID application architecture 600. A set of adaptors 682 are connected to enterprise service bus 680 for interfacing with entities of integrated services and applications layer 614, which are outside of the environment of application server 110. That is, adaptors 682 are connected to enterprise service bus 680 for handling various communication protocols.

Integrated services and applications layer 614 may include, but are not limited to, one or more third-party services 684, one or more relational database management systems (RDBMS) 686, Parlay X 688 (i.e., a set of standard Web service APIs for the telephone network), one or more IP multimedia subsystem (IMS) servers 690, basic wireline telecommunication 692, one or more communications modules 694 (e.g., instant message, calendar, mail/SMS, address book), and one or more directory servers 696, which may be examples of information sources 114.

An aspect of the present invention is that PID application 112 provides built in security at the application server 110, which inherently provides security at each user device 118. Any applications running in the PID application 112 environment are checked for viruses, spyware, and the like. In this way, it is ensured that users 116 are operating in a secure environment.

Figure 7:
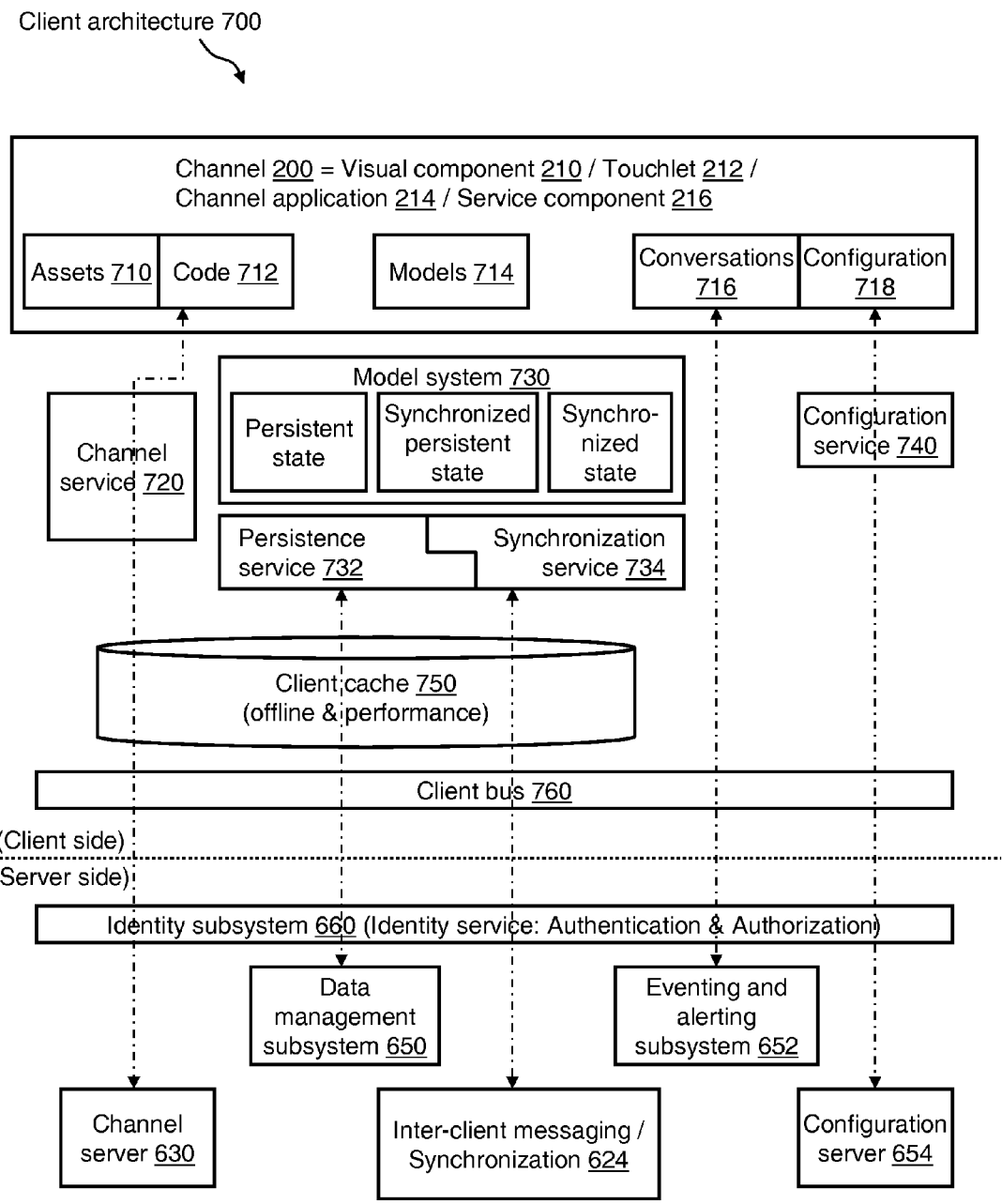
FIG. 7 illustrates a functional block diagram of an example of a client architecture of the personal information delivery application, according to an exemplary embodiment.

Referring to FIG. 7, a functional block diagram of an example of client architecture 700 of PID application 112 for supporting the Flex presentation framework is presented. Client architecture 700 is an example of the application architecture of the client side of PID application 112. That is, client architecture 700 is the application architecture of any user device 118.

FIG. 7 shows a channel 200, which includes visual component 210, touchlet 212, channel application 214, and service component 216. Associated with a channel 200 are certain sub-components, such as assets 710, code 712, models 714, conversations 716, as well as configuration 718.

Assets 710 may be, for example, images, descriptive language for the layout of the channel, and the like. Code 712 is the actual programming code for the channel 200. A channel service 720 on the client side communicates with the channel server 630 on the server side. Code 712 interacts with channel service 720 in the client. Additionally, code 712 is cached in client cache 750 and then transmitted via a client bus 760 to identity subsystem 660 (performing authentication and authorization) and then to channel server 630. Any channels 200 that are installed on a user device 118 originate from channel server 630 (e.g., from channel application catalog 631).

Models 714 may be the data models for the channel 200. A model system 730 on the client side may include user-defined models, persistent models, synchronized persistent models, synchronized models, and the like. Associated with model system 730 may be a persistence service 732 and a synchronization service 734. Models 714 interact with persistence service 732 and synchronization service 734 in the client. Persistence service 732 on the client side communicates with the data management subsystem 650 on the server side. Synchronization service 734 on the client side communicates with the inter-client messaging/synchronization 624 on the server side. Additionally, models 714 are cached in client cache 750 and then transmitted via client bus 760 to identity subsystem 660 (performing authentication and authorization) and then to inter-client messaging/synchronization 624.

Conversations 716 may be any communication over the bus between client components and/or server components. Conversations 716 on the client side are transmitted via client bus 760 to the eventing and alerting subsystem 652 on the server side.

Configuration 718 may define, for example, the position of the touchlet on the channel grid, that the channel is now monitoring a certain data stream, the user is receiving data and needs to be synchronized, the user has multiple devices that need to be synchronized, when any application is installed to perform synchronization, location, ID, the channel is a synchronizable channel, the channel is an alertable channel, and the like. Configuration 718 includes any channel attributes that convey the "personality" or functionality of the channel. Certain information in configuration 718 may be selected by the user.

A configuration service 740 on the client side communicates with the configuration server 654 on the server side. Configuration 718 interacts with configuration service 740 in the client. Additionally, configuration 718 is transmitted via client bus 760 to identity subsystem 660 (performing authentication and authorization) and then to configuration server 654.

Client architecture 700 of the client side of PID application 112 is architected similar to an SOA for an enterprise stack. The client services use the idea of GUI conversations to exchange messages between client components and/or server components, all using the client bus and/or server bus. Therefore, an aspect of the present invention is a sophisticated client architecture, similar to an SOA, that allows complex processing to occur locally at the client as well as at the server (yet without relying on the server), thereby enabling a rich user experience. Additionally, with respect to PID application architecture 600 and/or client architecture 700, more details of examples of certain process flows are described with reference to FIGS. 10 and 11.

Figure 8:
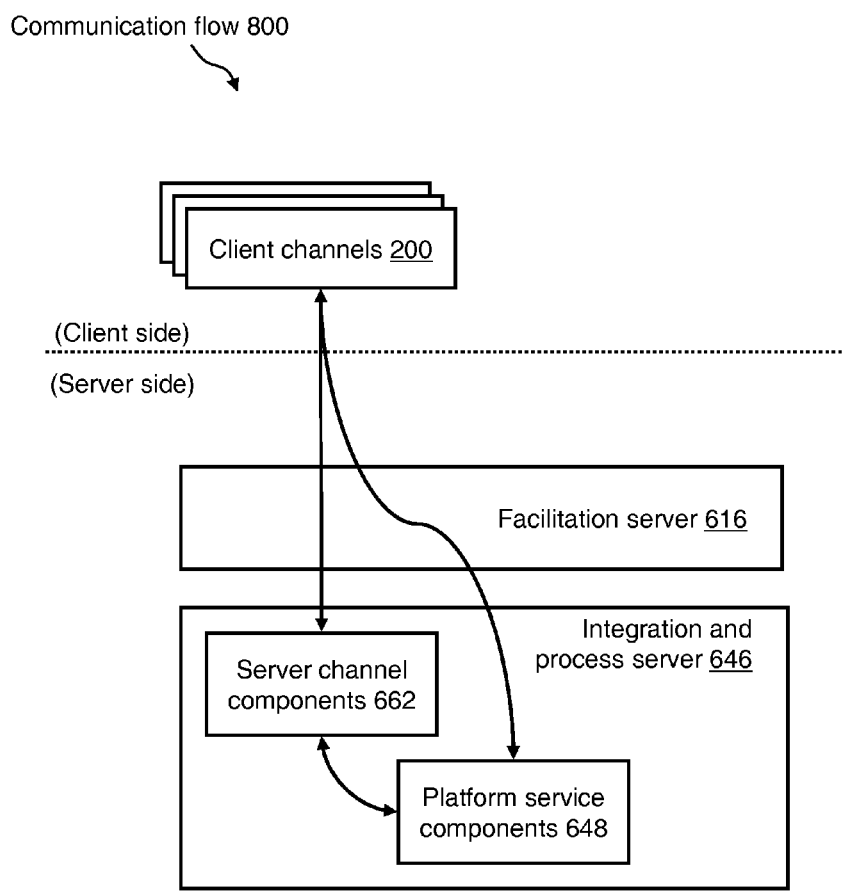
FIG. 8 illustrates a functional block diagram of an example of a communication flow between the client side and the server side of the personal information delivery application, according to an exemplary embodiment.

Referring to FIG. 8, a functional block diagram of an example of a communication flow 800 between the client side and the server side of PID application 112 is presented. For example, certain components may be bypassed in order to achieve efficiency. Communication flow 800 shows that components of client channels 200 may communicate directly with platform service components 648 (albeit through facilitation server 616). Additionally, components of client channels 200 may communicate with platform service components 648 through the server channel components 662 (again through facilitation server 616). This is important because certain tasks do not require going through the server channel components 662. Therefore, it may be more efficient to communicate directly with platform service components 648. For example, maybe when a component is requesting permission to do something, the client channel 200 may communicate directly with identity subsystem 660.

Figure 9:
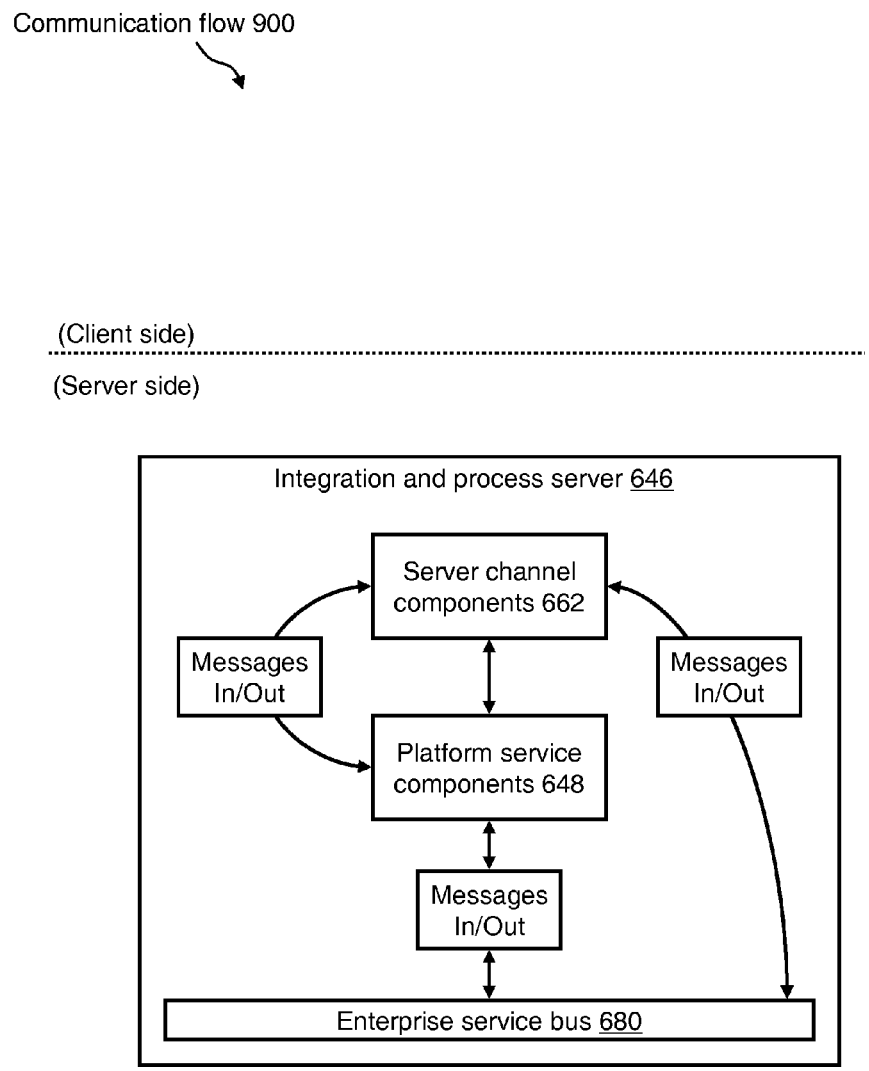
FIG. 9 illustrates a functional block diagram of an example of a communication flow between components at the server side of the personal information delivery application, according to an exemplary embodiment.

Referring to FIG. 9, a functional block diagram of an example of a communication flow 900 between components at the server side of PID application 112 is presented. For example, in integration and process server 646, the server channel components 662 may bypass the platform service components 648 and communicate directly with enterprise service bus 680. This scenario may be called "performant direct calling."

Referring again to FIGS. 8 and 9, an aspect of the present invention is that PID application 112 provides flexibility in the messaging operations.

Figure 10:
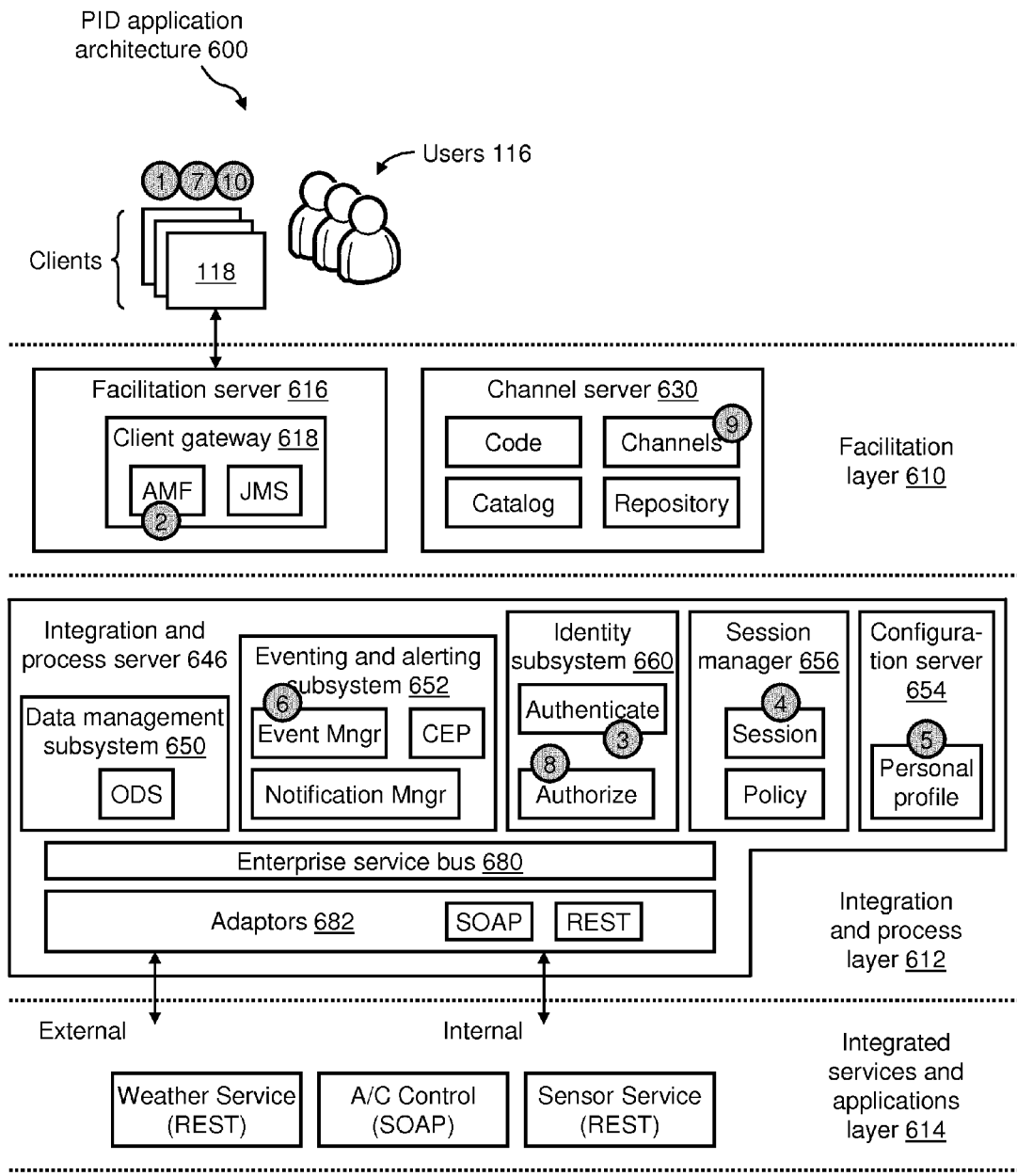
FIG. 10 illustrates a functional block diagram of a portion of the personal information delivery application architecture and a process of performing a user login operation, according to an exemplary embodiment.

Referring to FIG. 10, this illustrates a functional block diagram of a portion of PID application architecture 600 and a process of performing a user login operation is presented. In this example, the process of performing a user login operation may include, but is not limited to, the following steps.

At step 1, the client (user device 118) is activated, the application is launched at the client and, therefore, the channel grid is started at the client.

At step 2, the channel grid at the client connects via AMF to client gateway 618 of the facilitation server 616 at the server.

At step 3, client gateway 618 then authenticates. For example, client gateway 618 passes the credentials (user ID and password) to the authenticate module of identity subsystem 660.

At step 4, using a session module of session manager 656, the session is checked to see whether there is already an existing session. This is done because the user 116 may have multiple user devices 118.

At step 5, using a personal profile module of configuration server 654, the user's personal profile is checked with respect to the user device 118. This is done to ensure that the presentation frame work (e.g., channel grid, tabs) that is delivered matches the user device 118. The user's personal profile is also checked with respect to the location.

At step 6, an event manager module of the eventing and alerting subsystem 652 checks to see whether the user has any alerts present in case any alerts have been occurring during the transition state of the user device 118.

At step 7, the channel grid at the client checks to see whether the channels are cached locally at the client. If not cached, the channel grid at the client requests its channels from the channel server 630.

At step 8, using an authorize module of identity subsystem 660, the channel server 630 checks to see whether the user is authorized to have the requested channels.

At step 9, channel server 630 responds to the client with the allowed channels (sometimes updating, sometimes responding already up-to-date).

At step 10, the channel grid is populated with channels and presented at the client (user device 118).

An aspect of the present invention is that PID application 112 provides a universal login feature. That is, once a user 116 is logged into PID application 112, no further login actions are required for accessing any information and/or services. For example, configuration server 654 and/or identity subsystem 660 may contain a record of all login information of every user 116, which is automatically applied upon accessing any information and/or services with no further action by the user 116.

Figure 11:
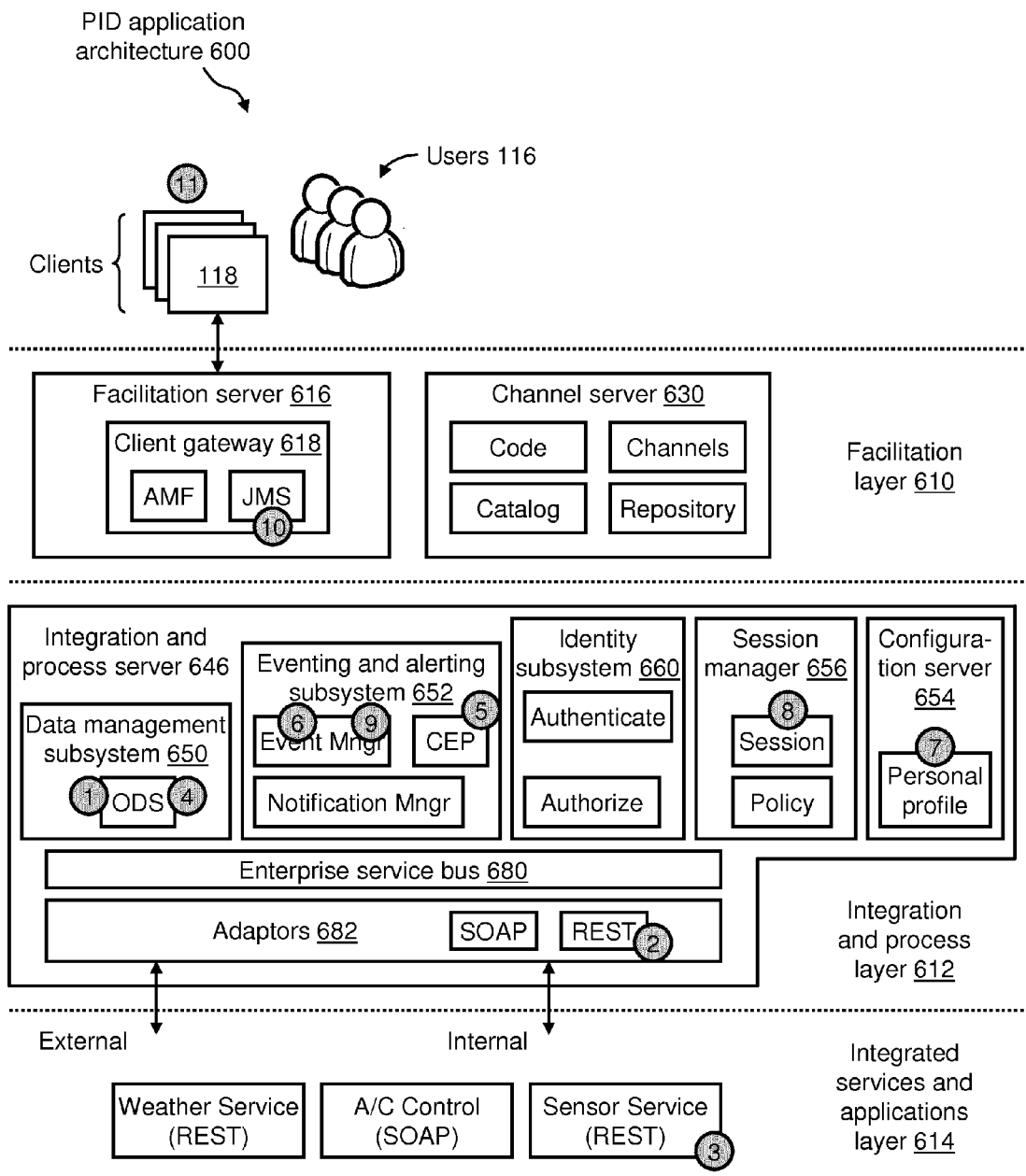
FIG. 11 illustrates a functional block diagram of a portion of the personal information delivery application architecture and a process of performing data management and eventing and alerting, according to an exemplary embodiment.

Referring to FIG. 11, this illustrates a functional block diagram of a portion of PID application architecture 600 and a process of performing data management and eventing and alerting is presented. In this example, the process of performing data management and eventing and alerting may include, but is not limited to, the following steps.

At step 1, a certain sensor channel is created and the ODS of the data management subsystem 650 begin to collect data.

At step 2, the source of the data is an entity at integrated services and application layer 614, therefore, the ODS collects the data through, for example, a REST adaptor, which is one of adaptors 682. In one example, a web-service call is issued.

At step 3, using, for example, the web-service call, an external sensor service (which is also REST) is interrogated. In one example, the external sensor service is a "temperature & humidity" service.

At step 4, in this example, the external sensor service collects the current temperature and humidity data, reports this data back to the ODS of the data management subsystem 650, and this data is stored at the ODS for historical views. In the case of eventing, this data may be sent directly to the requesting service and/or channel, if no historical records needed.

At step 5, a CEP engine of the eventing and alerting subsystem 652, which is monitoring the data at the ODS, detects an event. For example, the CEP may be monitoring the temperature and humidity data for certain threshold values that may indicate a certain condition is present.

At step 6, the CEP of the eventing and alerting subsystem 652 queries the event manager of the eventing and alerting subsystem 652 to see whether any user 116 has set an alert that corresponds to the current temperature and humidity condition.

At step 7, it is determined that, yes, some user 116 has set an alert that corresponds to the current temperature and humidity condition. Therefore, the user's personal profile at configuration server 654 is checked to see the user's notification preferences.

At step 8, it is checked to determine whether the user 116 has an active session in order to determine the appropriate way(s) to alert the user by considering the user's connectivity, location, time, and the like. It may be determined that the user is connected via the client via a laptop computer.

At step 9, the event manager of the eventing and alerting subsystem 652 is queried again to determine whether any other events are present in the event queue for this user. If yes, any other alerts may also be sent along with the temperature and humidity alert.

At step 10, the notification manager of the eventing and alerting subsystem 652 dispatches the notification through user's logical event queue which results in the client gateway 618 of the facilitation server 616 sending the information via JMS to the user's current channel grid.

At step 11, the message comes across the client bus of the user device 118, then a channel receives and displays the alert to the user. In this example, the alert may include information about the current temperature and humidity at some location.

With respect to the operation and/or use of PID application 112, this method may be summarized as follows. Certain services are written; certain complex query language is written; certain events and alerts are registered; sensor data at ODS is monitored as it related to events and alerts; if a match is detected, the event is correlated to a user; user profile and session information is queried; and the alert is transmitted to the user.

Referring to FIG. 12, a screenshot of an example of the GUI of channel application catalog 631 of PID application 112 is presented, by which users may acquire channels for use with their devices. In this example, the GUI presents a selection of available function- and/or purpose-specific channels 200. For each channel 200, its title, category, and certain details about the channel may be displayed. A navigation bar 1210 may be presented along the bottom of the GUI, by which users may scroll from page to page of the catalog.

Referring to both FIGS. 3 and 12, examples of titles of channels 200 that may be found in channel application catalog 631 may be News Reader Channel, Stock Watch Channel, Business CRM Channel, Currency Channel, Banking Channel, Live News Channel, Business Calendar Channel, Email Channel, Personal Calendar Channel, Business Finance Channel, and Around Me Channel.

An aspect of the present invention is that when the user 116 selects "install application" from channel application catalog 631, because the user's ID is known and authentication is already done, the purchase transaction is processed automatically and the selected channel 200 automatically installs and synchronizes on the user's channel grid.

Television, Social Interaction, and Voting/Polling Applications

For the purpose of illustration, FIGS. 13 through 39 describe non-limiting examples of channels 200 that may be suitable for use in connection with a variety of television applications and/or other broadcast media-related applications. In particular, FIGS. 13 through 39 illustrate different screenshots of an example of a "Television" channel of PID application 112. In the discussion below, it should be appreciated that the term "channel" within the context of PID application 112 should not be confused with the conventional terminology of a "TV channel." Accordingly, so as to differentiate between a channel of a PID application according to various embodiments of the present invention, and a conventional TV channel, the latter is hereafter referred to herein as a "traditional TV channel." Also, in the discussion below, reference is made to a tablet device 1310 and a television 1340 (see FIG. 14) that in some implementations are configured to present related content in connection with media programs. Both the tablet device 1310 and the television 1340 also may be referred to herein as "user viewing devices."

Figure 13:
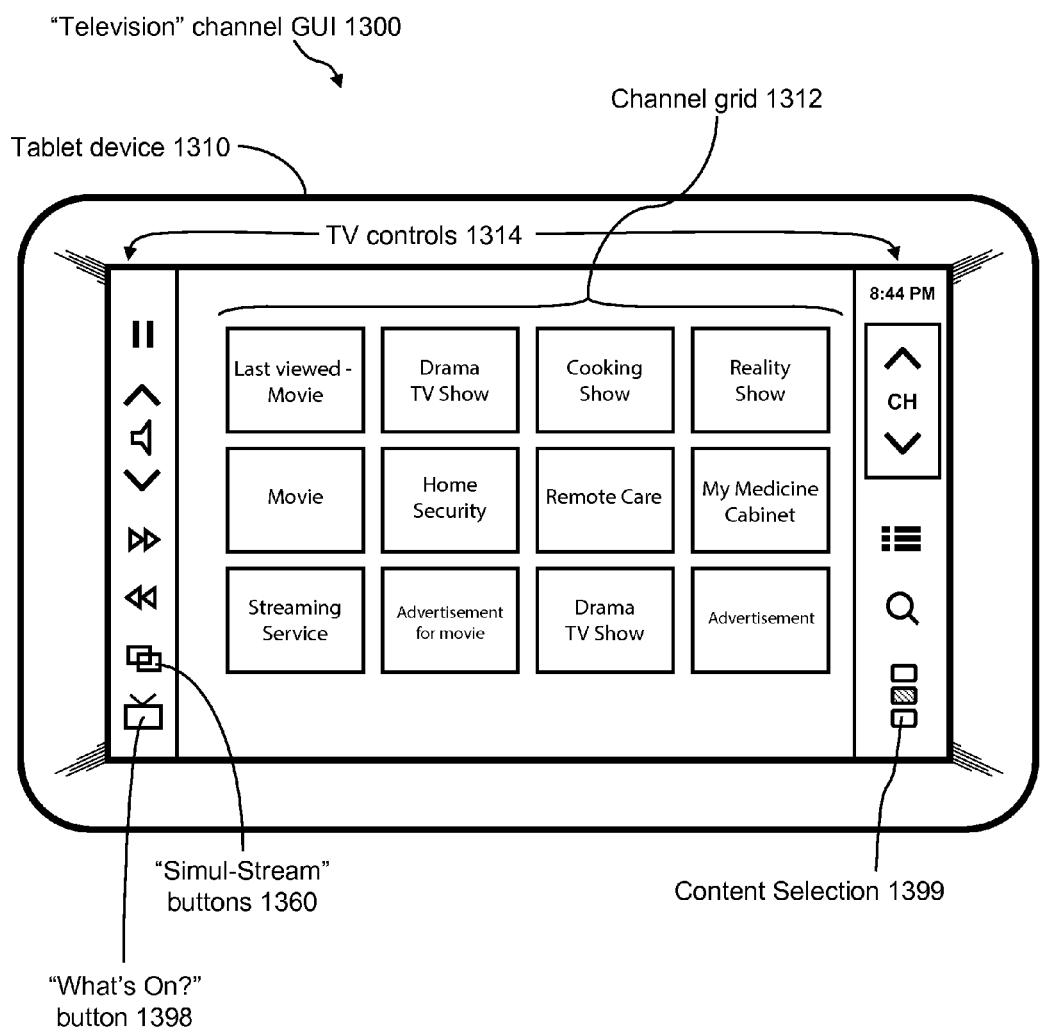
FIGS. 13 through 35 illustrate screenshots of an example of a "Television" channel of the personal information delivery application, according to exemplary embodiments.

FIG. 13 shows a screenshot of a "Television" channel GUI 1300 that is being displayed on a tablet device 1310, which is one example of a user device 118 (i.e., a client device). The "Television" channel GUI 1300 is an example of a user interface that may appear on tablet device 1310 in response to a user 116 selecting (e.g., by touching, clicking, etc.) a "Television" touchlet (not shown) of a certain channel grid (not shown) for the user 116.

The "Television" channel is designed to impart certain capabilities to any user device 118, such as tablet device 1310, with respect to viewing and/or interacting with content on a television. For example, in various aspects, tablet device 1310 may provide a TV remote control function, may display any dynamic content to the user 116, and/or may allow user interaction with the content.

For example, a set of TV controls 1314 that provide interfacing features are rendered on the display of tablet device 1310. In one exemplary implementation, the display of tablet device 1310 is a touch screen; accordingly, in this implementation, TV controls 1314 are touch controls. TV controls 1314 may include, for example, pause and play controls, fast forward and rewind, volume up/down controls, mute, 50% mute, traditional TV channel up/down controls, and TV on/off controls. TV controls 1314 may be rendered in any position on the display that provide ease of use for the user. For example, TV controls 1314 may be arranged on one side of the display, on both sides of the display, along the top of the display, and the like.

Channel grid 1312 contains multiple touchlets for presenting dynamic information of, interacting with, and/or launching any content that a user 116 may be likely to watch on his/her TV set, which is itself another user device 118 (i.e., another client device). For example, channel grid 1312 may include, for example, touchlets for TV shows, touchlets for movies, touchlets for TV service providers, touchlets for movies providers, touchlets for any streaming video content, and the like. In one example, the user 116 may select a Cooking Show touchlet 1330 (shown in the first row of touchlets illustrated in FIG. 13, and also shown in FIG. 14), which launches an underlying channel application in substantially full-screen mode, as shown in FIG. 14, by which the user may watch the Cooking show.

Figure 14:
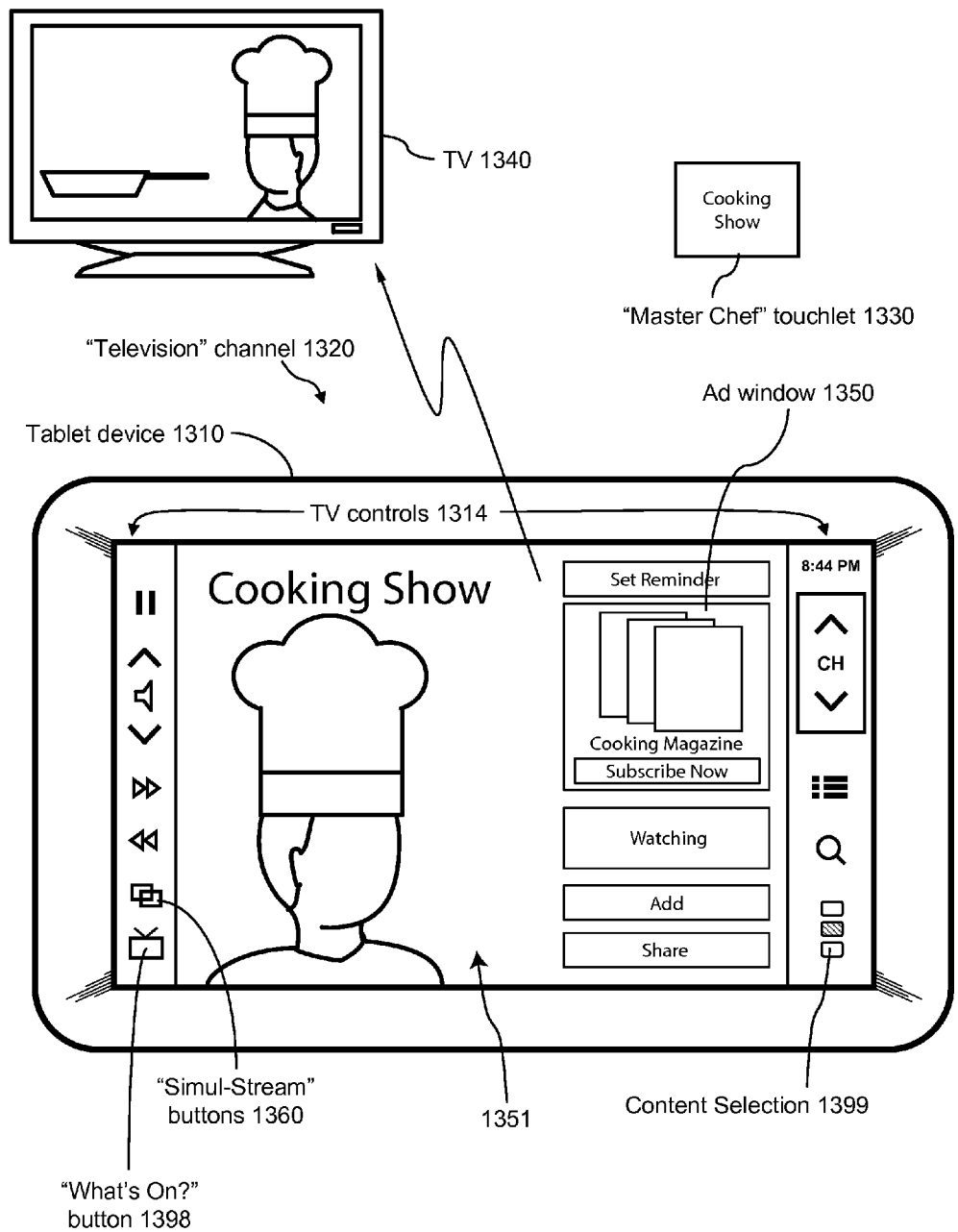

For example, FIG. 14 shows "Television" channel 1320 operating in a substantially full-screen mode. "Television" channel 1320 is launched from channel grid 1312 by, for example, using the "Master Chef" touchlet 1330. FIG. 14 also shows a TV 1340 by which the user 116 is able to watch the Cooking show. While TV 1340 is displaying the Cooking show itself, the user 116 may select a "What's On" button 1398 in order to view episode information about the Cooking show on tablet device 1310. The TV services provider's electronic programming guide (EPG) may be the source of this episode information. In some embodiments, when a TV touchlet is selected, TV 1340 may be configured to play content from a default initial traditional TV channel, and information displayed on tablet device 1310 may be information relating to the default initial traditional TV channel.

Additionally, as shown in FIG. 14, an ad window 1350 is included in the display of the tablet device 1310. Dynamic and/or static information from any source may be displayed in ad window 1350. In some embodiments, information displayed in ad window 1350 may be determined based at least in part on an ad programming signal received by the tablet device 1310 from a server computing system (e.g., application server 110, through the use of PID application 112). For example, in some embodiments, the server system may be configured to retrieve ad content (e.g., from a memory accessible to the server system and/or from third party ad content providers and/or advertisers) for one or more advertisements, and provide the ad content to tablet device 1310 via the ad programming signal. In response to and based on the ad programming signal, the tablet device 1310 may be configured to display the content within ad window 1350. In some embodiments, the ad programming signal provided by the server system to tablet device 1310 may additionally or alternatively include data and/or instructions that tablet device 1310 may use to retrieve ad content, but the ad programming signal itself may not include the ad content. For example, the ad programming signal provided by the server system may include an identification of the ad content that should be displayed within ad window 1350 and/or a location (e.g., an Internet address) from which the ad content can be obtained.

As illustrated in FIG. 14, in some embodiments the ad window 1350 may be a separate and distinct entity from a main display area 1351 of the table device's display screen, although the respective contents of the ad window and the main display area may be contextually related to one another. In particular, in some embodiments, ad content (an "ad") displayed in ad window 1350 may be contextually related to a media program, such as a TV show, being displayed on TV 1340 and/or to content being displayed on tablet device 1310 in the main display area 1351.

For example, in the exemplary embodiment shown in FIG. 14, ad window 1350 presents an advertisement from a cooking magazine while a cooking show is being played on TV 1340. In some embodiments, the user 116 may interact with the magazine ad that is displayed in ad window 1350. For example, clicking the "Subscribe Now" button in ad window 1350 may provide the user 116 with access to gifts or rewards (e.g., free gifts, gifts for subscribing, etc.) and/or subscribe the user 116 to the magazine. In some embodiments, the user may be presented with a separate web page in which the user may enter information to receive the rewards and/or subscribe to the magazine.

In some embodiments, information needed to complete the user interaction may be automatically obtained (e.g., in a "one-click" or "simple tap" manner) using information stored in a user profile of the user 116. For example, a server computing device (e.g., application server 110) having access to the user profile information may receive a signal from tablet device 1310 indicating that the user has clicked on the advertisement and wishes for the advertiser to complete the "simple tap" deal using information stored in the user profile, and the server computing device may be configured to provide the information from the user profile to the advertiser. In some embodiments, the user 116 may set privacy or security options that prohibit providing certain information from the user profile to all or certain types of advertisers or require additional confirmation from the user 116 (e.g., by way of a confirmation window displayed on tablet device 1310) that the user wishes to share the information before the information is shared with the advertiser. In some embodiments, the user profile may be stored on a memory accessible by the server computing device. In other embodiments, the user profile may be additionally or alternatively stored on a user viewing device, such as TV 1340 and/or tablet device 1310.

In various embodiments, advertisements presented in ad window 1350 may be determined based on a variety of different contextual information. For example, as displayed in the exemplary embodiment of FIG. 14, one or more advertisements may be based on and/or related to one or more characteristics of a TV show or other media program that is being displayed on TV 1340 and/or tablet device 1310, such as the subject matter of the media program (e.g., cooking, sports, news, history, music/arts, etc.), a category (e.g., drama, comedy, documentary, etc.) of the media program, viewing demographics or characteristics associated with the media program, etc. In another exemplary embodiment, one or more advertisements may be based on advertisements displayed within a media program. For example, an advertisement displayed in ad window 1350 on tablet device 1310 may be directed to the same product or service, same brand, same producer/seller/advertiser, similar category of product or service, etc. as an advertisement displayed in the media program on TV 1340.

In some embodiments, advertisements presented in ad window 1350 may additionally or alternatively be based on contextual information that is not directly related to the subject matter of the media program and/or any advertisements displayed therein. For example, one or more advertisements may be based on a time context (e.g., a current time and/or date, a time and/or date at which the media program being presented was originally broadcast, etc.). In some embodiments, one or more advertisements may be based on a geographic location of the user 116 (e.g., based on a geographic location of TV 1340 and/or tablet device 1310, or based on a geographic location manually provided by a user or stored in a user profile).

In some embodiments, advertisements presented in ad window 1350 may additionally or alternatively be based on information about user 116 stored in a user profile. For example, one or more advertisements may be based on demographic data associated with the user 116 (e.g., gender, age, race, mobility, home ownership, financial information such as income level, employment status and characteristics, location, etc.). In some embodiments, one or more advertisements may be based on historical data relating to the interaction of the user 116 and/or related contacts or users (e.g., family members of the user 116) with previously presented advertisements. For example, if the user 116 has previously expressed interest in advertisements for coffee-related items (e.g., by purchasing items presented in previous coffee-related advertisements, by clicking through previous coffee-related advertisements to web pages, etc.), one or more advertisements presented to the user 116 may be coffee-related advertisements.

In some embodiments, the user 116 may be enabled to specify certain privacy or security settings relating to information the user 116 wishes to shield from disclosure to an advertiser and/or from being used in determining advertisements to be presented to the user 116. The user may be enabled to provide such settings or options, for example, via an interface presented on one or both of TV 1340 and/or tablet device 1310. A server computing device (e.g., application server 110) having access to the user profile data may be configured to store the privacy settings in a memory and use the settings to determine various elements of user profile information that may be used in determining advertisements to present to the user 116 and/or what information may be provided to an advertiser (e.g., when a user clicks on an advertisement). In some embodiments, the user 116 may specify one or more types of user information elements in the user profile that may be disclosed and/or should be kept private, such as name, age, gender, geographic location, mailing address, email address, telephone number, financial data, data regarding family members and/or contacts, and/or other information that may be stored in a user profile or other information database associated with the user 116. In some embodiments, the user 116 may specify one or more classes of advertisers (e.g., local or national advertisers, advertisers in certain markets or industries, advertisers having one or more specified characteristics, etc.) and/or specific advertisers that should be granted or denied access to certain information elements of the user profile of the user 116.

In various embodiments, one or more advertisements presented in ad window 1350 may include interactive advertisements. For example, a user may be enabled to interact with the advertisement to cause one or more actions to occur. In some embodiments, user interaction with the advertisement may be via a simple tap on a portion of ad window 1350. By tapping on ad window 1350, the user may authorize a server computing system (e.g., application server 110) to perform one or more actions on the user's behalf, such as providing information from a user profile that is needed to complete a deal with an advertiser or provide points or rewards to the user 116. For example, in one embodiment, the user 116 may subscribe to an email list, magazine, etc. by clicking on an advertisement. In another exemplary embodiment, the user 116 may be provided with rewards points (e.g., in a reward program offered by the advertiser in which the user 116 may be granted exclusive information or content, be provided with gifts based on advertising activity and/or purchases, etc.), gifts, discounts or coupons, etc. after clicking an advertisement. In some embodiments, the benefits may be provided automatically to the user after a simple tap using information such as the mailing address or email address of the user 116 stored in a user profile. In some embodiments, clicking on the advertisement may cause a web page to be opened in a browser on TV 1340 and/or tablet device 1310. In some embodiments, a game or other type of interactive activity may be provided (e.g., in a pop-up window) on TV 1340 and/or tablet device 1310 in response to the user 116 clicking on the advertisement.

In some embodiments, interaction with advertisements presented on one device (e.g., tablet device 1310) may cause actions to be performed on one or more other devices. For example, clicking on an advertisement in ad window 1350 may cause a coupon to be transmitted (e.g., through a server computing device, such as application server 110) to another device, such as a mobile computing device (e.g., cellular phone or smartphone). The mobile computing device may have a coupon application in its memory that is configured to store the coupon and present the coupon at a place of business to apply the discount to a purchase. In another exemplary embodiment, interaction with an advertisement in ad window 1350 may cause a media program (e.g., a program having restricted access available through the advertisement) to be displayed on TV 1340.

The user 116 may use any of the TV controls 1314 (e.g., pause/play, volume up/down, traditional TV channel up/down, fast forward, rewind, mute, TV on/off, etc.) for controlling TV 1340 from tablet device 1310. In some embodiments, a signal may be sent from tablet device 1310 to a server computing device (e.g., application server 110) indicating that a control command has been received using TV controls 1314, and the server computing device may in turn transmit a signal to TV 1340 and/or a set top box associated with TV 1340 to cause TV 1340 to take the appropriate action. The user 116 may additionally or alternatively use one or more content selection buttons 1399 to select content to be displayed on TV 1340 and/or tablet device 1310. Pressing content selection buttons 1399 may cause a content selection display to be shown on tablet device 1310 configured to present the user 116 with different available content options, such as TV shows currently available on traditional TV channels, streaming video available from streaming content providers, and/or other types of content. Selection of a content source in the content selection display may cause the content to be displayed on TV 1340 and/or tablet device 1310. In some embodiments, selection of a content source may cause information relating to the content source, such as a preview of the content, to be displayed on tablet device 1310.

Further, user 116 may select a certain "Simul-Stream" button 1360 to play the TV show on both TV 1340 and tablet device 1310. In various embodiments, "Simul-Stream" button 1360 may be used to display the TV show on both TV 1340 and tablet device 1310 (e.g., simultaneously, in synchronization, etc.) and/or to swap the content displayed on TV 1340 and tablet device 1310, such that some or all of the content previously displayed on TV 1340 (e.g., the TV show) is displayed on tablet device 1310 after "Simul-Stream" button 1360 is pressed and some or all of the content previously displayed on tablet device 1310 (e.g., a chat interface) is displayed on TV 1340 after "Simul-Stream" button 1360 is pressed. In some embodiments, a server computing device may be used to coordinate mirroring or swapping of content, for example, by receiving a signal indicating that "Simul-Stream" button 1360 has been pressed and transmitting signals to TV 1340 and/or tablet device 1310 causing the devices to display appropriate content based on the action associated with "Simul-Stream" button 1360.

In various exemplary embodiments, media programming, advertising content, and/or other types of information may be provided on any types of user viewing devices and are not limited to only a TV and/or tablet device. For example, user viewing devices that may be used to present programming and/or information to a user include, but are not limited to: a desktop computer; a laptop computer; a tablet computer; a net-book computing device; a handheld computing device; a personal digital assistant; an enterprise digital assistant; a portable digital assistant; a telecommunications device including one of a telephone, a cell phone, and a smart phone; a personal navigation device; a vehicle-based device; an optical disk player; a television; a game console; a set top box; etc.

In some exemplary embodiments, a server computing system (e.g., application server 110, using PID application 112) may be configured to provide content to be displayed on TV 1340 and/or tablet device 1310 (e.g., media programming, ad content, program-related information, etc.). For example, a server system may be configured to provide media programming to be displayed on TV 1340 (e.g., streaming video available on the Internet and/or from a streaming video service provider). In some such embodiments, the server system may be configured to determine that the media program is currently being presented on TV 1340 based on the fact that the server system has provided and/or is currently providing a signal representing the media program to TV 1340.

In some exemplary embodiments, TV 1340 and/or tablet device 1310 may additionally or alternatively receive content for display to user 116 from a source other than the server system (e.g., a cable television service, directly from a streaming video service or website, etc.). For example, TV 1340 or a set top box associated with TV 1340 may receive television programming via a direct connection to a cable or satellite television service. In some such embodiments, the server system may be configured to determine that a media program is currently being presented on TV 1340 based on a signal and/or data provided by TV 1340 and/or a set top box associated with TV 1340 to the server system. For example, in some embodiments, TV 1340 and/or a set top box associated with TV 1340 may be configured to transmit data to the server system identifying content that is currently being presented on TV 1340, such as an identification of television programming being viewed on a particular traditional TV channel. In some embodiments, TV 1340 and/or a set top box associated with TV 1340 may be configured to identify a particular content source being viewed (e.g., by a traditional TV channel number or description), and the server system may be configured to use other information, such as an electronic channel or program guide, to determine what content is being played on the identified content source.

Figure 15:
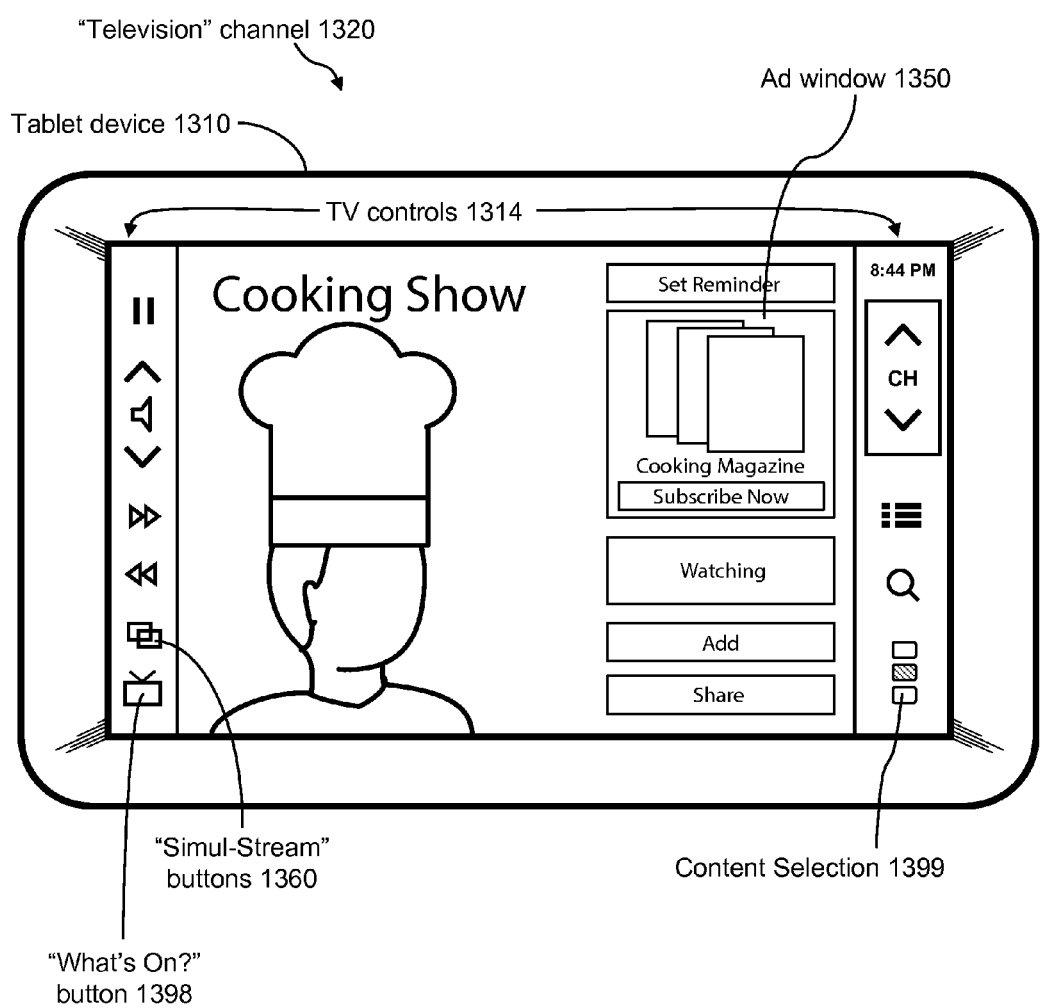

FIG. 15 shows that the user 116 may decide to switch to another show. Therefore, the user 116 touches the channel up/down control to locate a drama TV show.

Figure 16:
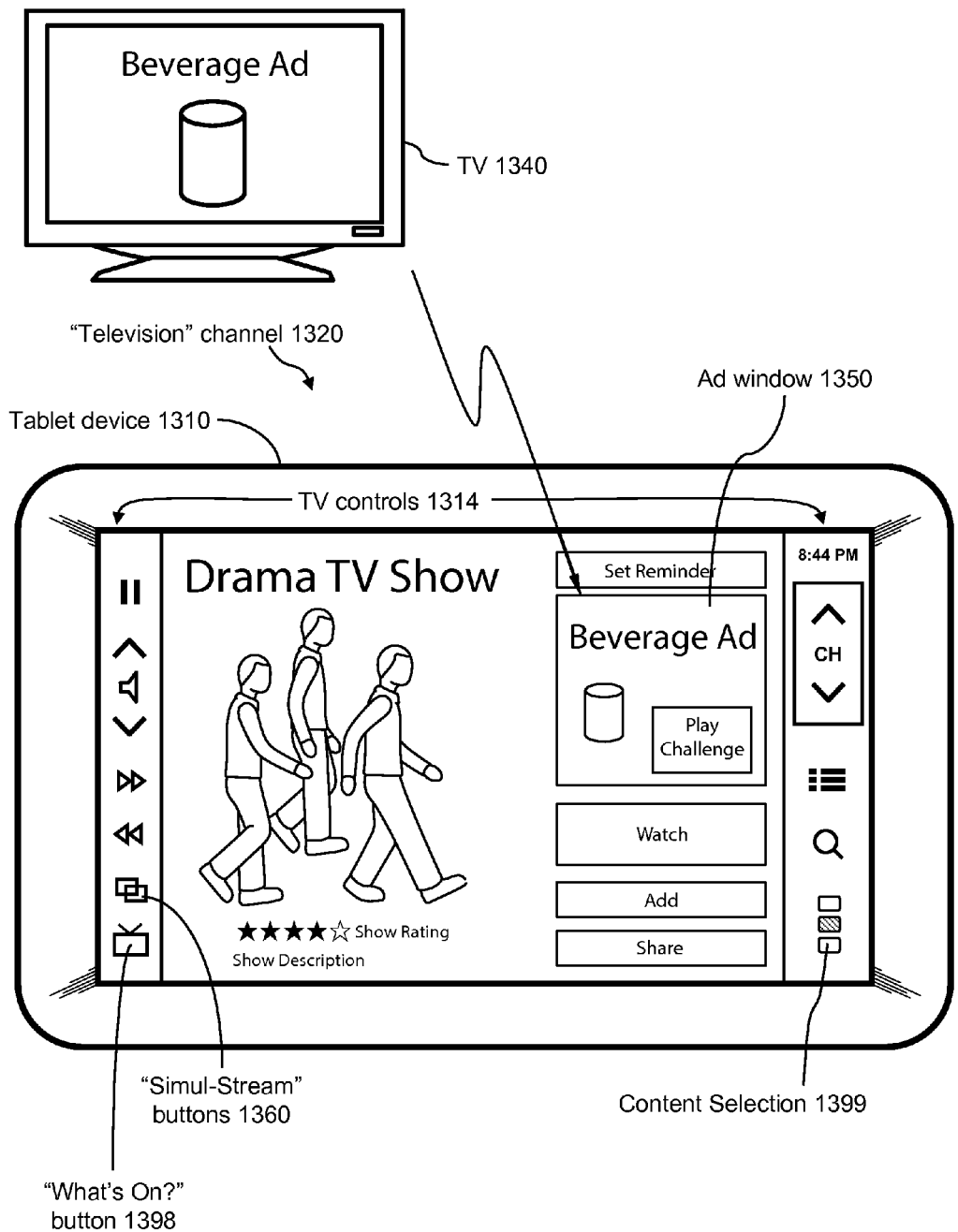

FIG. 16 shows that the user 116 may decide to watch a drama TV show instead. As a result, episode information for the drama TV show is displayed on tablet device 1310, while the TV show is playing at TV 1340. FIG. 16 also shows that a beverage ad is playing on TV 1340. By querying the metadata associated with the digital TV broadcast, PID application 112 is able to detect (1) that a commercial is playing on TV 1340 and (2) that the ad content is about beverage. Therefore, other beverage ad information may be displayed in ad window 1350 at tablet device 1310 substantially concurrently to the beverage ad running on TV 1340. This is an example of the synchronization feature of PID application 112, which may be performed using stream sync server 636 of PID application architecture 600 of FIG. 6.

Figure 17:
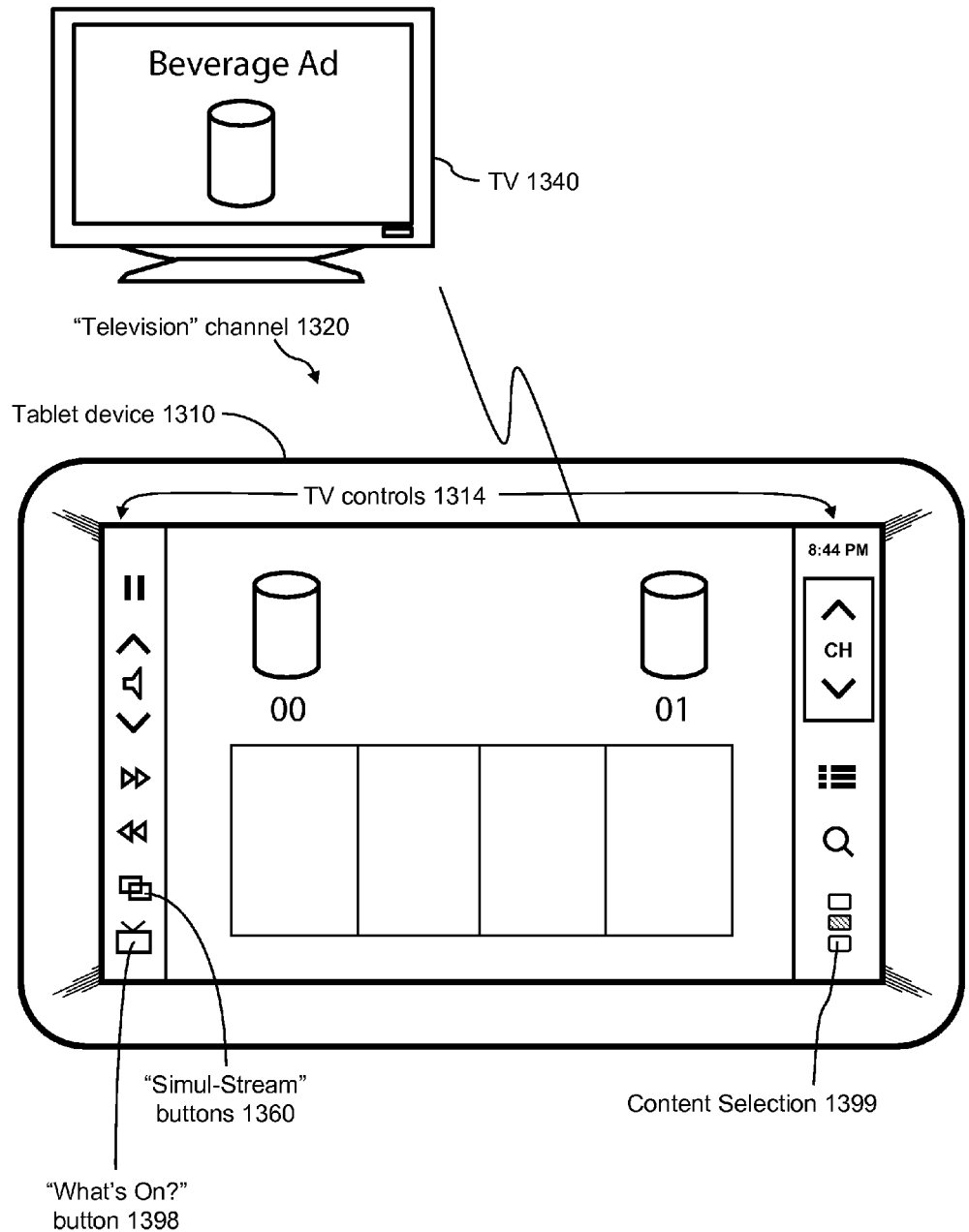

Referring again to FIG. 16, the user 116 may choose to pause the TV show from tablet device 1310 and interact with the beverage ad in ad window 1350. For example, the user 116 touches the "Play Challenge" text in ad window 1350 and the game is then launched and displayed as shown in FIG. 17. This is an example of user interaction with information that is delivered by information delivery system 100 to the user 116 on a user device 118. More specifically, this is an example of interactive ads and games.

Figure 18:
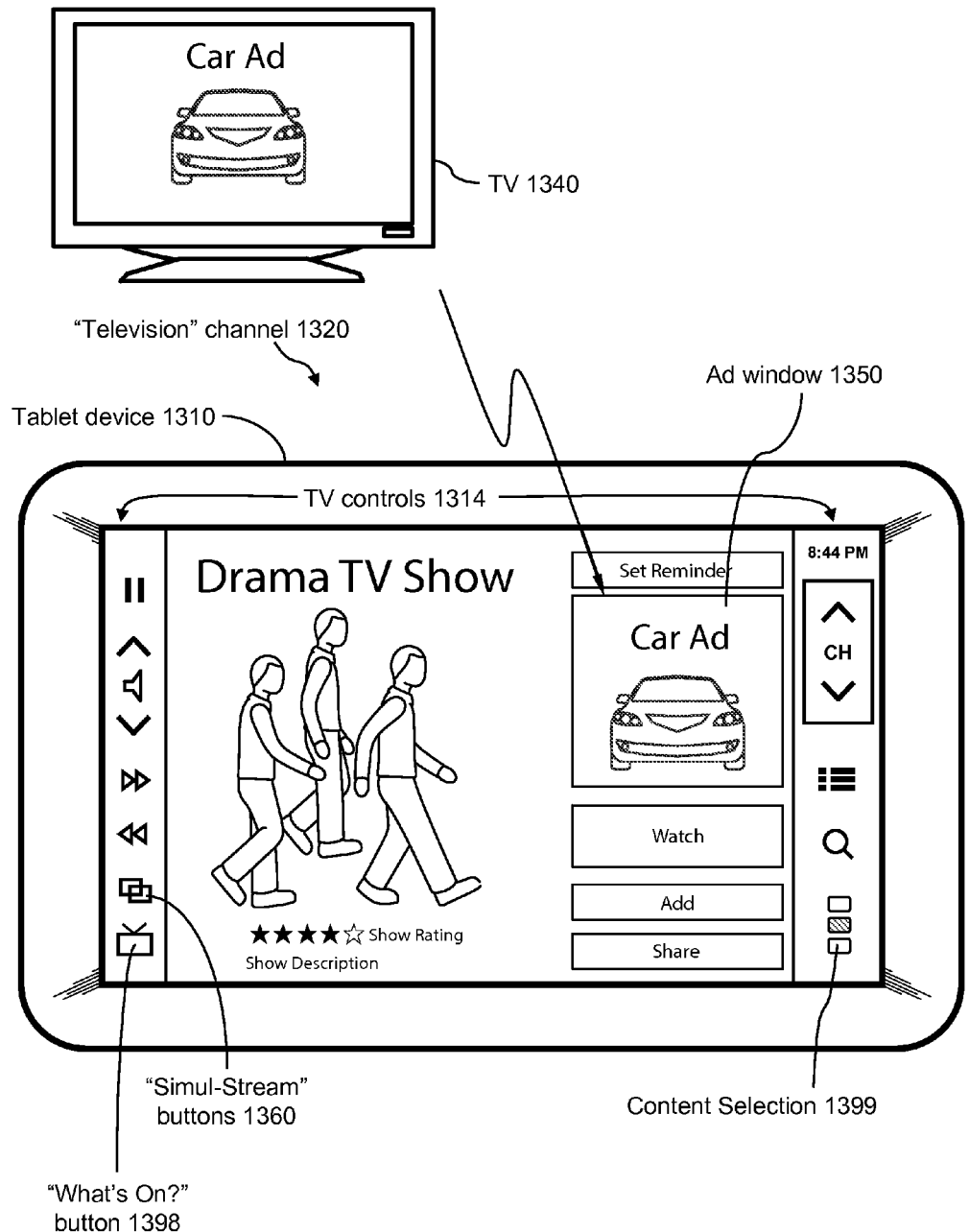

FIG. 18 shows that the user 116 may finish playing the game and decide to resume watching the drama TV show on TV 1340. Again, episode information is displayed on tablet device 1310. FIG. 18 also shows that a car ad is playing on TV 1340. Again, PID application 112 is able to detect (1) that a commercial is playing on TV 1340 and (2) that the ad content is about car. In this example, while a national car ad is playing on TV 1340, a local car dealer ad information may be displayed in ad window 1350 substantially concurrently to the car ad running on TV 1340. This is another example of the synchronization feature of PID application 112, which may be performed using stream sync server 636 of PID application architecture 600 of FIG. 6. More specifically, this is an example of synchronizing a local ad in the ad window 1350 at tablet device 1310 with a content-related national ad playing on TV 1340. Referring again to FIGS. 13 through 39, "Television" channel 1320 demonstrates that an aspect of the present invention is that PID application 112 may facilitate presentation of synchronized ad information.

Figure 19:
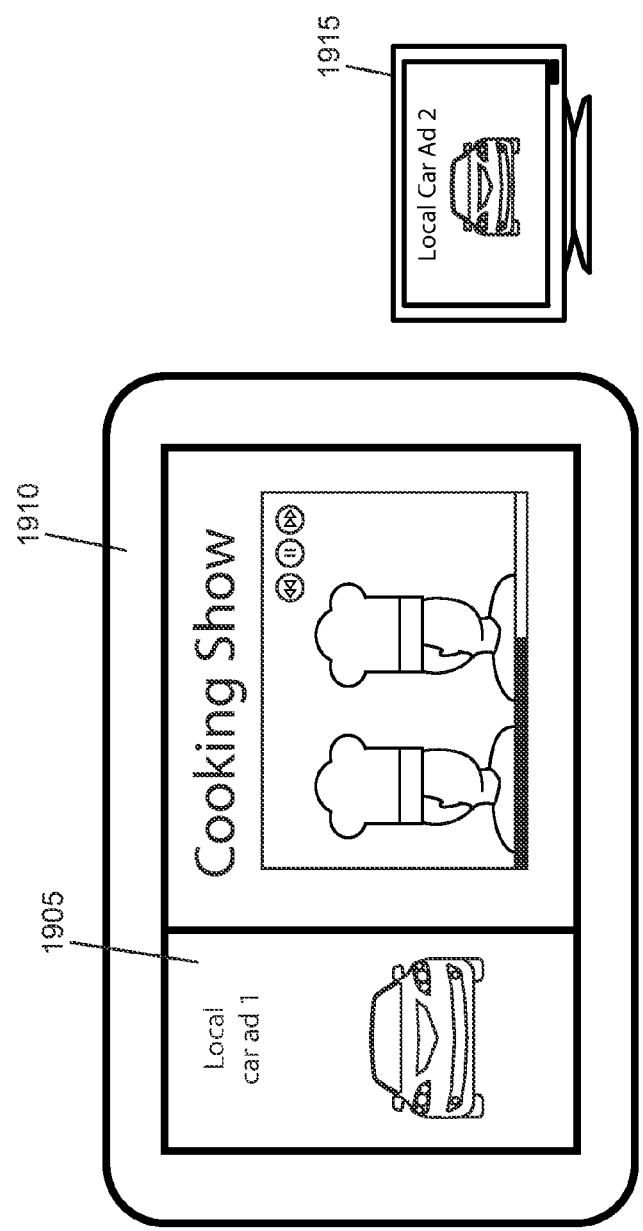
Figure 20:
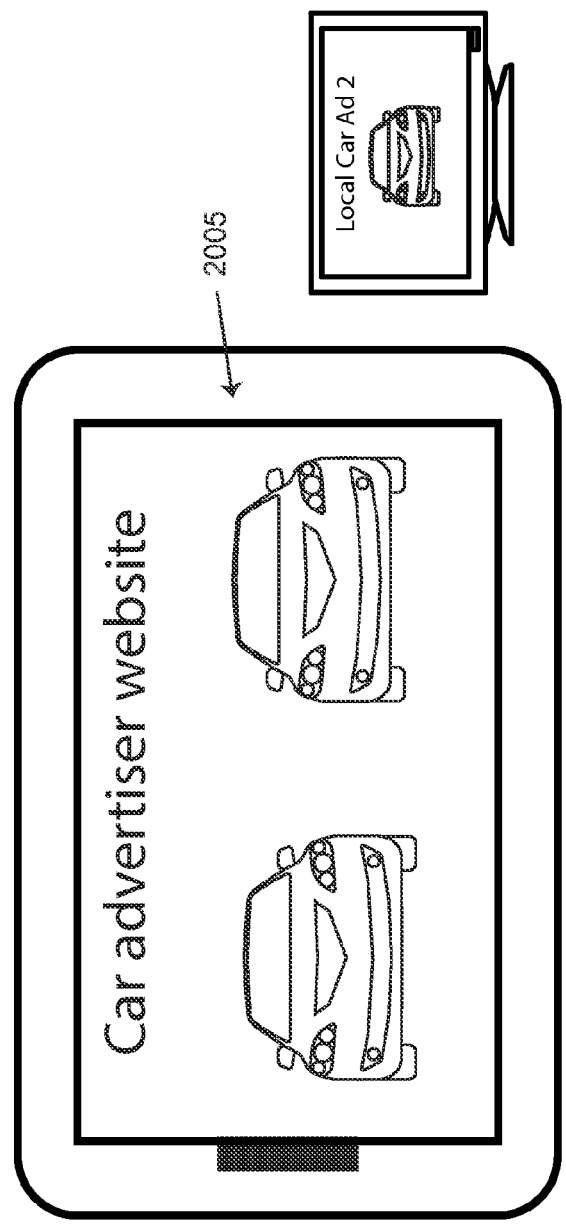

FIG. 19 illustrates another exemplary embodiment in which local advertisements 1905 may be displayed on TV 1340 and/or tablet device 1310. In the illustrated exemplary embodiment, a first local advertisement 1910 is displayed on tablet device 1310 and a second local advertisement 1915 is displayed on TV 1340. In one exemplary embodiment (e.g., as shown in FIG. 20), clicking on a button in advertisement 1910 may cause a web page of the advertiser to be displayed on tablet device 1310 (e.g., in a browser application or window). In other exemplary embodiments, clicking advertisement 1910 may result in different actions as described herein according to various exemplary embodiments.

Figure 21:
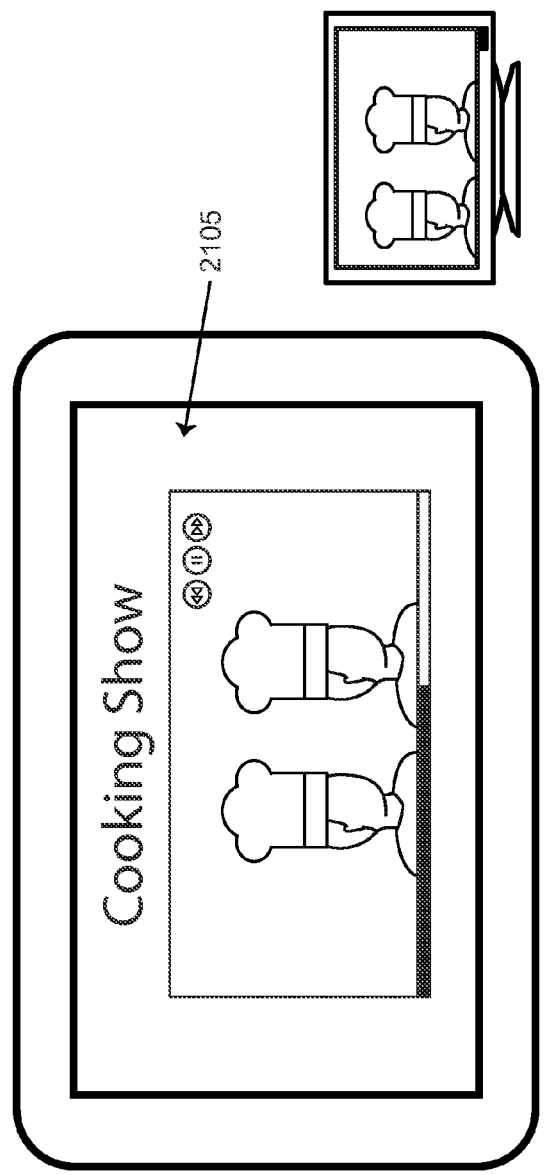

FIG. 21 illustrates an example of a mirroring action that may occur after tapping "Simul-Stream" buttons 1360, according to an exemplary embodiment. In FIG. 21, the media program previously shown only on TV 1340 is now displayed on both TV 1340 and tablet device 1310 (e.g., in synchronization). In some embodiments, the user 116 may be enabled to pause content shown on one device and play it on the other device after the media program has been mirrored. The user 116 may use interface buttons 2105 to revert back to the previous display mode, such that the content that was previously displayed on tablet device 1310 or a default content will be displayed on tablet device 1310 once again instead of the media program. In some embodiments, one or more of "Simul-Stream" buttons 1360 may cause the content displayed on TV 1340 and tablet device 1310 to swap.

Figure 22:
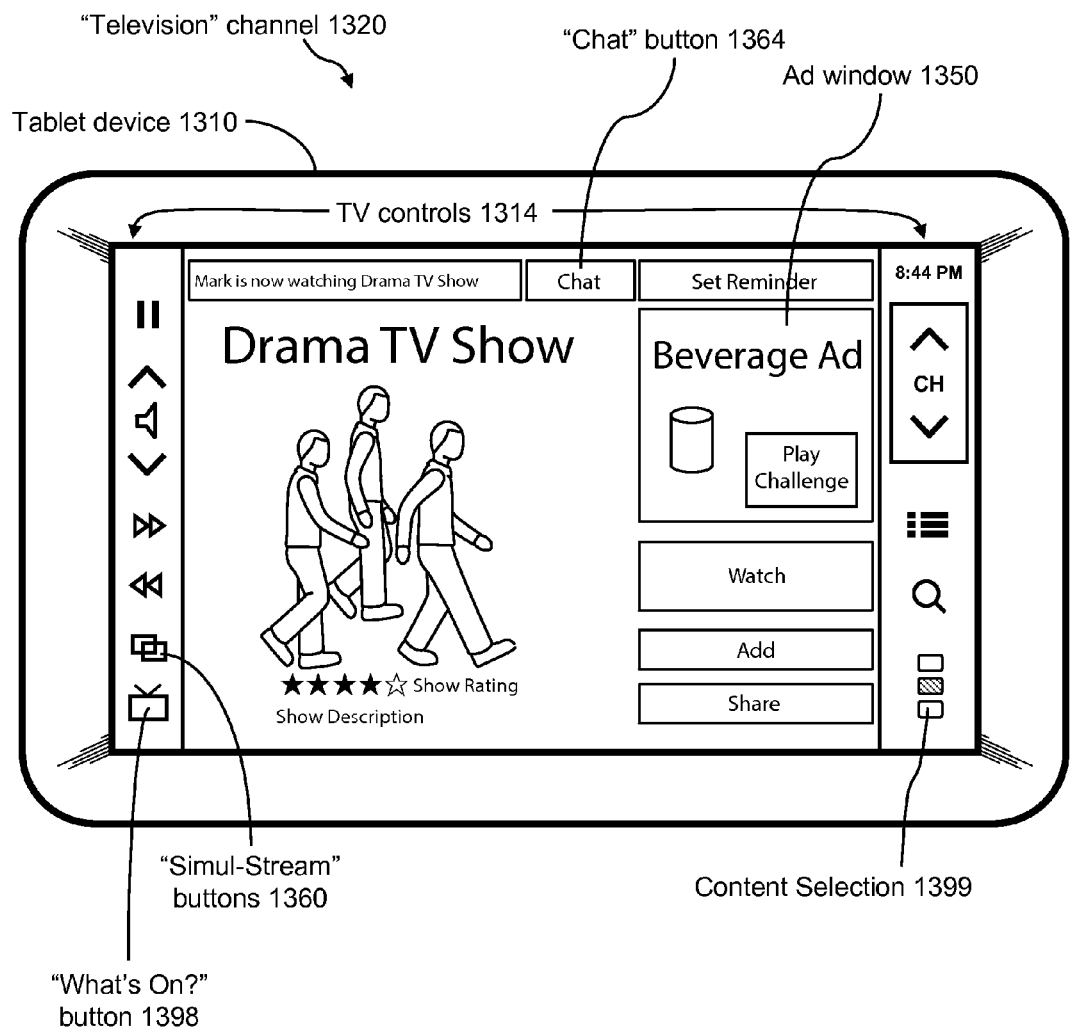

FIGS. 22 through 39 illustrate various social features of "Television" channel 1320 according to various exemplary embodiments. For example, FIG. 22 shows that an alert notification appears on the display of tablet device 1310. The alert notification is informing the user 116 that a friend is also watching a drama TV show. This is an example of the configuration server 654, eventing and alerting subsystem 652, and session manager 656 of PID application 112 working together to determine whether an event has occurred that may trigger an alert of the user 116, then to determine whether the user 116 has an active session and at what user device 118, and then to determine the preferred alert notification method. This is an example of the eventing and alerting features of PID application 112.

Figure 23:
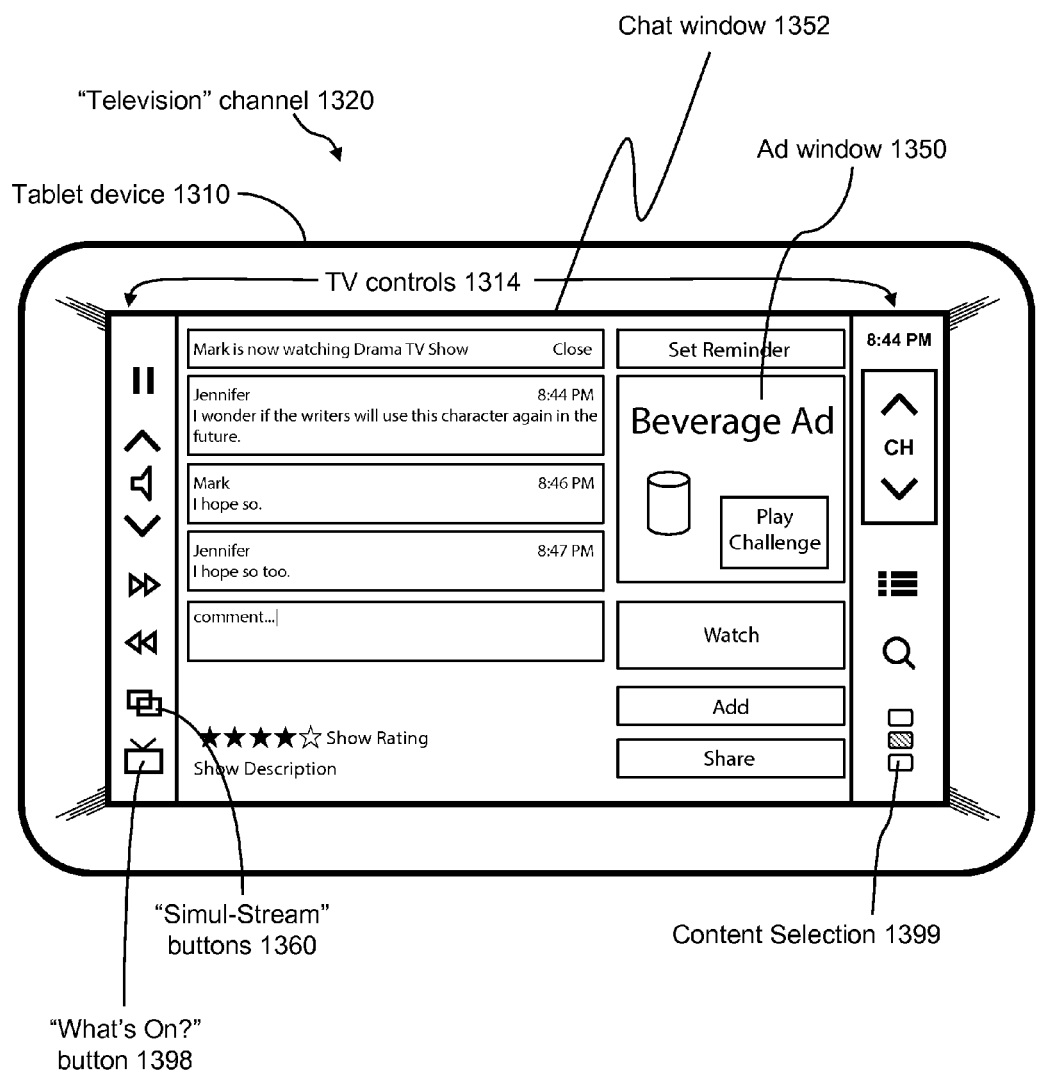

The user 116 may touch a "Chat" button 1364 to launch a "Social" component of "Television" channel 1320, as shown in FIG. 23. For example, FIG. 23 shows a chat window 1352 that may display a list of the friends of user 116. The one or more friends that are watching the same TV show as the user 116 may be indicated to the user 116 by, for example, a color bar. Additionally, a show discussion may appear in the chat window 1352.

In the exemplary embodiment illustrated in FIG. 23, the users are chatting via a text chat function. In some embodiments, users may additionally or alternatively be able to interact with one another in other manners, such as via video chat (e.g., a virtual video conference, such as by using camera devices included in or communicatively coupled to tablet devices, TVs, or other computing and/or media devices of the users), audio chat (e.g., using microphones included in or communicatively coupled to tablet devices, TVs, smartphones, or other computing and/or media devices of the users), and/or in other manners. In some embodiments, users may be enabled to swap content between tablet device 1310 and TV 1340 (e.g., using "Simul-Stream" buttons 1360) to enable easier viewing of content previously presented on tablet device 1310 (e.g., during a video chat session).

Figure 24:
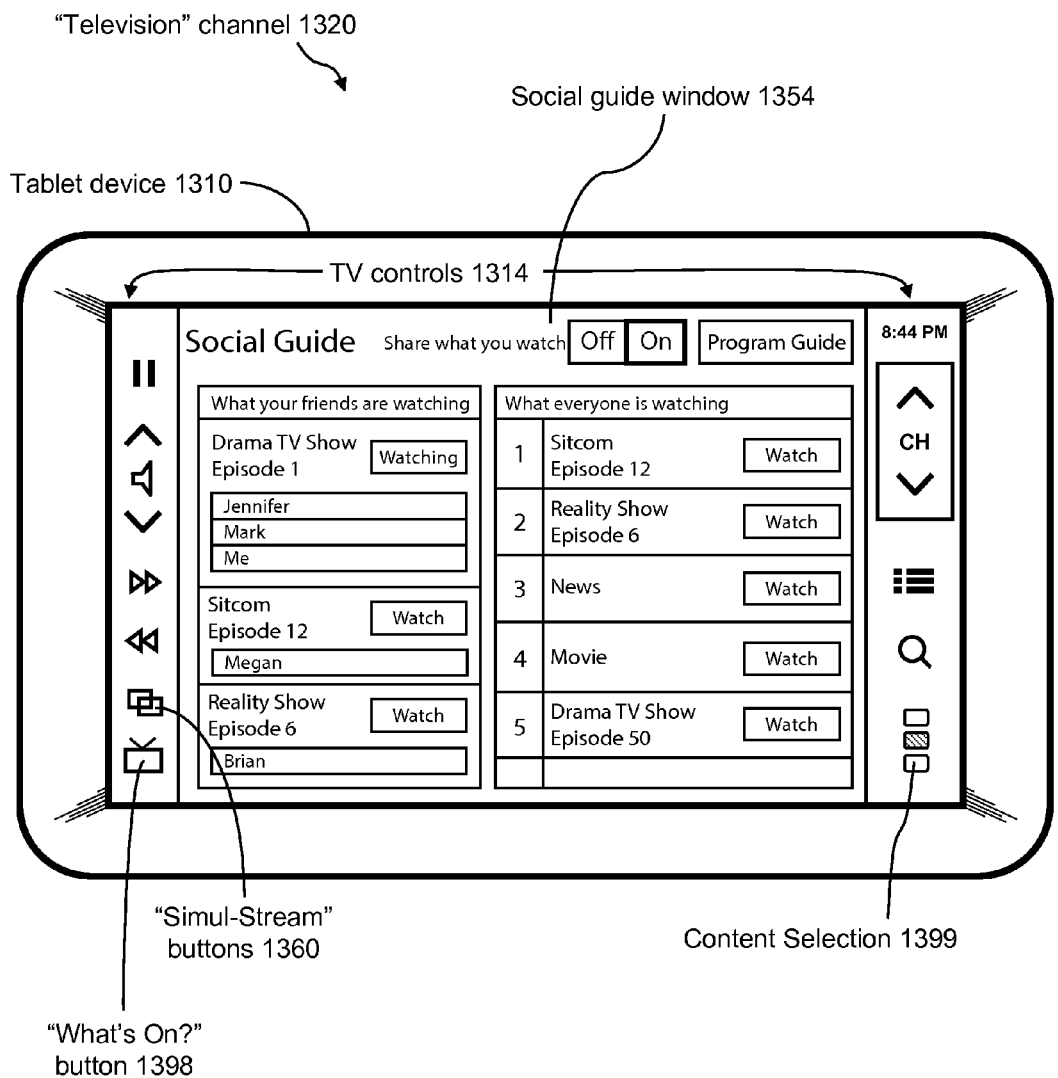
Figure 25:
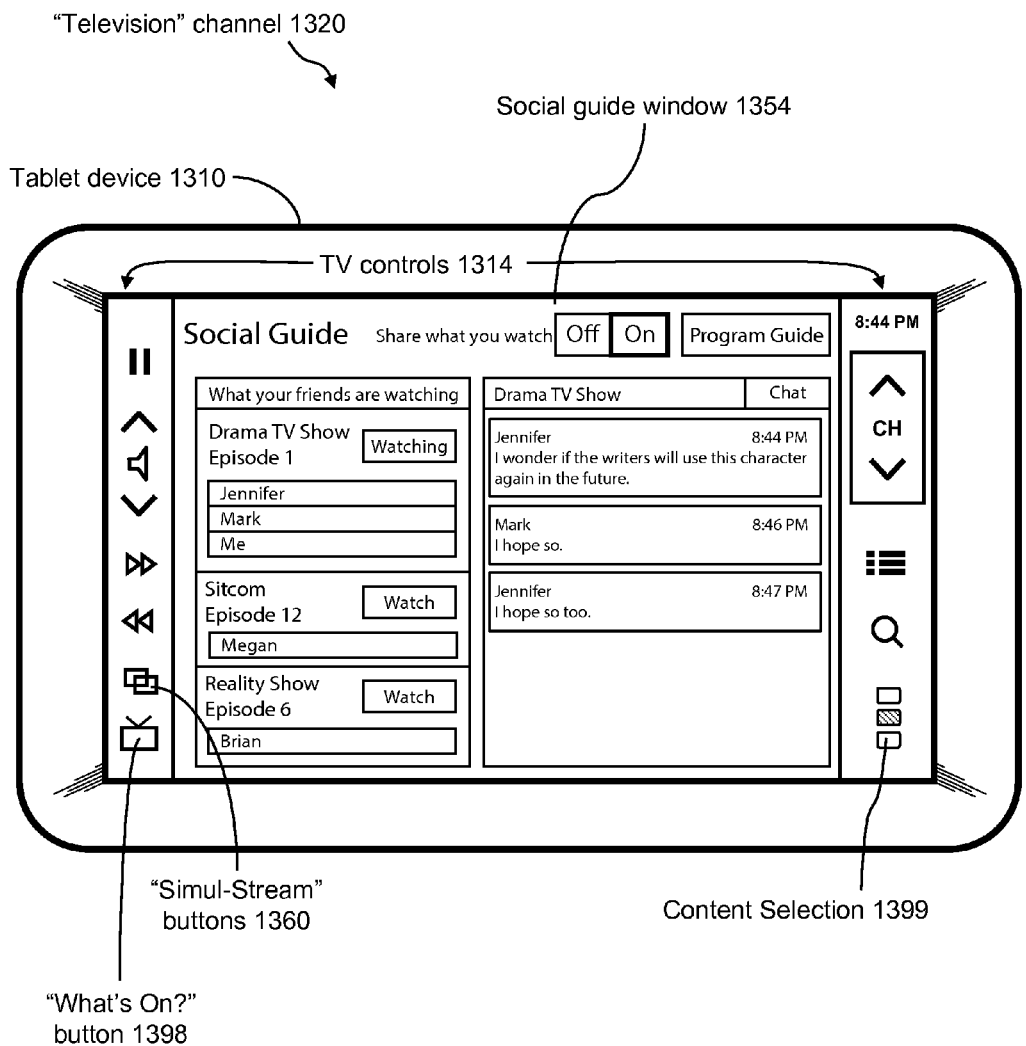

FIG. 24 shows that the user 116 may decide to look at a Social Guide that is displayed in social guide window 1354. For example, the social guide window 1354 may display what all of user 116's friends are watching as well as what everyone else is watching. FIG. 25 shows that the user 116 may access the TV show as well as chat from the social guide window 1354. This is an example of channels of PID application 112 providing users the ability to take action upon receiving an alert. That is, PID application 112 provides actionable eventing and alerting capability. For example, the user 116 responds to the alert by selecting the Social Guide and chatting with his/her friend.

Figure 26:
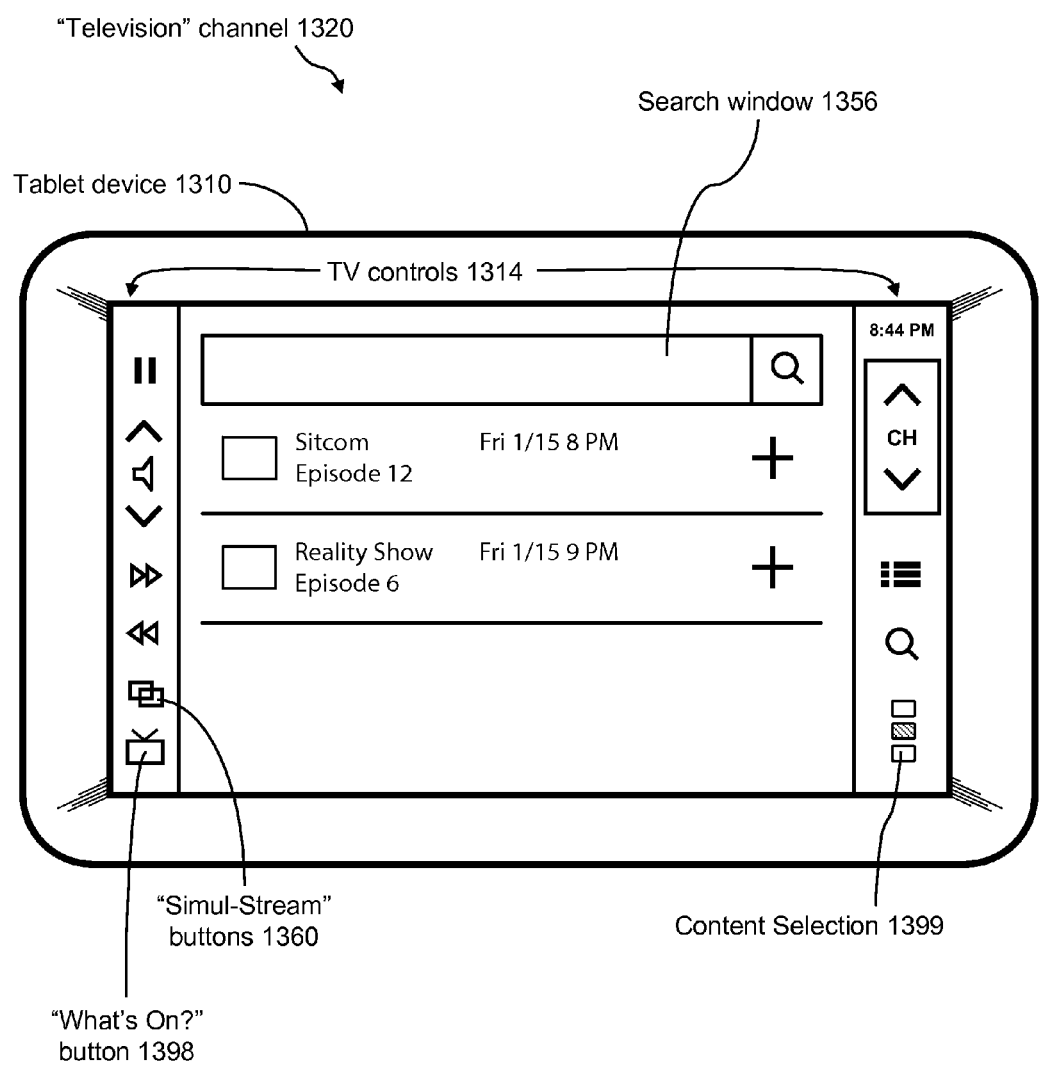

FIG. 26 shows a search feature of "Television" channel 1320. For example, FIG. 26 shows a search window 1356 by which the user 116 may enter the name of a TV show and the airing days and times for that TV show may be displayed at tablet device 1310.

Figure 27:
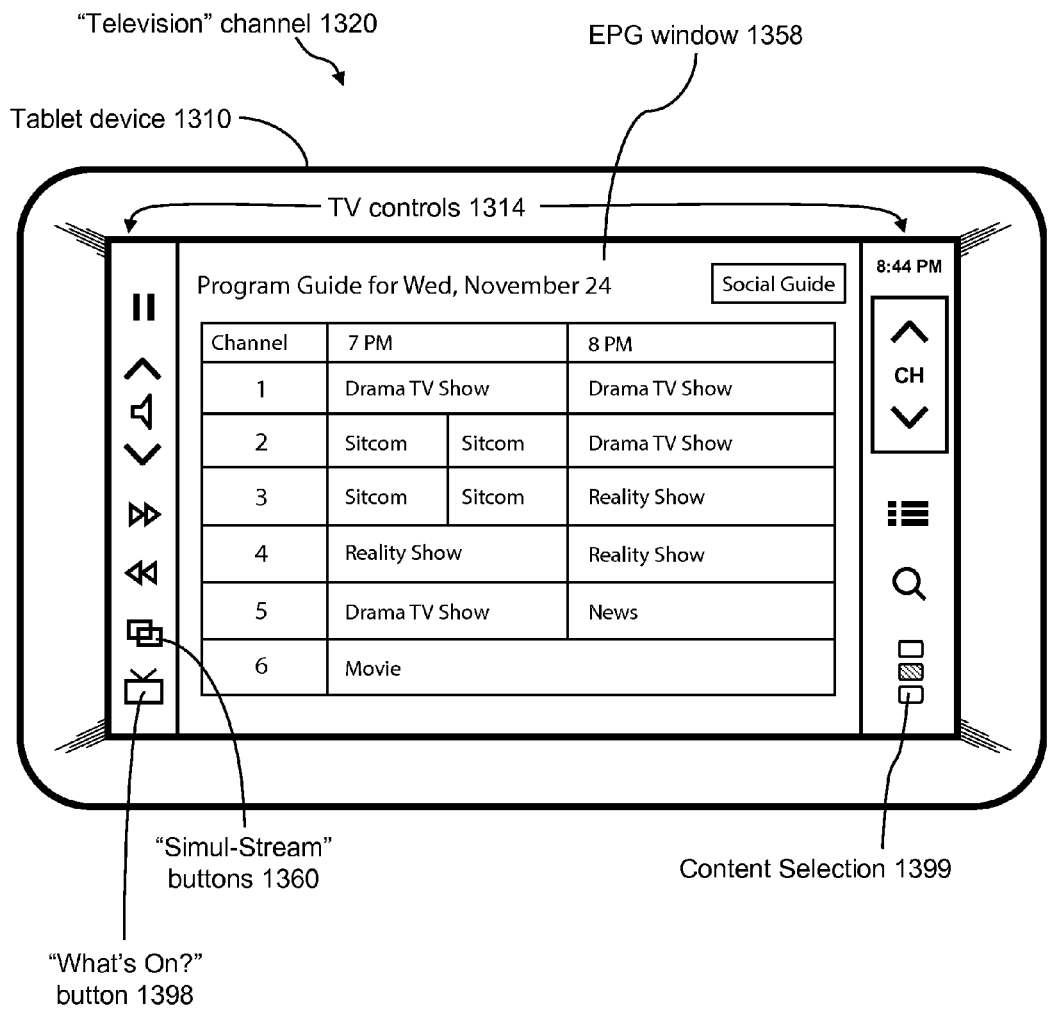

FIG. 27 shows the electronic programming guide (EPG) feature of "Television" channel 1320. For example, the user may select the programming guide and the TV service provider appears in an EPG window 1358. The program listings for certain traditional TV channels for the current day and time slot are displayed. The user 116 may scroll to other pages of the programming guide.

Figure 28:
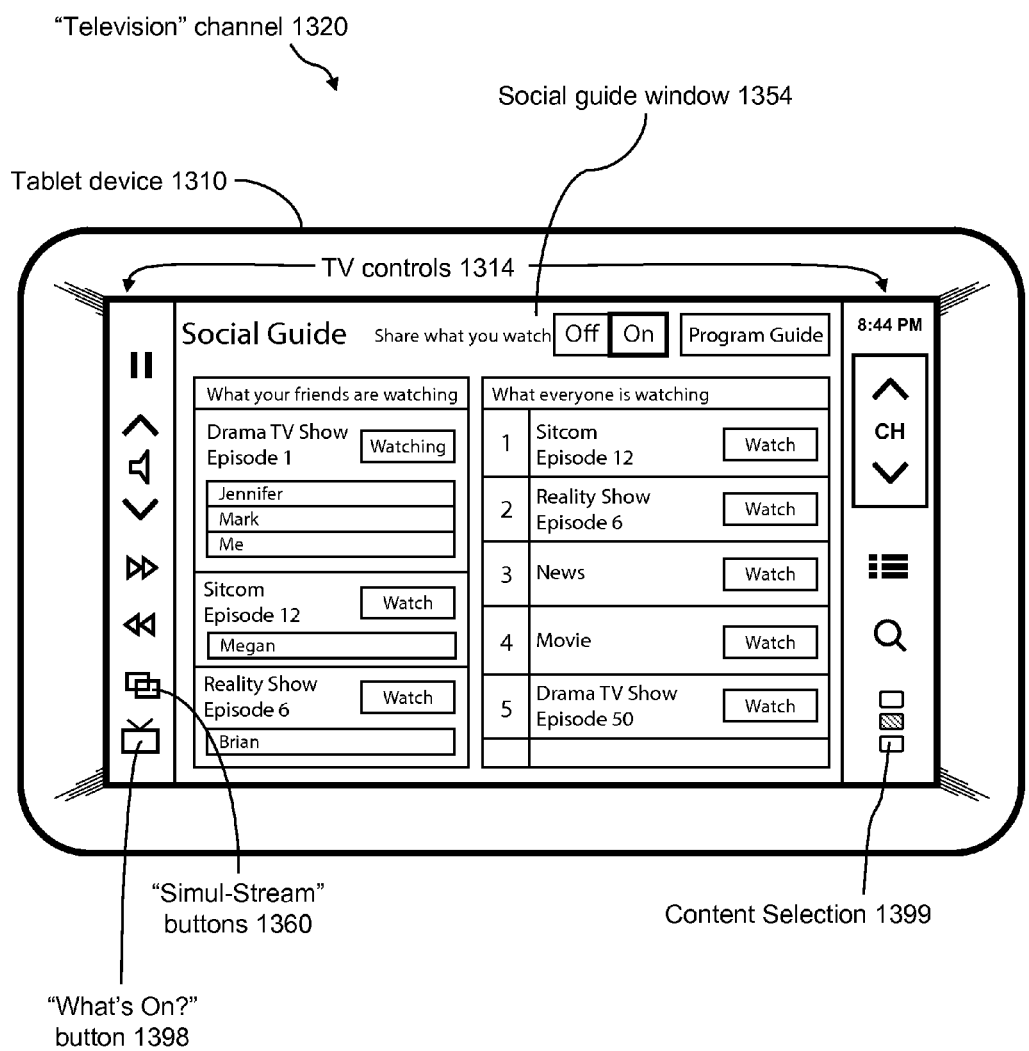

FIG. 28 shows that the user 116 may return to the Social Guide, which is displayed in social guide window 1354, and then decides to watch the sitcom TV show.

Figure 29A:
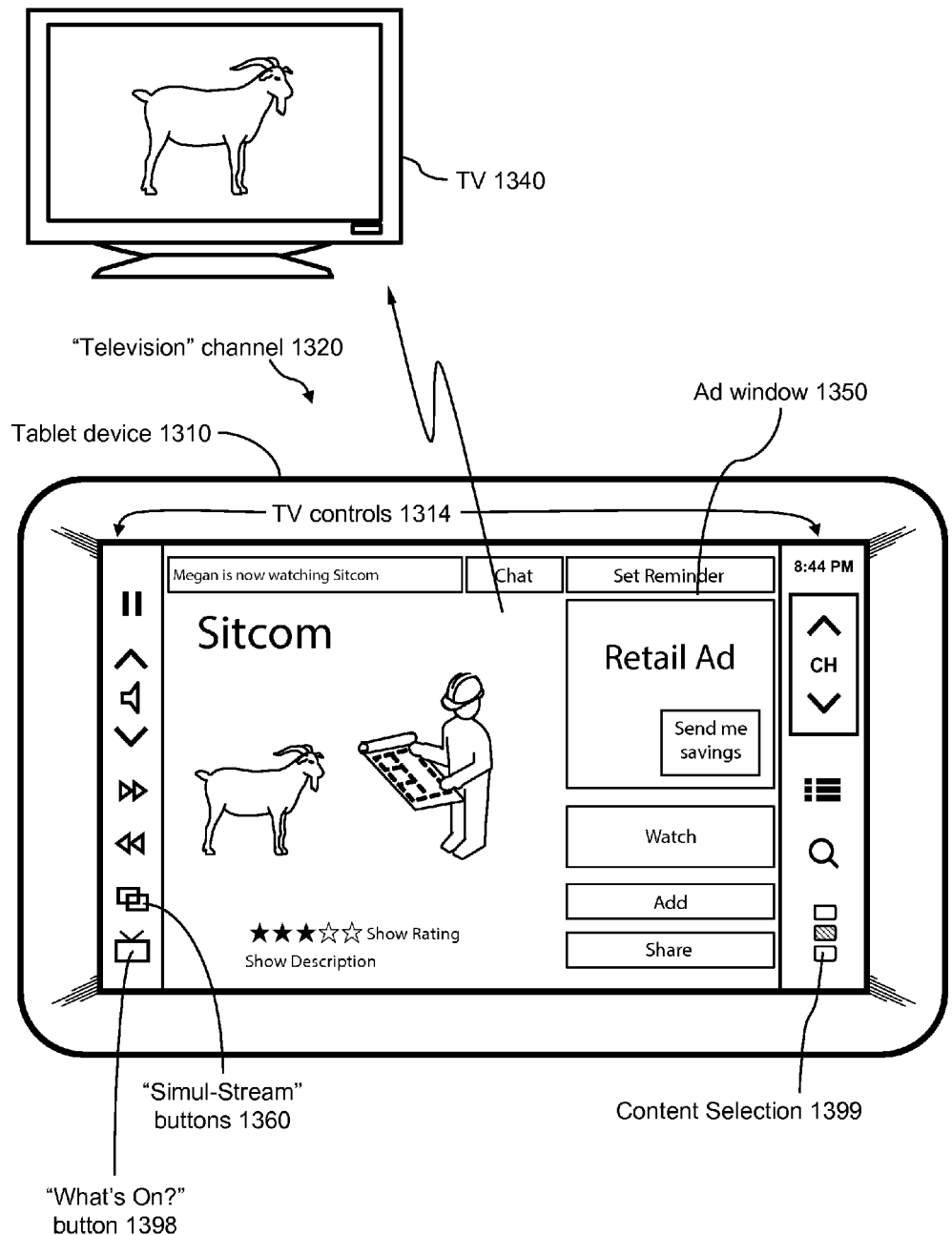

FIG. 29A shows that the user 116 is watching the sitcom on TV 1340, while episode information is displayed on tablet device 1310. FIG. 29A also shows an alert that another friend is also watching the sitcom.

FIGS. 29B through 29L illustrate screenshots of user interfaces that may be used to allow two or more users to interact with one another, according to exemplary embodiments. For ease of discussion, the various exemplary embodiments illustrated in FIGS. 29B through 29L will be referred to collectively herein as part of a "GetTogether" environment or session. However, it should be understood that, in various exemplary embodiments, various features described with respect to FIGS. 29B through 29L may be used in conjunction with any other exemplary embodiments discussed in the present disclosure, regardless of whether or not those embodiments are part of the exemplary GetTogether environment discussed herein.

Figure 29B:
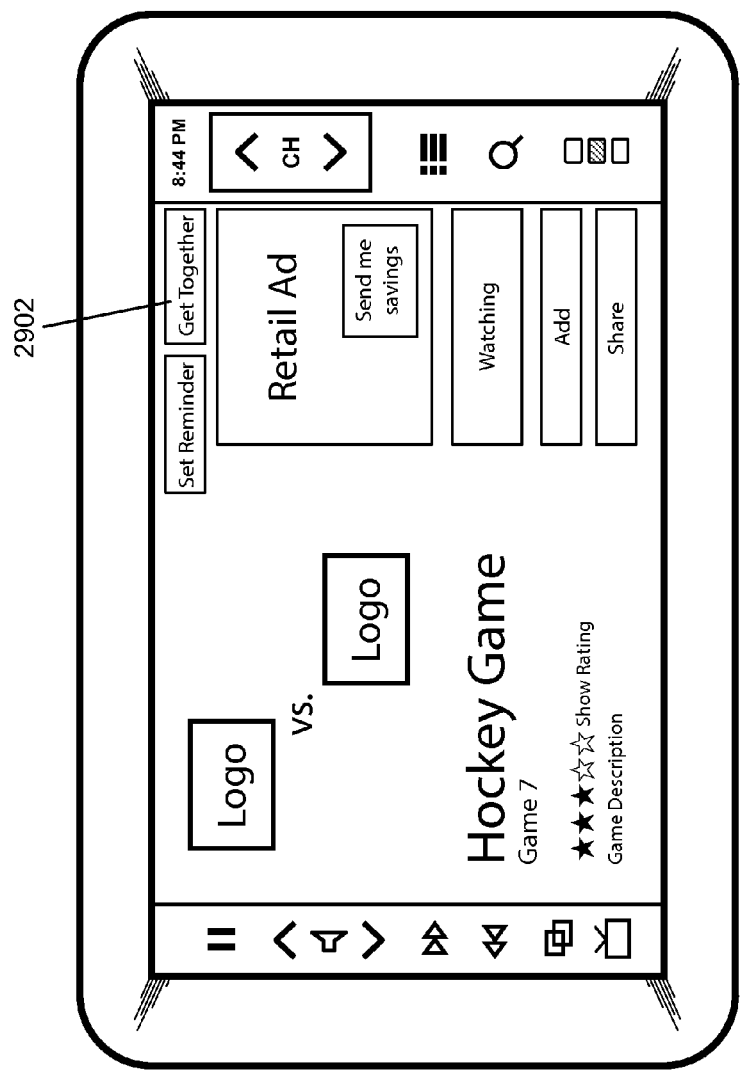

FIG. 29B illustrates one embodiment of a primary information screen that may be displayed, for example, in response to a user 116 pressing "What's On" button 1398 on tablet device 1310. In some embodiments, the user 116 may be enabled to enable a GetTogether session (e.g., an interface or environment through which the user 116 can interact with other co-users in various ways) by selecting a GetTogether button 2902.

Figure 29C:
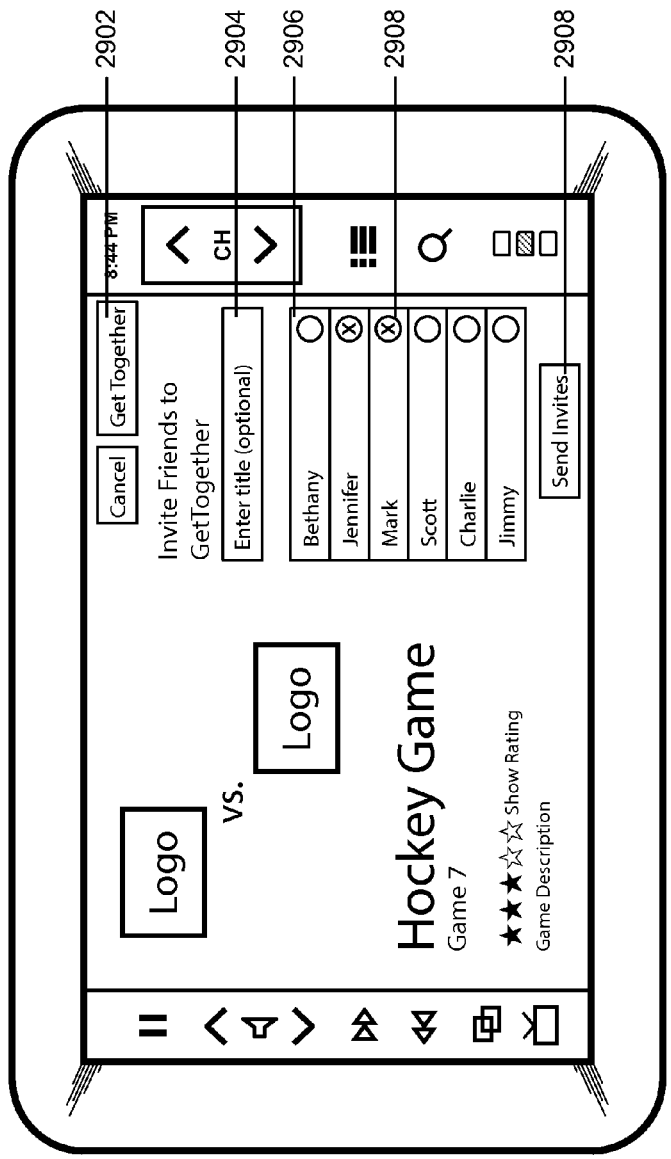

FIG. 29C illustrates an exemplary interface that may appear after the user 116 has selected GetTogether button 2902. The interface illustrated in FIG. 29C may enable the user 116 to select which co-users the user 116 wishes to invite to participate in the GetTogether session and send invites to the co-users. A GetTogether title field 2904 may be used to provide a title for the GetTogether session. One or more contacts 2904 of the user 116 that the user 116 may wish to invite to participate in the GetTogether session may be displayed, and the user 116 may be enabled to use tablet device 1310 to select the desired users for the GetTogether session (see, e.g., selected contacts 2908). In some embodiments, contacts 2904 may include co-users that are currently watching the same media program as the user 116. In other embodiments, contacts 2904 may include any co-users who are contacts of the user 116 without regard to whether they are watching the same media program as the user 116. In some embodiments, the number of contacts the user 116 is allowed to invite may be limited (e.g., four). In some such embodiments, the limit may vary based on a particular type of event or media program associated with the GetTogether session. For example, if the GetTogether session is based around a special event such as the NFL Super Bowl, the maximum number of participants may be increased (e.g., 25). Invitations may be sent to the other co-users after the user 116 selects a send invites button 2910.

Figure 29D:
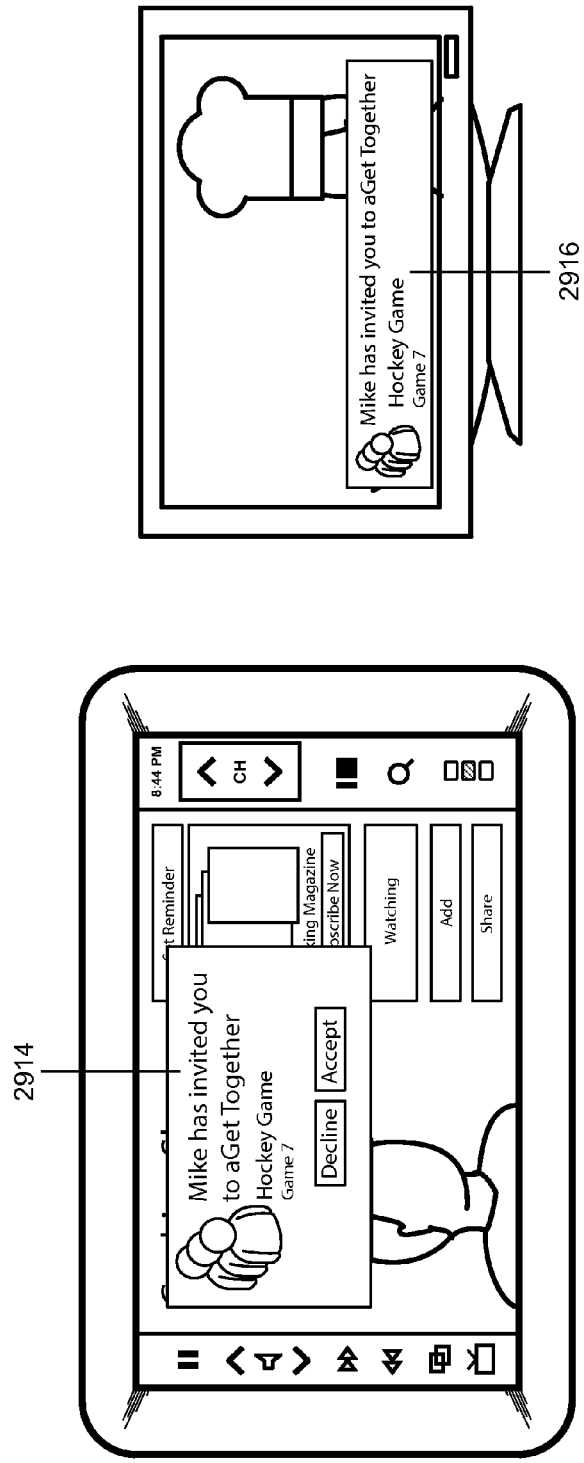

FIG. 29D illustrates notifications that may be provided to the co-users after the user 116 invites the co-users to participate in the GetTogether session. Notifications may be provided on one or more devices of the co-users to inform them that the user 116 has invited them to participate in the Get-Together Session. For example, in one embodiment, a first GetTogether notification 2914 may be provided on a tablet device of a co-user, and a second GetTogether notification 2916 may be provided on a TV of the co-user. Providing notifications on multiple devices may help ensure that the co-user is informed of the invitation if the co-user is away from one of the devices. In some embodiments, one or more of the notifications may provide options to accept the invitation, in which case a GetTogether interface may be provided, or decline the invitation, in which case the invitation may be removed from the co-user's display and/or a notification may be sent to the inviting user 116 informing the user that the invited co-user has declined the invitation.

Figure 29E:
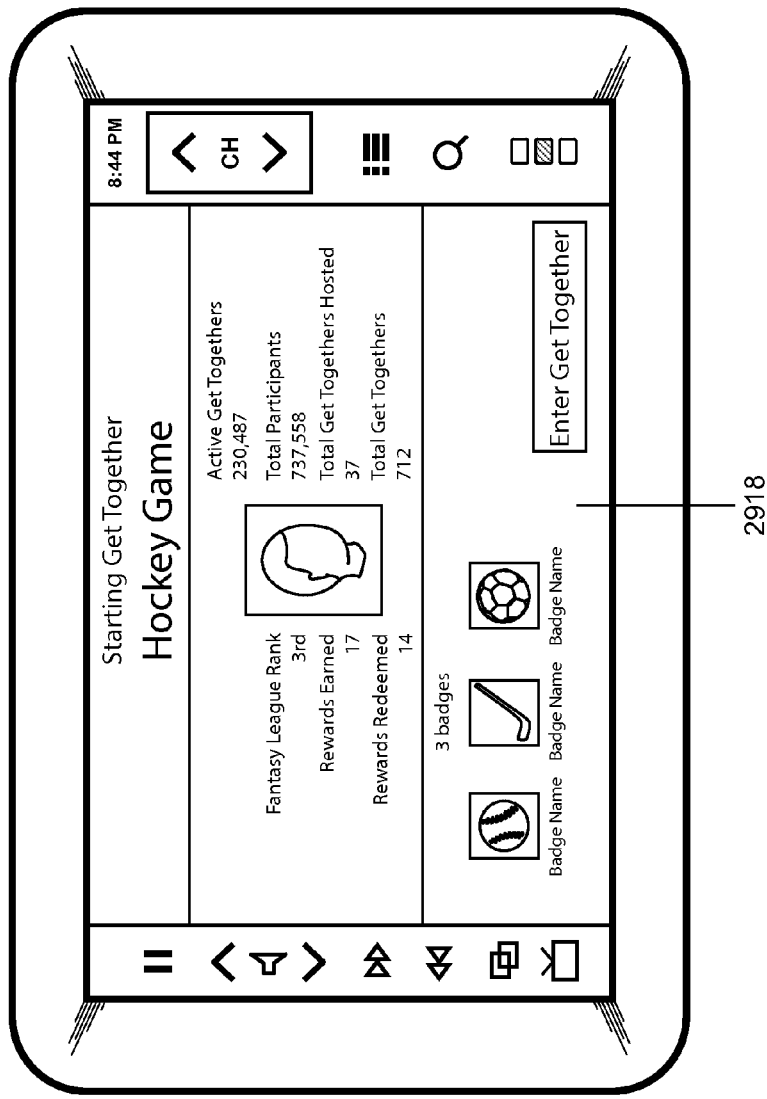

FIG. 29E shows a startup screen 2918 that may be displayed to a user upon accepting the GetTogether invitation, according to an exemplary embodiment. Startup screen 2918 may include information that may be of interest to users who are participating in the GetTogether. In some embodiments, if the GetTogether is based around a particular event or media program, startup screen 2918 may display information relevant to the event or program. For example, the GetTogether illustrated in FIG. 29E is based around a hockey game, and information relating to the hockey game may be displayed.

In some embodiments, startup screen 2918 may be specific to the user 116 to which startup screen 2918 is displayed, and information from a user profile of the user 116 may be displayed. For example, startup screen 2918 illustrated in FIG. 29E includes user-specific information such as a favorite team, fantasy league rank, number of GetTogethers hosted and joined, and other information. Startup screen 2918 also includes rewards information relating to a rewards program in which the user 116 is enrolled (e.g., rewards earned, rewards redeemed, goal progression, rewards badges, rewards for achieving a specific goal, etc.). Once the user 116 has finished viewing the information shown on startup screen 2918, the user may select the "Enter GetTogether" button shown in the lower right corner of startup screen 2918 to enter the Get-Together session.

Figure 29F:
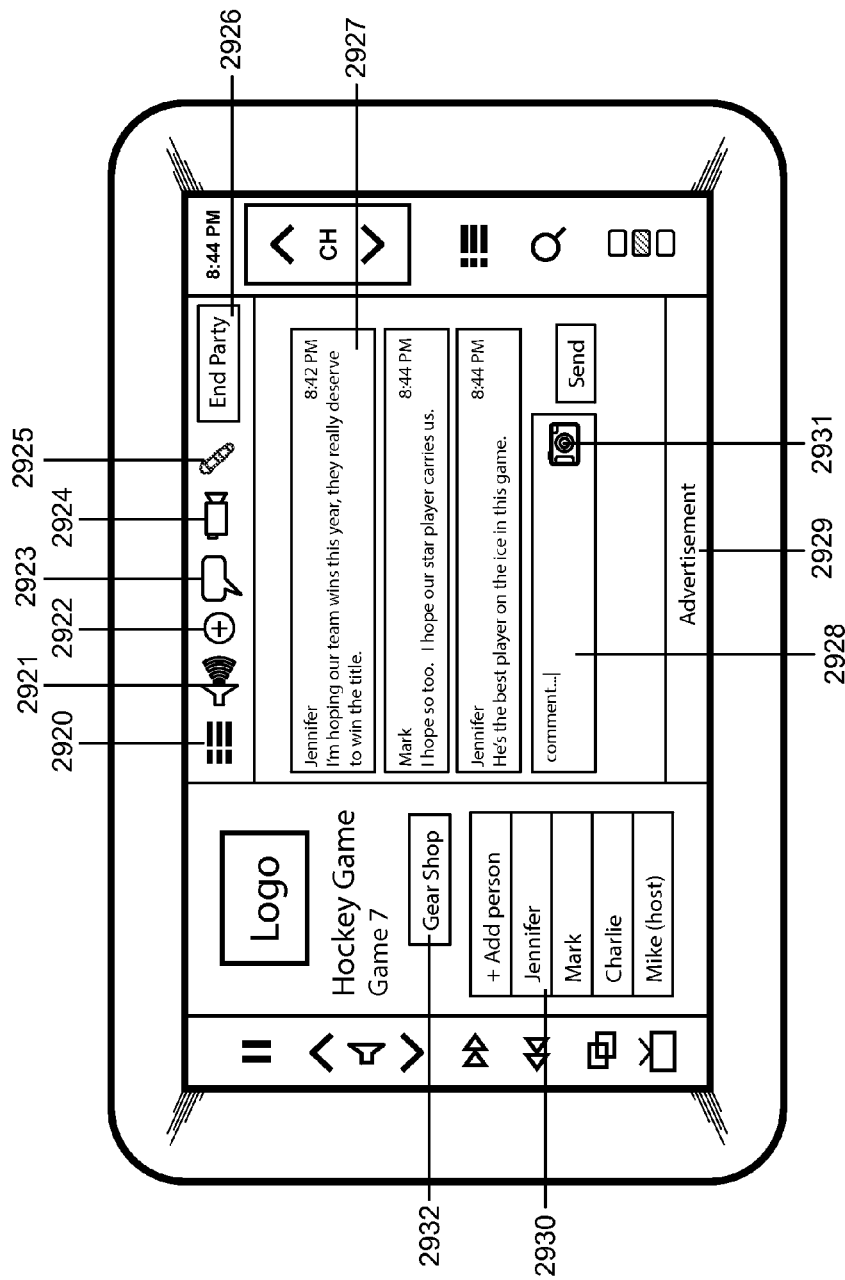

FIG. 29F shows an GetTogether session interface, according to an exemplary embodiment. The GetTogether session may allow the users who are participating in the session to communicate and/or interact with one another in various different ways, such as text chat, audio chat, video chat, sharing images and/or videos, and/or in other ways.

The GetTogether session interface of FIG. 29F includes a number of different modes or panels that can be activated using different icons that are selectable by a user to display different images or interfaces. A program information icon 2920 may display an image providing information about a program that is the basis of the GetTogether. A program audio icon 2921 may be used to selected from among two or more audio sources (e.g., radio stations) when multiple audio sources relating to the program are available. A polling icon 2922 may be used to present poll or survey questions that may be posed by participants in the GetTogether session to one another and/or may be presented in relation to the media program being viewed by participants in the GetTogether session. A text chat icon 2923 may display a text chat interface through which participants in the GetTogether session may communicate with one another by typing text messages and/or by sharing media files (e.g., pictures, videos, etc.). A video chat icon 2924 may display a video chat interface through which participants may transmit video of themselves and view video of other participants (e.g., using webcams or other video camera devices coupled to computing devices). In some embodiments, the video chat interface may also allow users to speak with one another as well (e.g., using a microphone of the computing devices). An audio chat icon 2925 may provide an audio chat interface through which participants may speak with one another (e.g., using microphones of the computing devices and/or other audio input devices). An exit icon 2926 may be used to exit the GetTogether. In some embodiments, if the user is the organizer of the GetTogether, exit icon 2926 may end the GetTogether.

The GetTogether interface may additionally or alternatively include other features as well. For example, a participant list 2930 may list the users who are participating in the current GetTogether session. In some embodiments, participant list 2930 may include one or more reserved spots for potential participants who have been invited to participate but have not yet accepted or declined. A shopping icon 2932 may cause shopping information to be displayed (e.g., items relating to the media program that the participants are watching, such as team merchandise). An advertising frame 2929 may be used to provide advertisements (e.g., relating to the media program, participant users, the subject of chats, etc.) to participants. In some embodiments, participants may be enabled to take advantage of offers provided in the advertisements by using a simple/single tap or click of advertising frame 2929, and information needed to complete the transaction or deal may be provided to the advertiser from the user profile of the participants.

FIG. 29F shows an example interface that might be displayed when a text chat mode is selected (e.g., upon entering the GetTogether session, upon selecting text chat icon 2923, etc.). A text chat interface 2927 may provide an area where messages posted by the participants can be viewed. Text chat interface 2927 may initially include a message to encourage participants to post text messages. A participant can post a message using message box 2928 and/or share a media file, such as a photograph or other image, using image sharing icon 2931. In some embodiments, tapping image sharing icon 2931 may give the user an option to capture an image using an image capturing device coupled to the computing device and/or select an image stored in memory to share. A thumbnail of the image may be provided in text chat interface 2927, and users may select the thumbnail to view a larger version of the image. In some embodiments, if actions happen in another mode that the user is now currently in (e.g., a polling mode, video chat mode, etc.), notifications may be displayed near the appropriate icons.

Figure 29G:
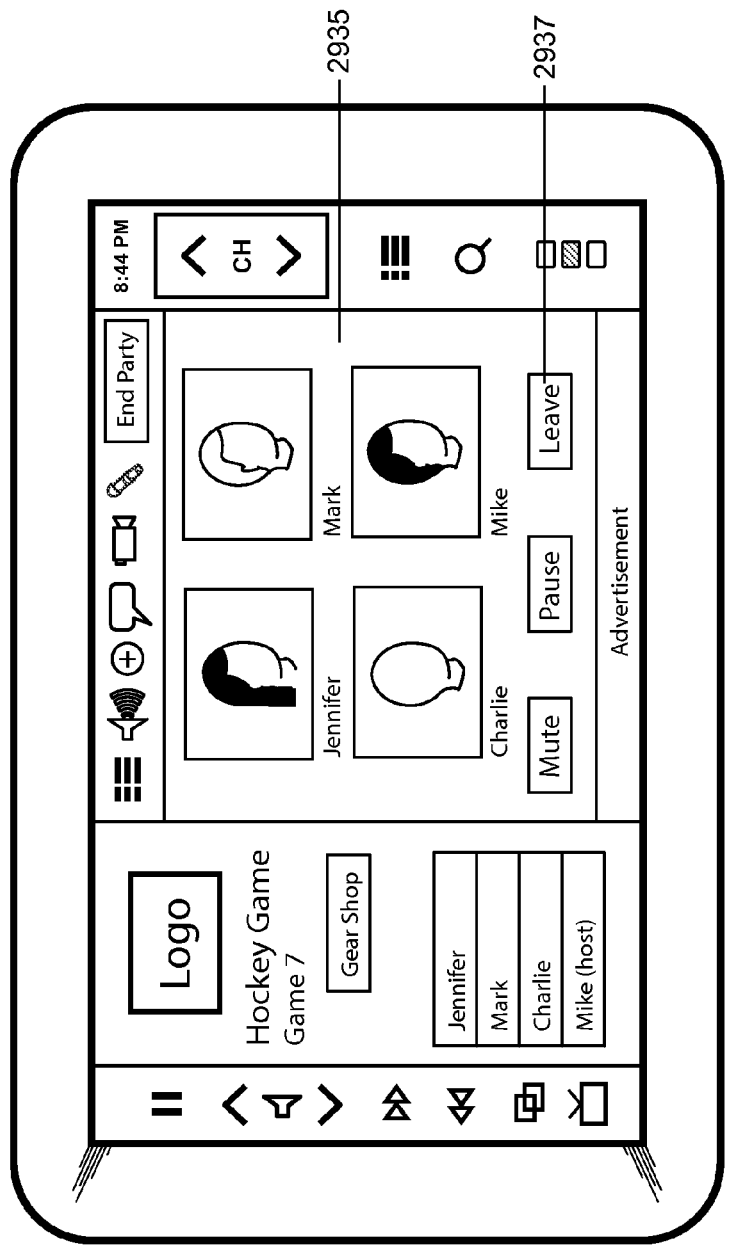

FIG. 29G shows an example video chat interface that may be displayed when a video chat mode is selected. The video chat interface may include a video panel 2935 configured to show video from each of the video chat participants. The video chat interface may also include controls 2937 that the users can use to control various aspects of the video chat, such as muting audio, pausing a video feed, and/or leaving the video chat session.

Figure 29H:
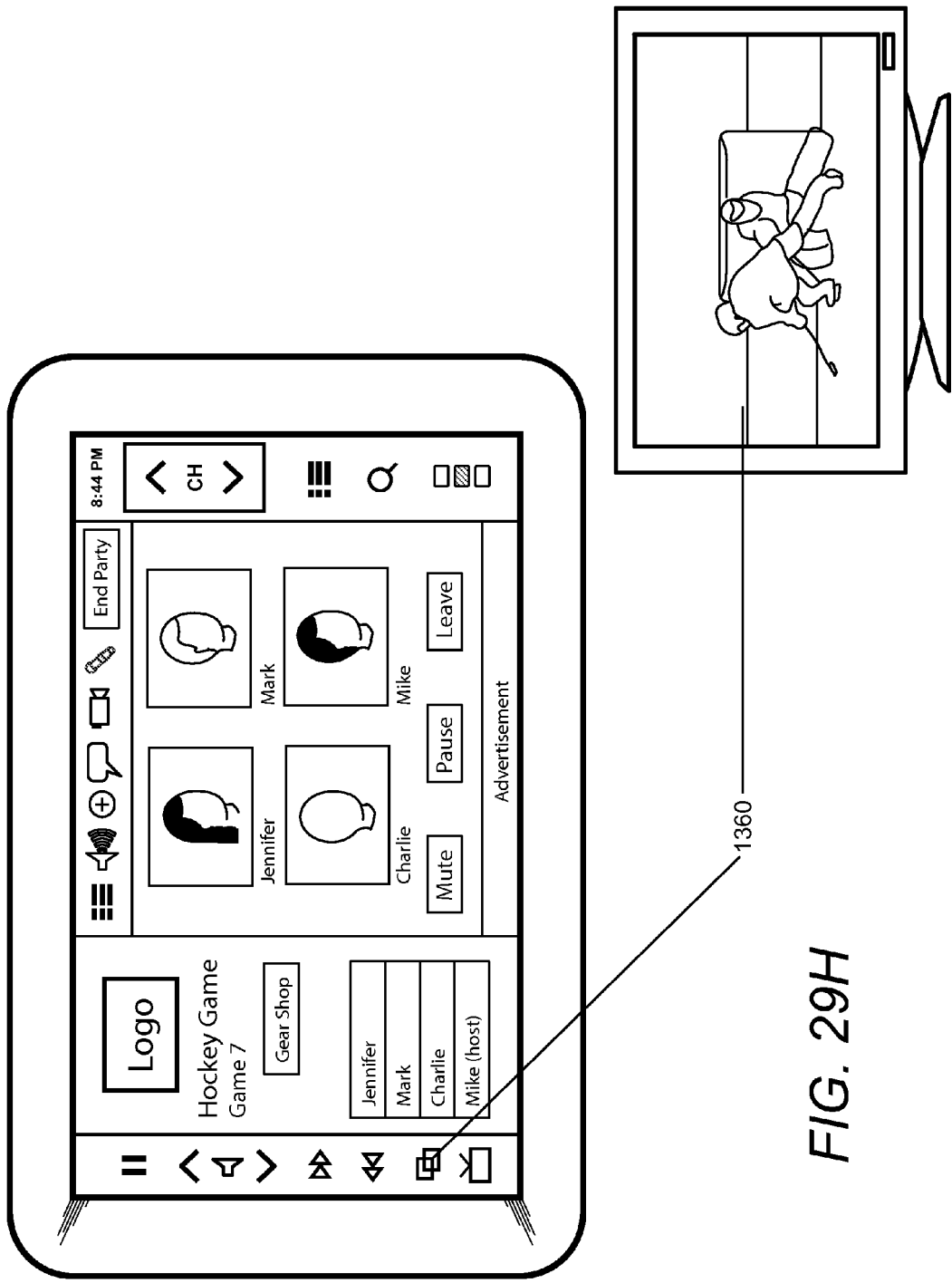
Figure 29I:
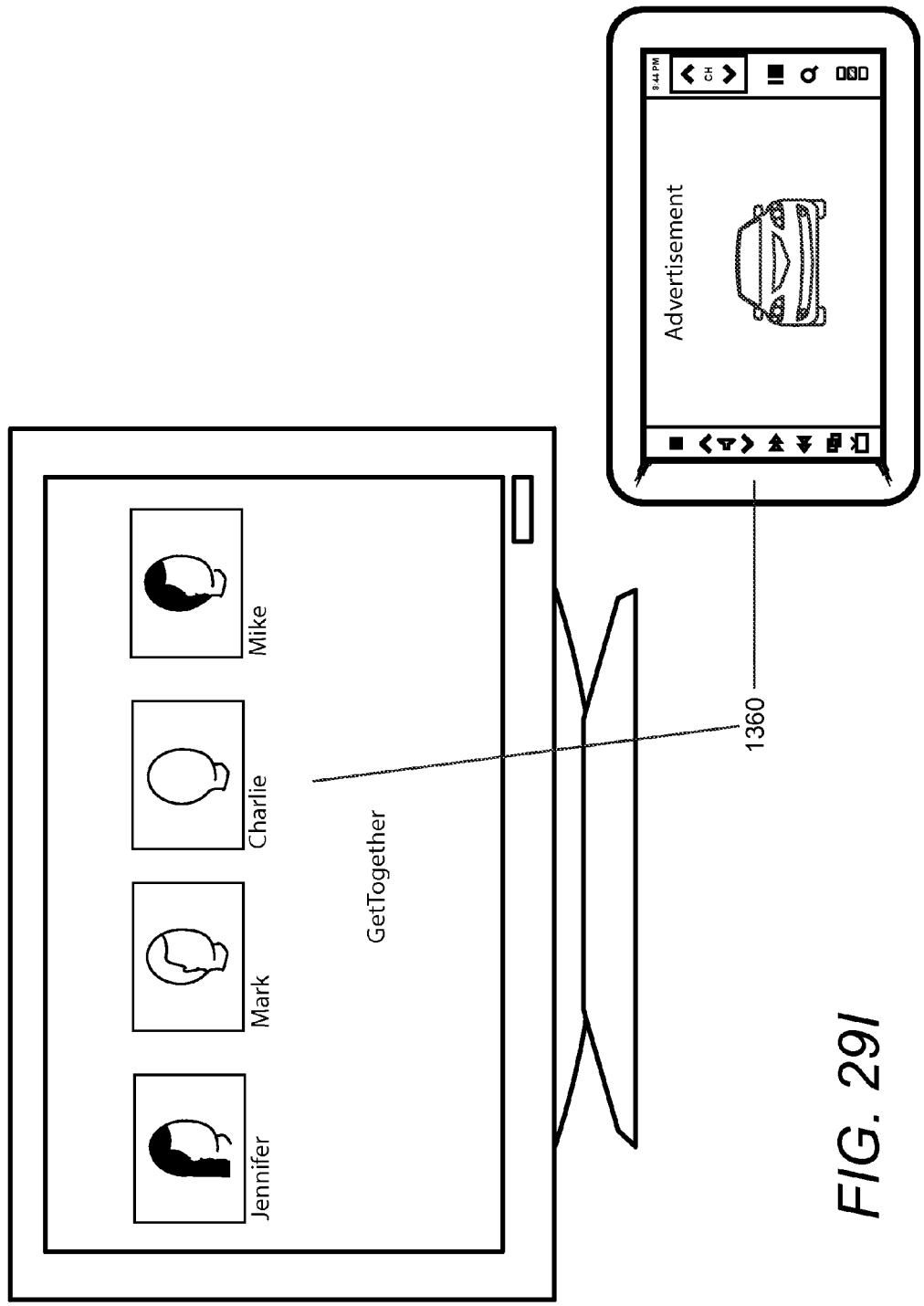

Referring now to FIGS. 29H and 29I, in some embodiments, users may be enabled to swap content being displayed between two devices, such as a tablet computing device and a TV. For example, in FIG. 29H, a video chat interface is displayed on a tablet device and a hockey game is displayed on a TV. After pressing "Simul-Sync" button 1360, in FIG. 29I, the content previously displayed on the TV is now displayed on the tablet, and the content previously displayed on the tablet is now displayed on the TV. In some embodiments, the content may be reformatted for the new device on which it is being displayed. For example, the video chat interface may display the video chat windows in a square or 2×2 orientation on the tablet device and in a linear or 4×1 orientation on the TV. A user may return the displays back to the original configuration by pressing "Simul-Sync" button 1360 again.

Figure 29J:
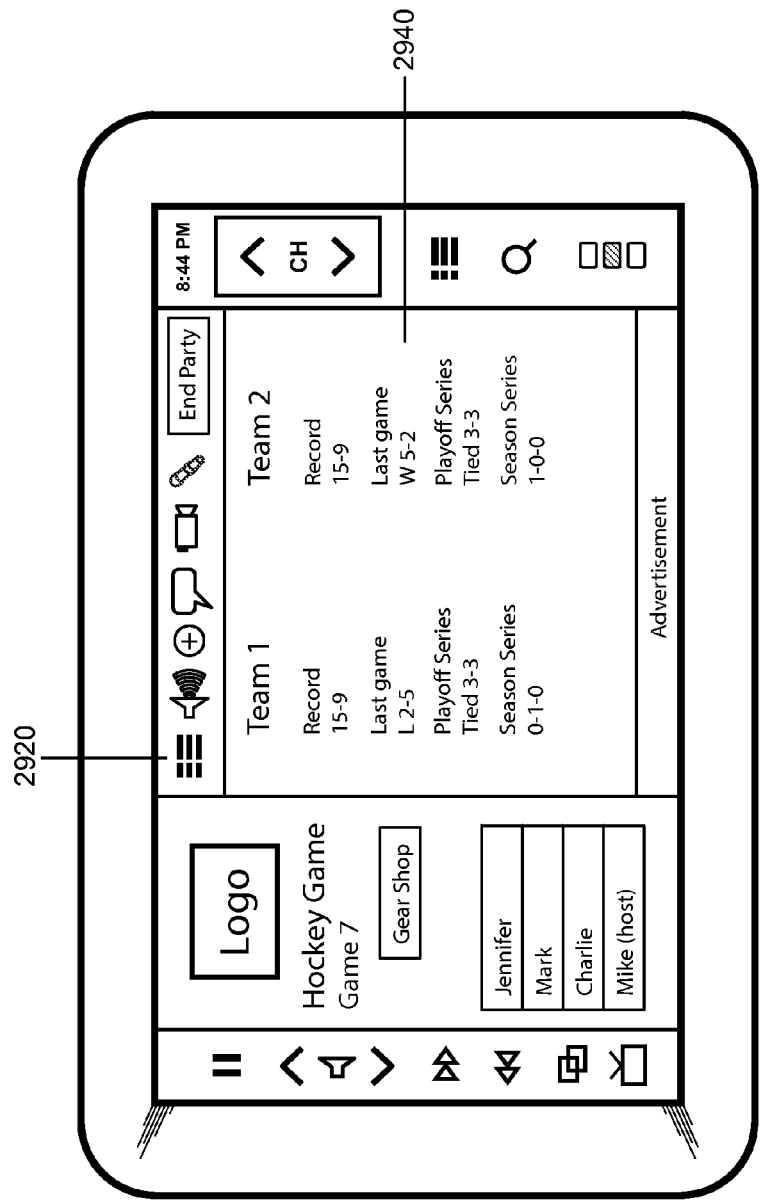

FIG. 29J illustrates an example program information interface 2940 that may be displayed upon selection of program information icon 2920. Program information interface 2940 may display various information regarding a program around which the GetTogether may be based. For example, in the illustrated exemplary embodiment, the GetTogether is based around a particular hockey game, and program information interface 2940 includes various statistics about the game, teams, sport, etc.

Figure 29K:
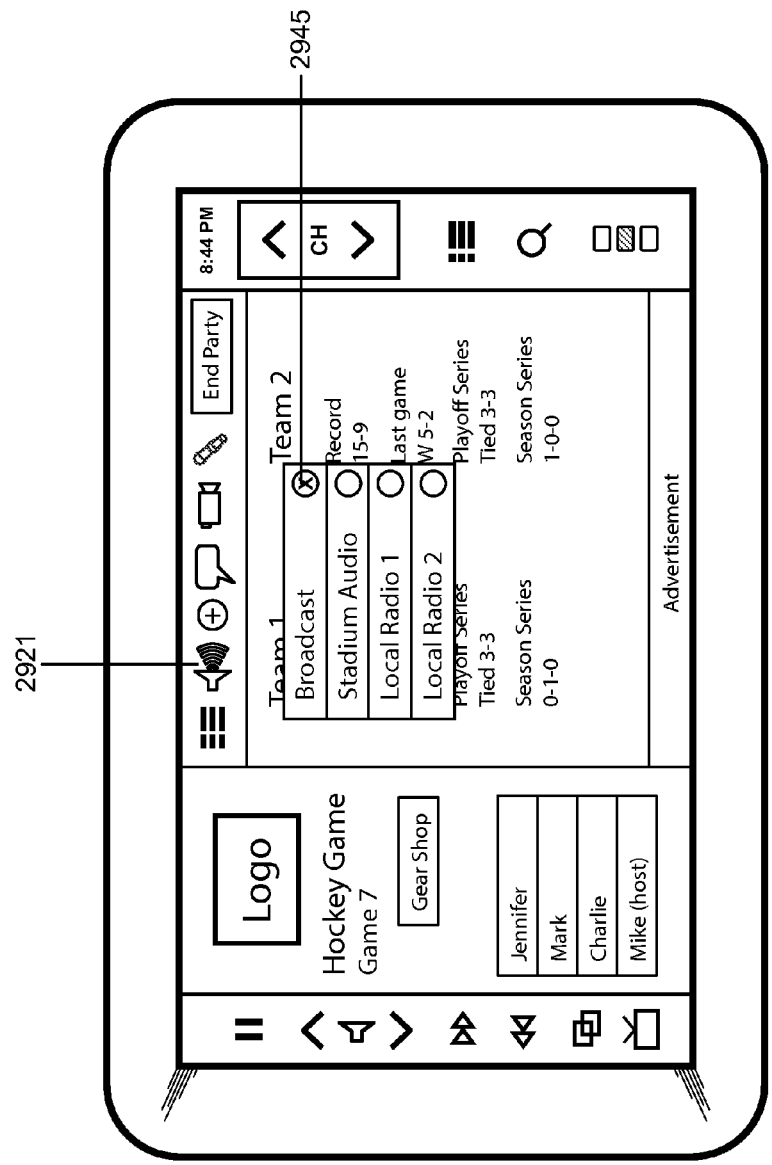

FIG. 29K illustrates an example audio source interface 2945 that may be displayed upon selection of audio source icon 2921. In some embodiments, the media program may have multiple different audio sources relating to the program. For example, a sporting event may have an audio source from the televised broadcast as well as several radio station audio sources. The participants in the GetTogether may not prefer the sportscasters who are performing the televised broadcast, and may instead prefer the audio from a radio station. The participants may select the desired radio station, and the audio from the selected station may be provided to the GetTogether participants.

Figure 29L:
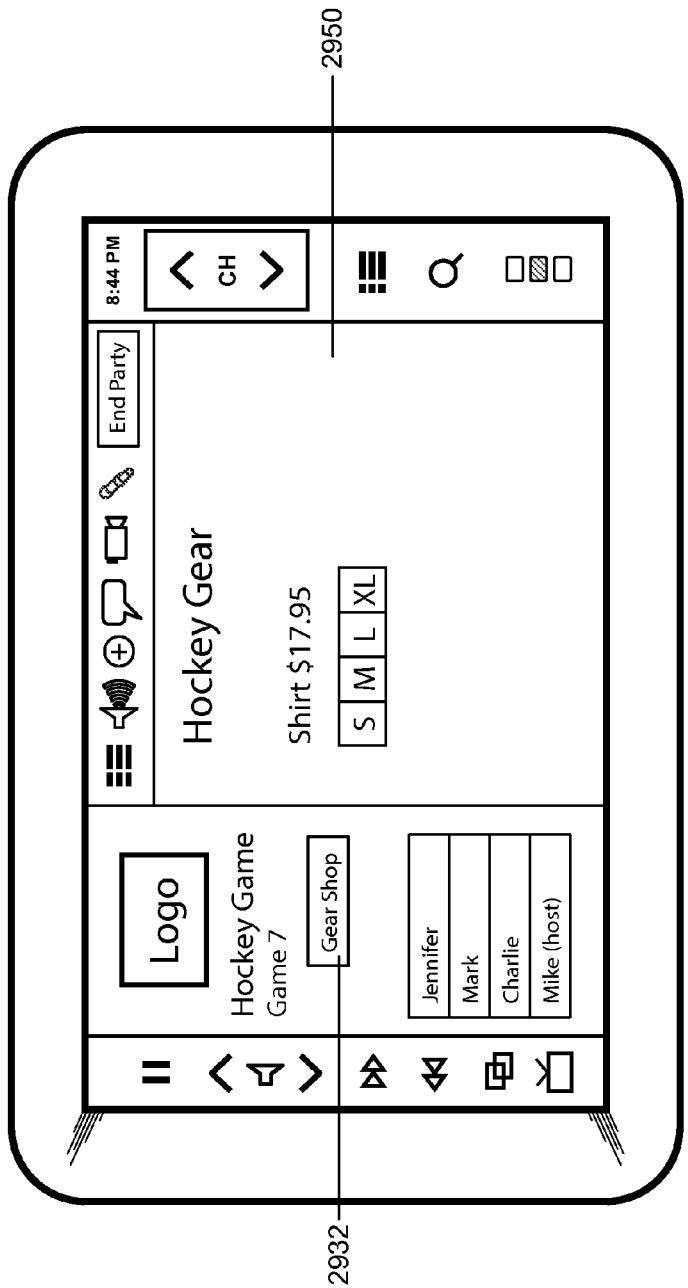

FIG. 29L shows an example shopping interface 2950 that may be displayed upon selection of shopping icon 2932. Shopping interface 2950 may present one or more items that the participant may purchase (e.g., using a simple tap or click). In some embodiments, the items offered using shopping interface 2950 may be based on the media program around which the GetTogether may be based.

Figure 30:
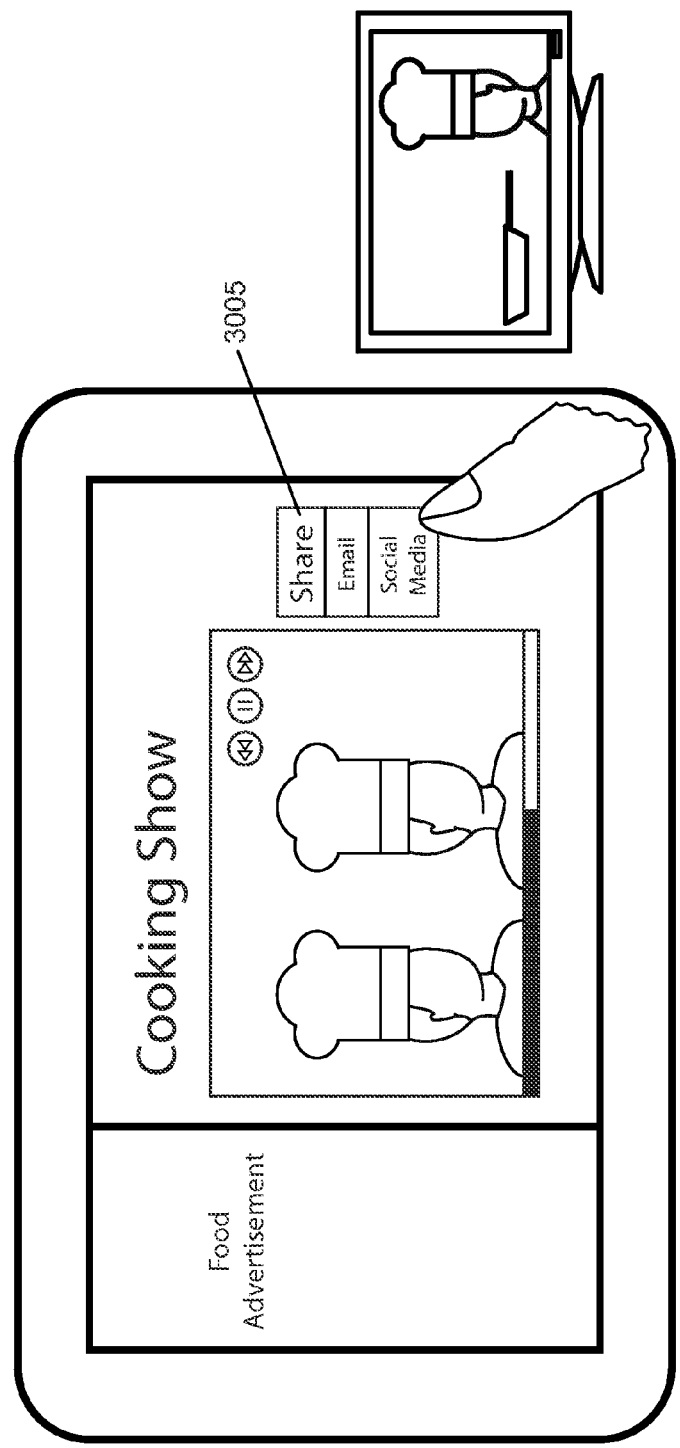
Figure 31:
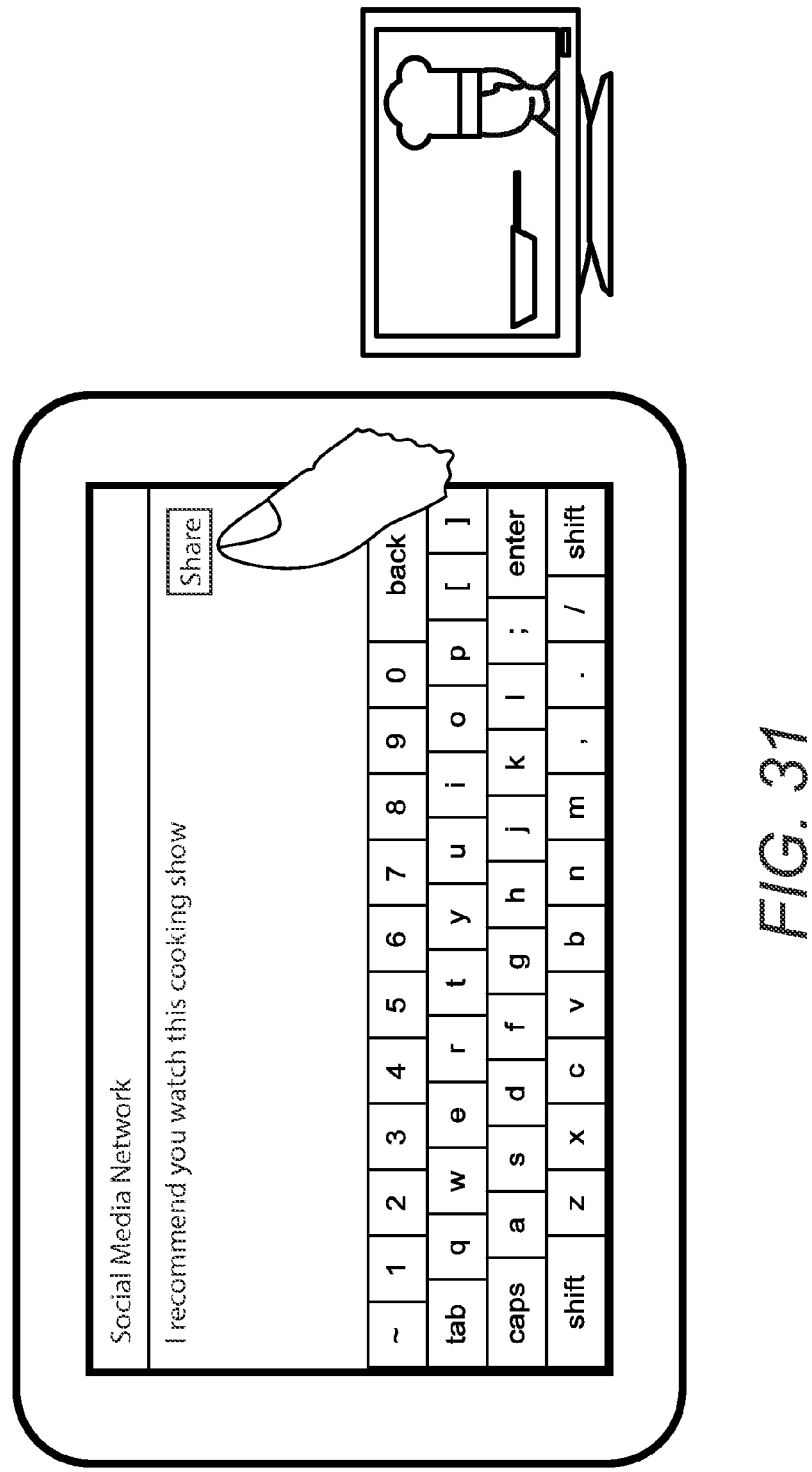
Figure 32:
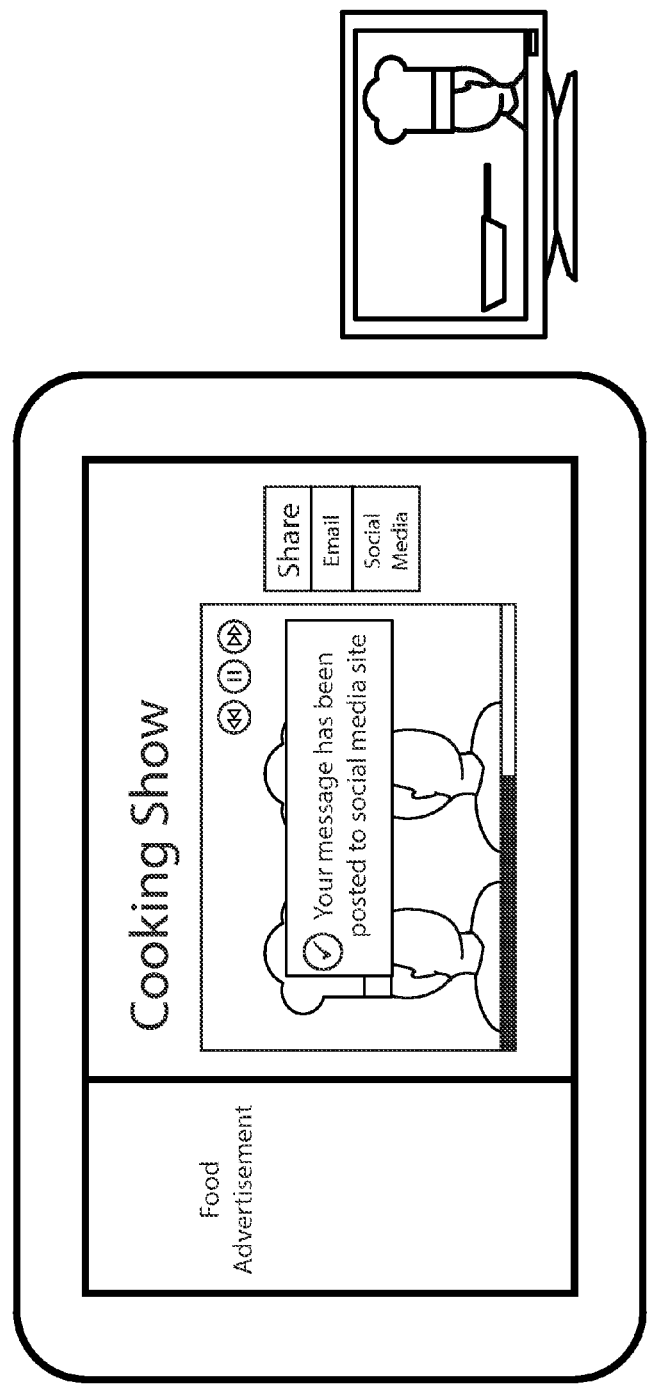

FIG. 30 illustrates a display image that may be presented on tablet device 1310 in response to the user 116 clicking a "Share" button, according to an exemplary embodiment. The user 116 may be presented with networking buttons 3005 that may be used to share information relating to the media program or other content being presented via one or more social networks (e.g., Facebook, Twitter, etc.) and/or one or more messaging services or methods, such as email. In the exemplary embodiment illustrated in FIG. 30, the user 116 is touching a networking button. In one embodiment (e.g., as illustrated in FIG. 31), a messaging interface may be presented enabling the user 116 to specify a message to be posted on the social network (e.g., on the user's wall). When the user 116 chooses to share the message, a confirmation message may be presented (see, e.g., FIG. 32).

Figure 33:
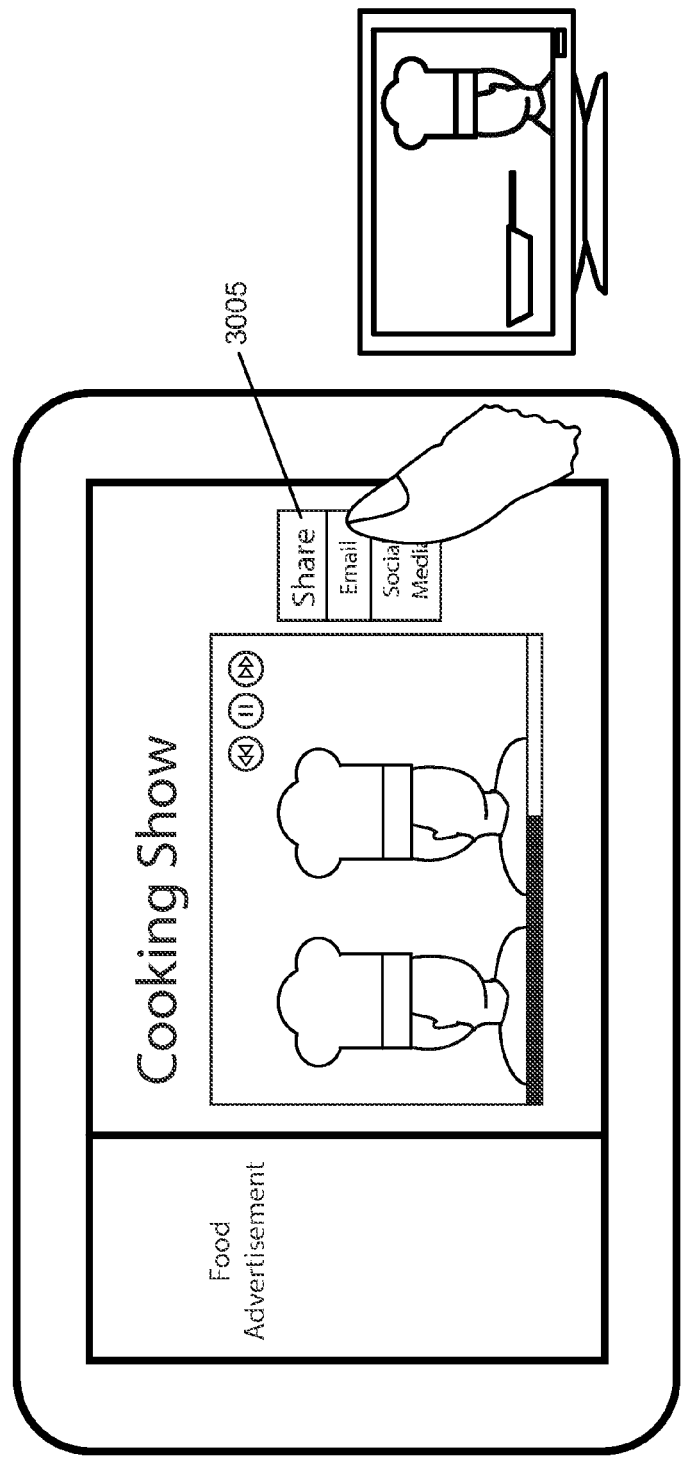
Figure 34:
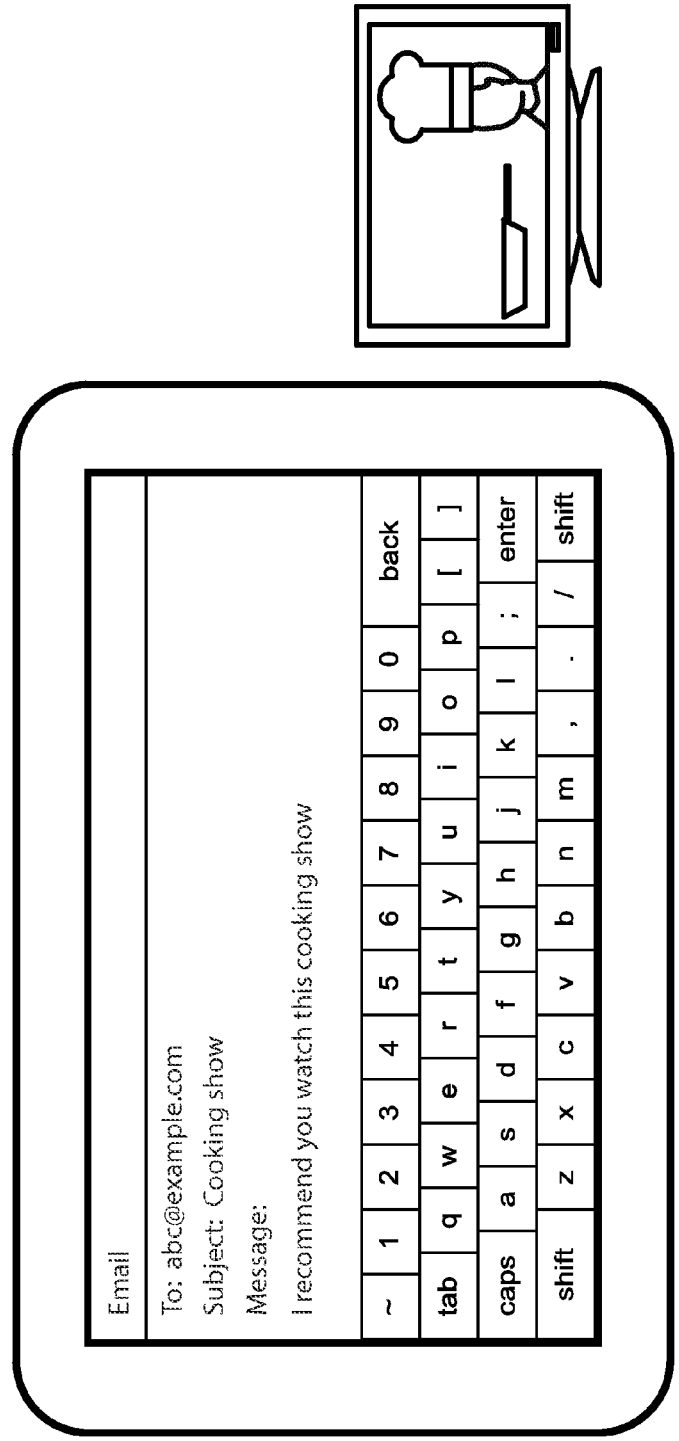
Figure 35:
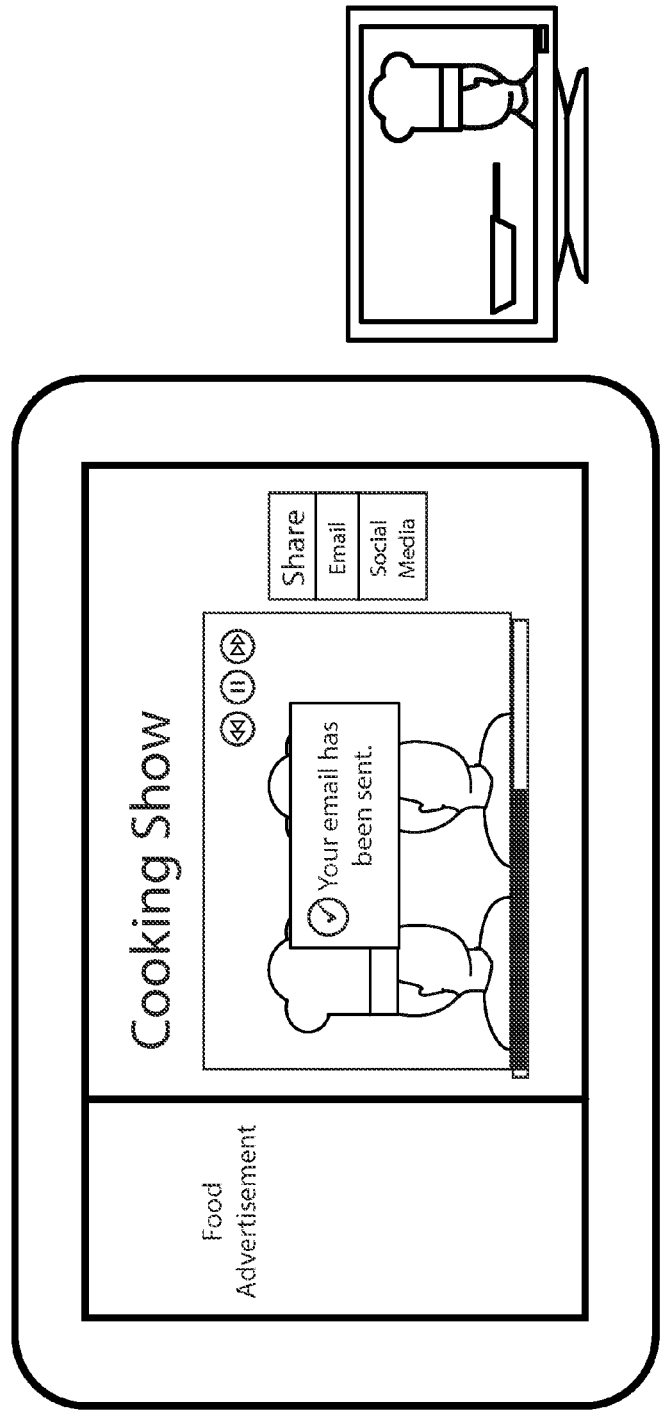

FIG. 33 illustrates the same display image as in FIG. 30, but in which the user 116 is selecting a button configured to send an email. In one exemplary embodiment (e.g., as shown in FIG. 34), an email interface may be presented enabling the user 116 to draft an email. In some embodiments, tablet device 1310 and/or a server computing device (e.g., application server 110) may be configured to utilize stored email account information, such as email address and/or password, to enable the user 116 to send the email without having to provide authentication information. When the user 116 chooses to send the email, a confirmation message may be presented (see, e.g., FIG. 35).

FIGS. 36 through 39D illustrate exemplary embodiments for providing an interactive voting or polling system. In some embodiments, advertisers, content providers, users, and/or other parties or entities may wish to poll or survey users on various topics, such as topics relating to a media program being presented. For example, a content provider or TV show producer may believe there is entertainment value in allowing viewers to weigh in on what they think the results of a TV show are going to be, what they think the results should be, what they think of events that have occurred in the TV show, etc. In some embodiments, live interactive media programs may be presented, and the events depicted in the media programs may be based at least in part on audience participation of feedback via a polling or surveying system. In some embodiments, feedback may be obtained in a real time or near-real time manner.

In some embodiments, polls or surveys may be based around content other than a media program. For example, an administrator of a website may wish to collect feedback using a poll of users who are viewing the website. A provider of a mapping program or service may wish to use a poll to elicit feedback of users who are using the mapping service regarding what type of content users may wish to be added to the mapping service in future updates. In various embodiments, polls or surveys may be generated based around and/or provided to users of particular applications, particular media programs or types of media programs, particular websites, and/or any other type of content. In some embodiments, the polls may be sent to users after determining that the users are all viewing the same type of content (e.g., dynamically, when the users are viewing the content at the same time, in real-time or near real-time, etc.). In some embodiments, one or more polls may be presented individually to users as they perform tasks, such as visiting a particular webpage.

Figure 36:
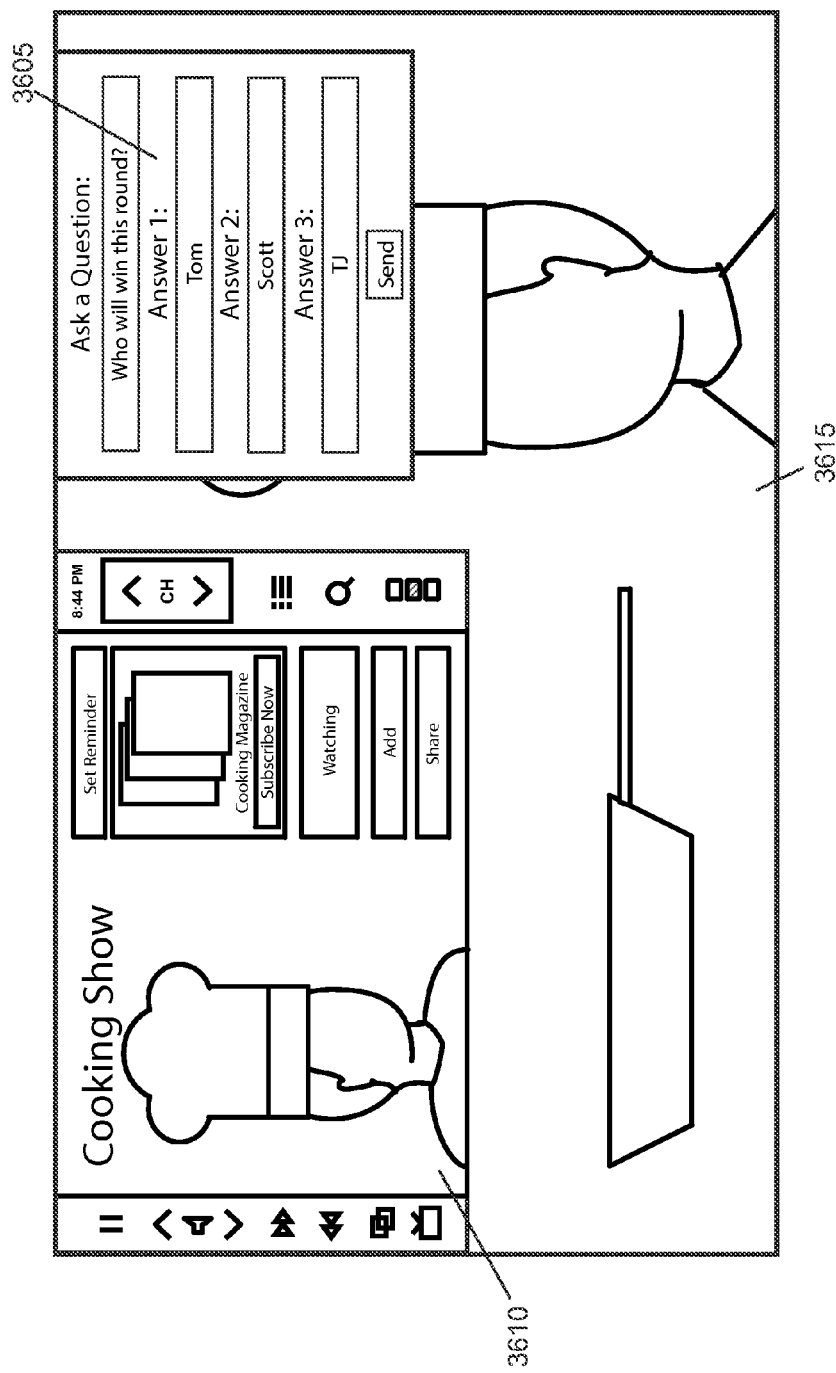
FIGS. 36 through 39D illustrate screenshots of example polling systems that may be provided using the personal information delivery application, according to exemplary embodiments.

FIG. 36 illustrates the operation of a polling system according to an exemplary embodiment. An admin window 3605 may be used by an administrator of the polling system to set up one or more poll or survey questions that will be provided to users. Admin window 3605 may be private to administrators and may not appear to other users. Admin window 3605 may allow the administrator to set up various types of questions, such as true/false, multiple choice, fill in the blank, etc., that may be provided to users. Admin window 3605 may also allow the administrator to specify particular users or classes of users to which the questions are presented, such as users watching a particular media program, having particular user characteristics (e.g., as reflected in user profiles), certain specific users (e.g., identified by username), etc. Information relating to the poll questions may appear in tablet device display image 3610 and/or TV display image 3615 (shown in FIGS. 36 through 39 positioned behind admin window 3605 and tablet device display image 3610).

Figure 37:
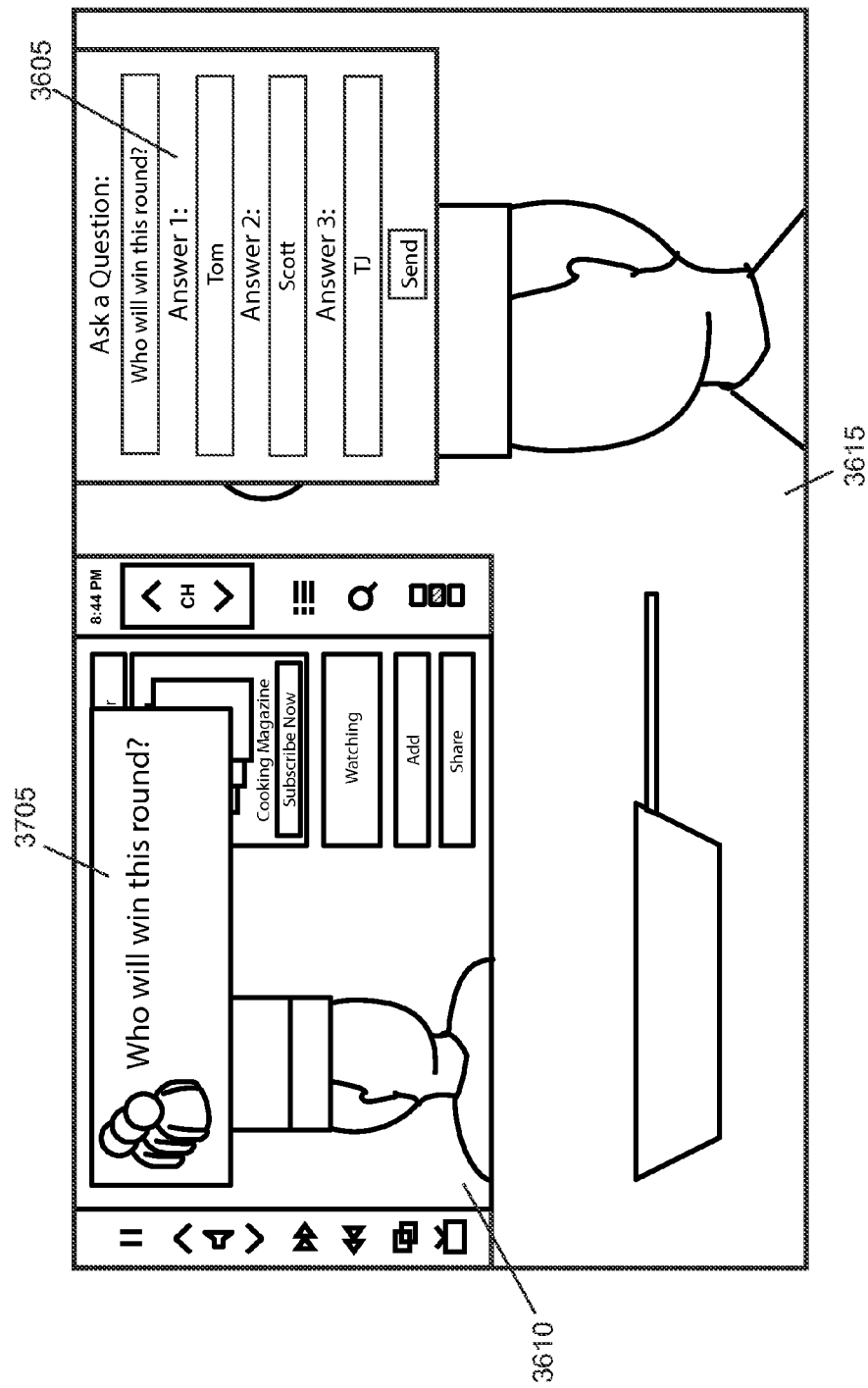
Figure 38:
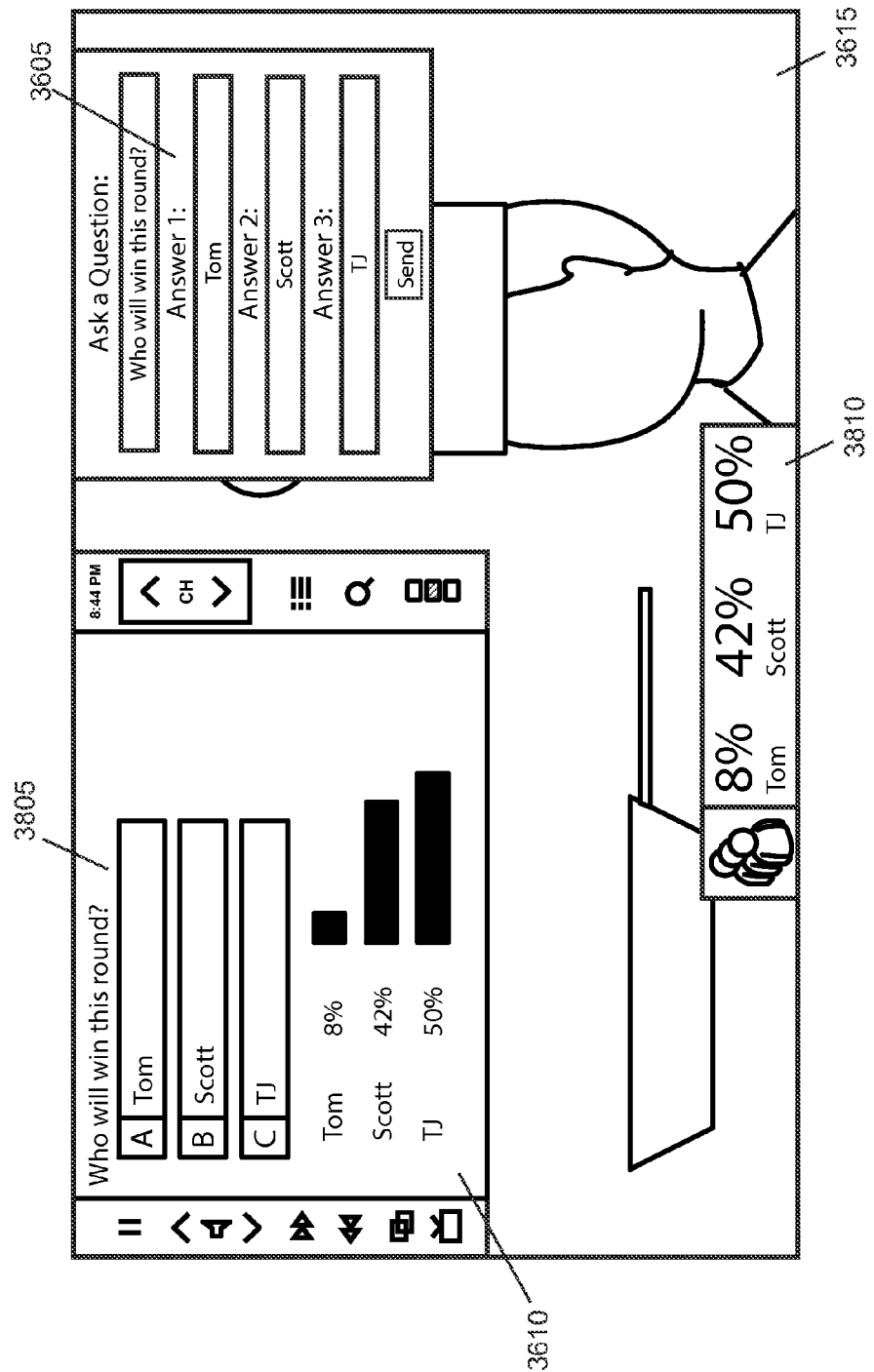

FIG. 37 illustrates an interface that may be presented to the user 116 (e.g., on tablet device 1310) after the administrator has set up and implemented a poll question. A poll prompt 3705 may be displayed to the user 116 inviting the user to participate in the poll. If the user selects poll prompt 3705, a poll image 3805 may be displayed to the user (see, e.g., FIG. 38). Portions of the poll image may be interactive and may be used by the user 116 to provide polling input, such as a selection of a multiple choice option. In some embodiments, polling data (e.g., update in a real time or near-real time manner) may be displayed in poll image 3805 and/or within a TV poll image 3810 displayed in TV display image 3615. In some embodiments, the data may be updated dynamically. For example, FIG. 39A illustrates the poll results at a later time than that displayed in FIG. 38. In FIG. 38, TJ was leading the poll with 50% of the vote and Scott was in second place with 42%. In FIG. 39A, the dynamically updated results show that Scott is now leading the poll with 53% of the vote and TJ is now in second place with 40%.

Figure 39B:
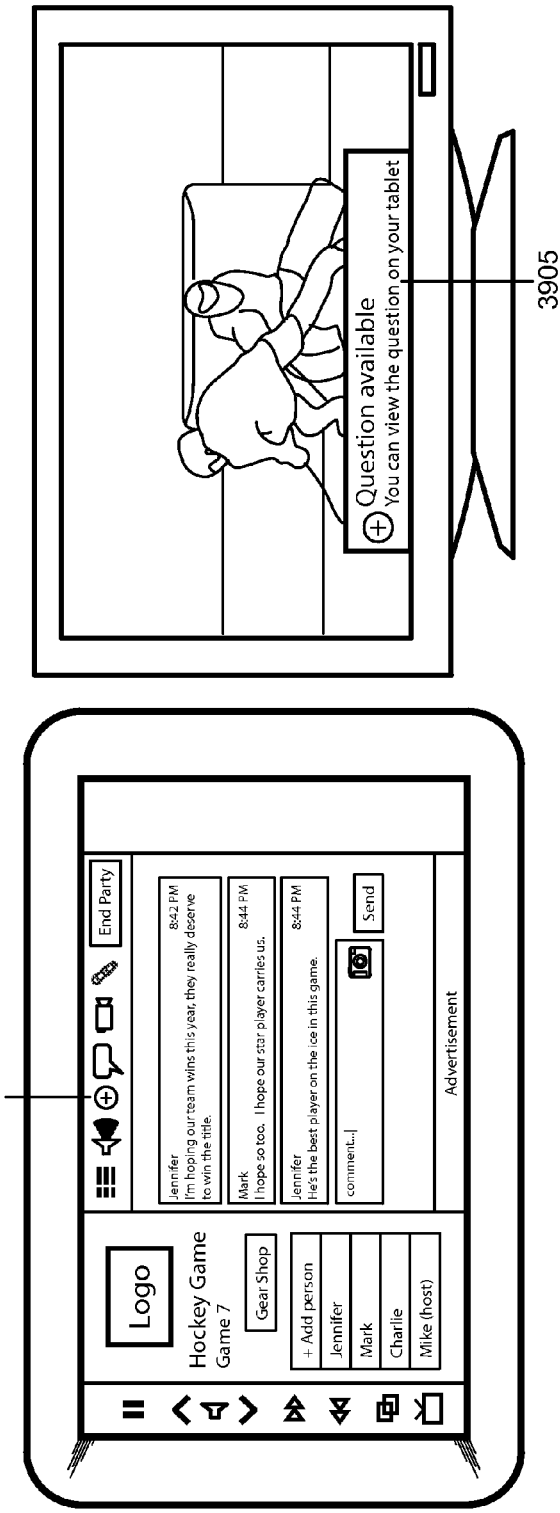
Figure 39C:
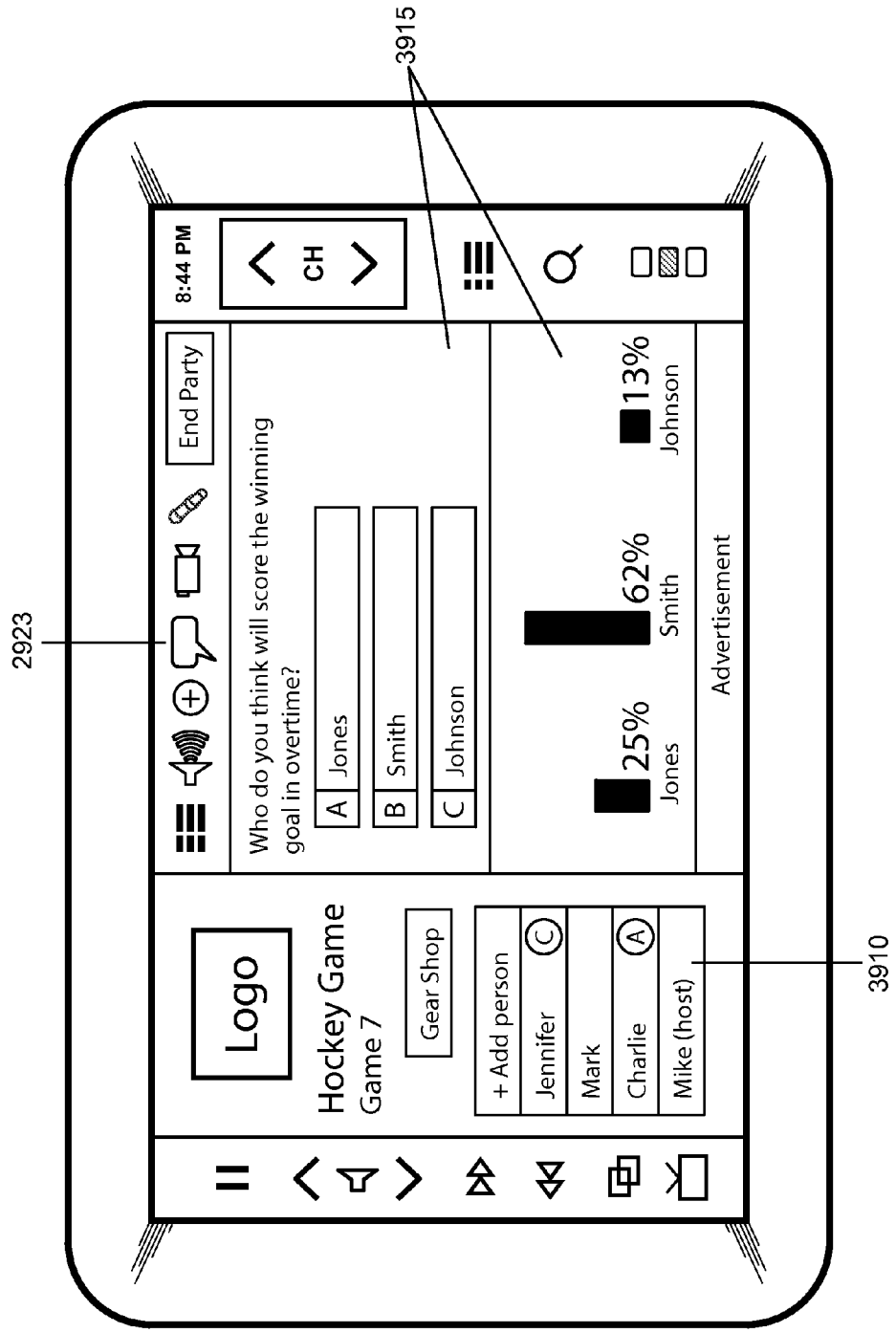
Figure 39D:
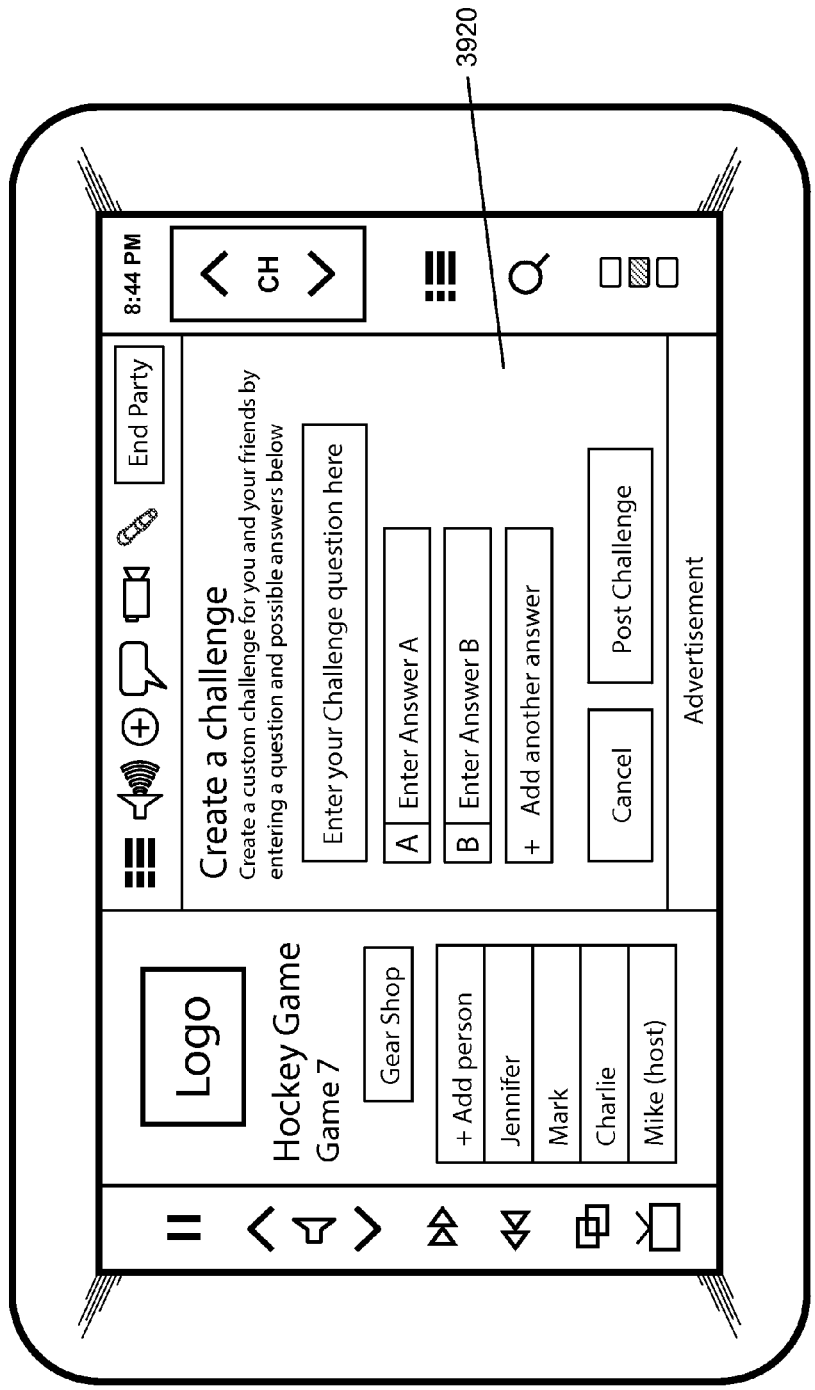

Referring now to FIGS. 39B through 39D, in some embodiments, polling functions may be performed in the environment of a GetTogether session. For example, one of the participants in a GetTogether session may pose a poll or survey question to the other participants. A notification may provided to indicate that a poll question has been asked on one or more of the participant's devices. For example, in FIG. 39B, a notification may be provided on a tablet device near polling icon 2922 and/or a TV notification 3905 may be provided on a TV on which the media program is being displayed (e.g., on a pop-up overlaid over the media program).

Referring now to FIG. 39C, selecting polling icon 2922 may result in a GetTogether polling interface 3915 being presented to a participant, through which a participant may provide answers to poll questions and/or view poll results. In some embodiments, poll results may additionally or alternatively be provided on a second device (e.g., on a tablet and/or TV). In some embodiments, answers provided by other participants may be provided in an answer panel 3910. In other embodiments, answers may be concealed from other participants, or may be concealed until the other participants have already answered the question. If actions are happening in other modes while the participant is in the polling mode, notifications may be provided. For example, a new text chat notification may be provided at or near text chat icon 2923.

Referring now to FIG. 39D, participants in the GetTogether may be enabled to generate poll questions and pose the poll questions to other participants using a poll generation interface 3920. In some embodiments, only the host of the GetTogether may generate poll questions. In other embodiments, any participant may generate a poll question. Poll generation interface 3920 includes fields that a participant may use to enter the text of a poll question and the text of possible answers to the question, if desired (e.g., for multiple choice and/or true/false-type questions).

Referring again to FIGS. 13 through 39D, "Television" channel 1320 demonstrates that an aspect of the present invention is that PID application 112 may facilitate social interactions. That is, because of the system integration, PID application 112 knows what users are consuming, what content and at what time.

Referring yet again to FIGS. 13 through 39D, information sources 114 that support "Television" channel 1320 may include, but are not limited to, digital TV service providers, social networking providers, national and local advertising providers, and the like. Any information sources 114 may be accessed through integrated services and applications layer 614 of PID application 112. Additionally, the servers of PID application 112 at application server 110 that support "Television" channel 1320 may include, but are not limited to, content delivery server 632, stream sync server 636, analytics server 638, advertising server 640, transcoding server 642, and media server 644.

Figure 46:
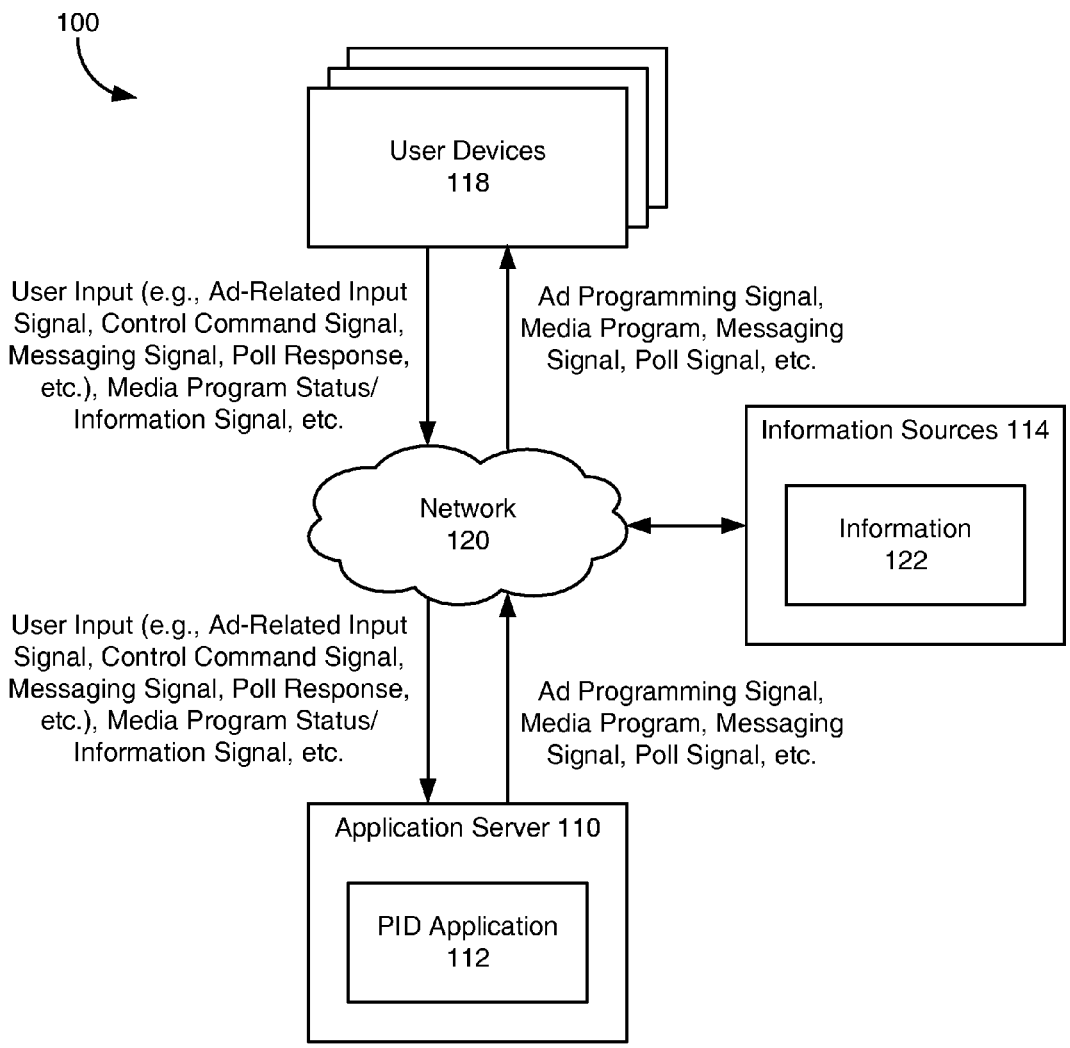
FIG. 46 illustrates a high level block diagram of an example of an information delivery system that may be used, for example, in a television-related implementation of the present invention, according to an exemplary embodiment.

Referring now to FIG. 46, a high level block diagram of an exemplary implementation of information delivery system 100 that may be used to implement some television and/or polling-related exemplary embodiments is shown. In various exemplary embodiments, application server 110 and one or more user devices 118 (e.g., user viewing devices) may be configured to transmit signals and/or data between each other using one or more communications interfaces (e.g., network 120).

For example, in some embodiments, application server 110 may be used to provide advertising information relating to a media program. Application server 110 may be configured to determine that the media program is currently being presented using a first user viewing device. In some embodiments, application server 110 may be configured to determine that the media program is being presented on the first user viewing device based on media program status and/or information signals received from the first user viewing device (e.g., indicating that the first user viewing device is currently playing a media program, identifying the media program, providing information/data regarding the media program, etc.). In some exemplary embodiments, application server 110 may be configured to transmit signals representing one or more media programs to the first user viewing device for display to the user (e.g., such that the media programs are retrieve by and/or provided to the user viewing device by application server 110).

Application server 110 may be configured to transmit an ad programming signal to a second user viewing device, so as to configure the second user viewing device to present at least one advertisement while the media program is being presented on the first user viewing device. In various embodiments, the ad programming signal may include advertisement content itself and/or ad location information (e.g., links to advertisement data available via the Internet) that can be used by the second user viewing device to locate the advertisement content. In some embodiments, the second user viewing device may be configured to transmit one or more signals relating to a user's interaction with the advertisement, such as a signal indicating the user wishes to agree to a deal offered by the advertiser (e.g., using a "simple tap" system in which the application server 110 is configured to provide the advertiser with access to one or more user profile data elements of the user), reward points that the user has collected through information with the advertisement, etc. In some embodiments, the second user viewing device may be configured to transmit one or more control commands (e.g., play, pause, etc.) to application server 110 that may be used to control the display of the media program on the first user viewing device.

In some embodiments, application server 110 may additionally or alternatively be used for enabling user interaction relating to a media program. Application server 110 may be configured to determine that the media program is currently being displayed to a plurality of users on a plurality of user viewing devices. Application server 110 may be configured to receive an indication that two or more of the plurality of users to which the media program is currently being displayed wish to communicate with other users (e.g., via a messaging signal from two or more user viewing devices indicating that the users wish to initiate a messaging interface). Application server 110 may be configured, for each of the two or more users who wish to communicate with other co-users, to transmit a messaging signal to a user viewing device of the user, so as to configure the user viewing device to present a messaging interface through which the user can communicate with other co-users to which the media program is being displayed. In various embodiments, the user viewing device on which the media program is being displayed may be the same or different than the user viewing device on which the messaging interface is displayed for a particular user. In various embodiments, the messaging interface may include a video chat, audio chat, text chat, and/or any other type of messaging platform.

In some embodiments, application server 110 may additionally or alternatively be used for collecting user input relating to a media program. Application server 110 may be configured to determine that the media program is currently being displayed to a plurality of users on a plurality of user viewing devices. Application server 110 may be configured to transmit a poll signal to user viewing devices of each of the plurality of users, so as to configure the user viewing devices to display a poll message to the users inviting the users to input a response to the message. Application server 110 may be configured to receive one or more responses to the poll message from one or more of the users and determine a poll result based on the one or more responses received from the one or more users. In various embodiments, the media program and poll message may be displayed on the same or different user viewing devices. In some embodiments, the poll results may be transmitted to user viewing devices for display to users. The poll question and/or results may be provided in real time or near-real time. The poll message may provide users with two or more selectable options (e.g., true/false, multiple choice, etc.), invite the user to input text as a response (e.g., "fill in the blank"), or include any other type of poll format.

Figure 47:
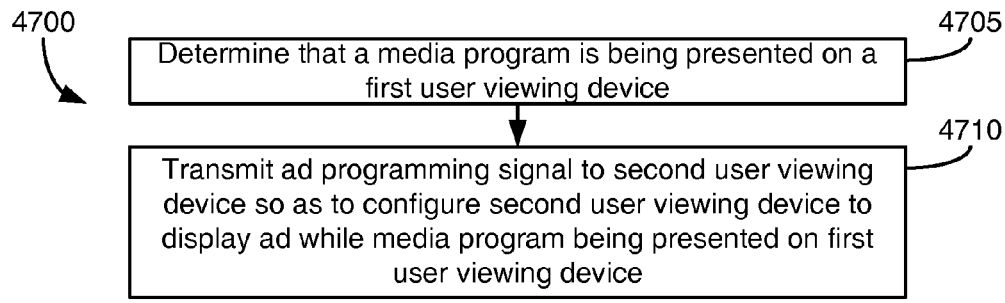
FIG. 47 illustrates a flow diagram of a process of providing ad programming to one or more users, according to an exemplary embodiment.

Referring now to FIG. 47, a flow diagram of a process 4700 of providing ad programming to one or more users is shown, according to an exemplary embodiment. Process 4700 includes determining that a media program is currently being presented using a first user viewing device (4705). Process 4700 further includes transmitting an ad programming signal to a second user viewing device, so as to configure the second user viewing device to present at least one first advertisement while the media program is being presented on the first user viewing device (4710).

Figure 48:
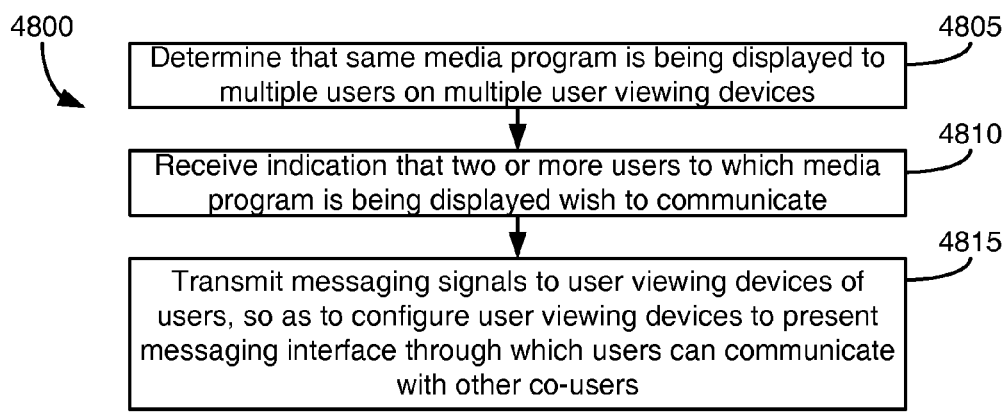
FIG. 48 illustrates a flow diagram of a process of providing a messaging interface to users that can be used to communicate with other co-users, according to an exemplary embodiment.

Referring now to FIG. 48, a flow diagram of a process 4800 of providing a messaging interface to users that can be used to communicate with other co-users is shown, according to an exemplary embodiment. Process 4800 includes determining that a media program is currently being displayed to a plurality of users on a plurality of user viewing devices (4805). Process 4800 further includes receiving an indication that two or more of the plurality of users to which the media program is currently being displayed wish to communicate with other users (4810). Process 4800 further includes transmitting, for each of the two or more users who wish to communicate with other co-users, a messaging signal to a user viewing device of the user, so as to configure the user viewing device to present a messaging interface through which the user can communicate with other co-users to which the media program is being displayed (4815).

Figure 49:
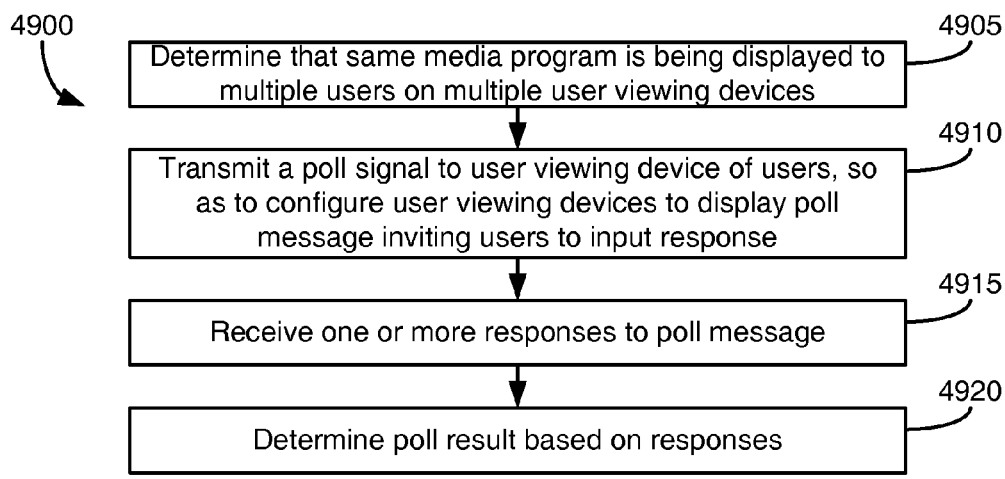
FIG. 49 illustrates a flow diagram of a process of conducting an interactive poll of users to which a media program is being displayed, according to an exemplary embodiment.

Referring now to FIG. 49, a flow diagram of a process 4900 of conducting an interactive poll of users to which a media program is being displayed is shown, according to an exemplary embodiment. Process 4900 includes determining that a media program is currently being displayed to a plurality of users on a plurality of user viewing devices (4905). Process 4900 further includes transmitting a poll signal to user viewing devices of each of the plurality of users, so as to configure the user viewing devices to display a poll message to the users inviting the users to input a response to the message (4910). Process 4900 further includes receiving one or more responses to the poll message from one or more of the users (4915) and determining a poll result based on the one or more responses received from the one or more users (4920).

System Architecture Supporting a Web Presentation Framework

For the purpose of illustration, FIGS. 40 through 45 describe the system architecture of information delivery system 100 according to some embodiments of the present invention implemented for supporting a web presentation framework. In one example, the web presentation framework is implemented using HTML5. HTML5 is a language for structuring and presenting content for the World Wide Web, a core technology of the Internet. It is the latest revision of the HTML standard and currently remains under development. Its core aims have been to improve the language with support for the latest multimedia while keeping it easily readable by humans and consistently understood by computers and devices (e.g., web browsers, parsers, etc.). As compared to previous versions, HTML5 adds many new syntactical features. These include the <video>, <audio>, and <canvas> elements (or tags), as well as the integration of Scalable Vector Graphics (SVG) content. These features are designed to make it easy to include and handle multimedia and graphical content on the web. Additionally, HTML5 provides support for off-line storage. Further, HTML5 includes a new protocol called WebSockets that allows bidirectional asynchronous communication.

Figure 40:
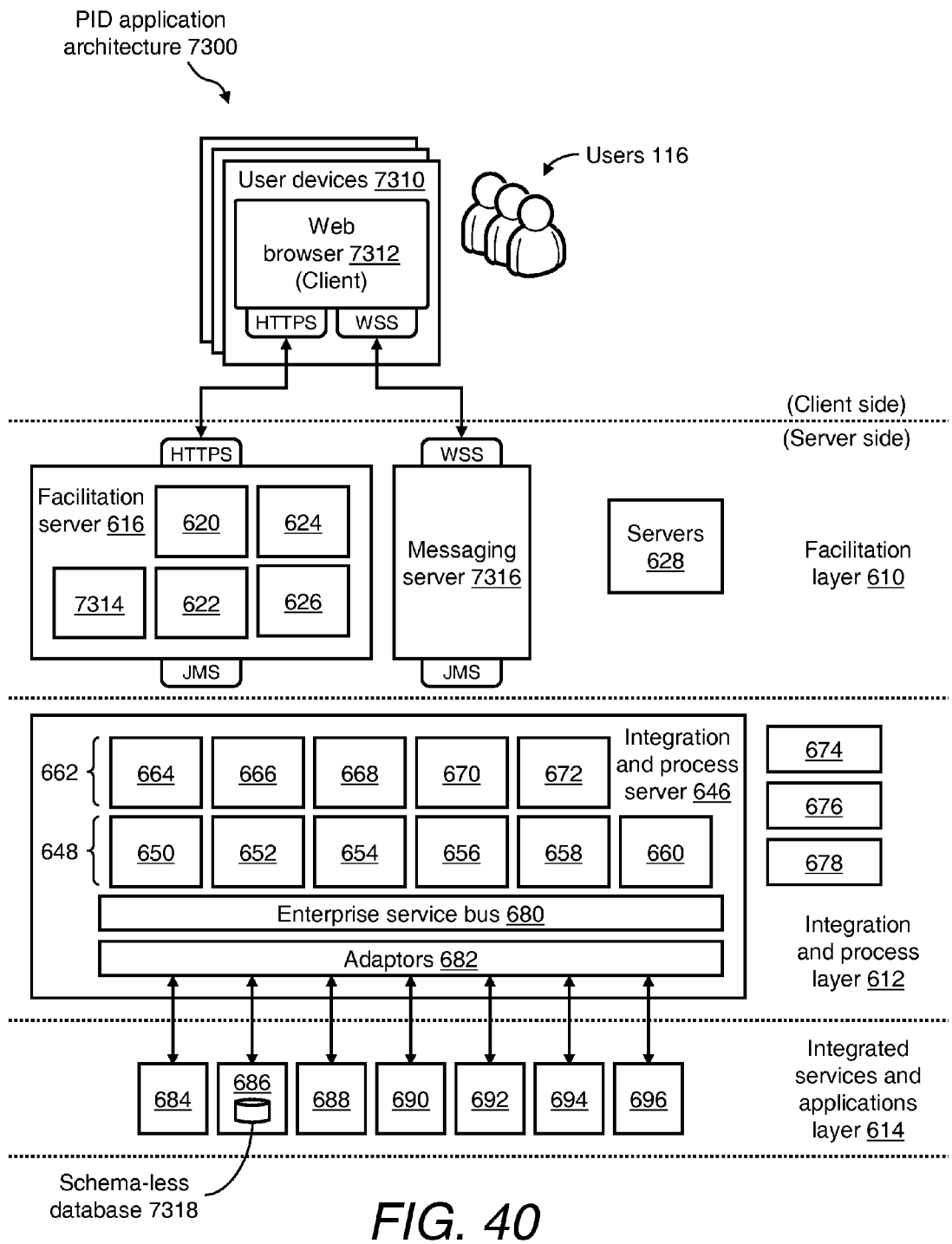
FIG. 40 illustrates a functional block diagram of an example of a personal information delivery application architecture for supporting a web presentation framework of the information delivery system, according to an exemplary embodiment.

Referring to FIG. 40, a functional block diagram of an example of a PID application architecture 7300 for supporting the web presentation framework is presented. PID application architecture 7300 is another example of the application architecture of the server side of PID application 112. In this example, the user devices 118 that are used with the Flex presentation framework of PID application architecture 600 of FIG. 6 are replaced by user devices 7310. That is, instead of supporting Adobe AIR-enabled devices, PID application architecture 7300 supports user devices 7310, which may be any web (or Internet) browser-enabled devices (hereafter called browser-enabled devices). For example, FIG. 40 shows a web browser 7312 running on each user device 7310. Examples of web (or Internet) browsers that may be running on user devices 7310 may include, but are not limited to, Microsoft Internet Explorer® 9, Google Chrome, Mozilla Firefox 4, Apple Safari 5, and Opera 11.

Accordingly, examples of user devices 7310 may include, but are not limited to, any type, brand, and/or model of browser-enabled desktop computer; browser-enabled laptop computer; browser-enabled tablet computer; browser-enabled net-book computing device; browser-enabled handheld computing device; browser-enabled personal digital assistant; browser-enabled enterprise digital assistant; browser-enabled portable digital assistant; browser-enabled telecommunications device including one of an browser-enabled telephone, browser-enabled cell phone, and browser-enabled smart phone; browser-enabled personal navigation device; browser-enabled vehicle-based device; browser-enabled optical disk player; browser-enabled television; browser-enabled game console; and the like.

PID application architecture 7300 may include facilitation layer 610, integration and process layer 612, and integrated services and applications layer 614 of PID application architecture 600 of FIG. 6, albeit with certain modifications for supporting the web presentation framework.

For example, facilitation layer 610 includes the facilitation server 616 and certain other servers 628, such as, but not limited to, channel server 630, content delivery server 632, collaboration media server 634, stream sync server 636, analytics server 638, advertising server 640, transcoding server 642, and media server 644. However, in this embodiment, facilitation server 616 includes a client gateway 7314 instead of the client gateway 618 of PID application architecture 600 of FIG. 6. Client gateway 7314 uses hypertext transfer protocol (HTTP) for communicating with the client (e.g., web browsers 7312 of user devices 7310), while using, for example, JMS protocol for communicating with the rest of the server stack. In this way, facilitation server 616 may serve as an HTTP server. Preferably, client gateway 7314 of facilitation server 616 uses HTTPS protocol, which is HTTP Secure protocol.

While facilitation server 616 manages certain communication between the client (e.g., web browsers 7312 of user devices 7310) and the server (e.g., application server 110), use of HTTP may have certain limitations. For example, under the HTTP protocol, a client, such as a web browser, must open a connection to a server, make a request, wait for a response, and then close the connection. If the client needs more data, it must open a new connection. Likewise, if the server has new information for the client, it must wait until the client requests it rather than sending it over instantly. Consequently, the HTTP protocol may be an inefficient way to exchange data. However, HTML5 includes a new protocol called WebSockets. This protocol allows a web client to create a connection, keep it open as long as it wants, and both send and receive data continuously. WebSocket connections allow two-way communication between the client (e.g., web browsers 7312 of user devices 7310) and the server without having to use Ajax type of mechanisms, thereby providing an efficient way to exchange data.

Therefore, facilitation layer 610 of PID application architecture 7300 also includes a messaging server 7316, which uses the WebSocket technology. That is, messaging server 7316 uses WebSocket protocol for communicating with the client (e.g., web browsers 7312 of user devices 7310), while using, for example, JMS protocol for communicating with the rest of the server stack. Preferably, messaging server 7316 uses a WSS protocol, which is a WebSocket Secure protocol. The WSS protocol enables bidirectional message-calling capability between the browser and messaging server 7316. The WSS protocol provides the path to the enterprise service bus 680 of integration and process server 646. The messages from the client (e.g., web browsers 7312) are converted from HTTP protocol to JMS protocol. The WSS protocol rejects connections that have not been authenticated (i.e., needs a token that indicates authentication). As a result, PID application architecture 7300 uses the combination of messaging server 7316 and facilitation server 616 to manage communication between the client (e.g., web browsers 7312 of user devices 7310) and the server (e.g., application server 110).

Additionally, the relational database management system (RDBMS) 686 of integrated services and applications layer 614 of PID application architecture 7300 may include a schema-less database 7318. Schema-less database 7318 is in communication with data management subsystem 650 of integration and process layer 612 via enterprise service bus 680 and adaptors 682. A RDBMS imposes a fixed schema, while a schema-less database does not. A main advantage of a schema-less database (e.g., a NoSQL database) compared with a relational database (e.g., a SQL database) is that it is easily scalable. A schema-less database is well-suited for the web presentation framework of PID application architecture 7300 because it provides a convenient database for channel/content developers. In one example, schema-less database 7318 may be the MongoDB available from 10gen, Inc. (New York, N.Y.). MongoDB is an open source, high performance, scalable, document-oriented database.

Figure 41:
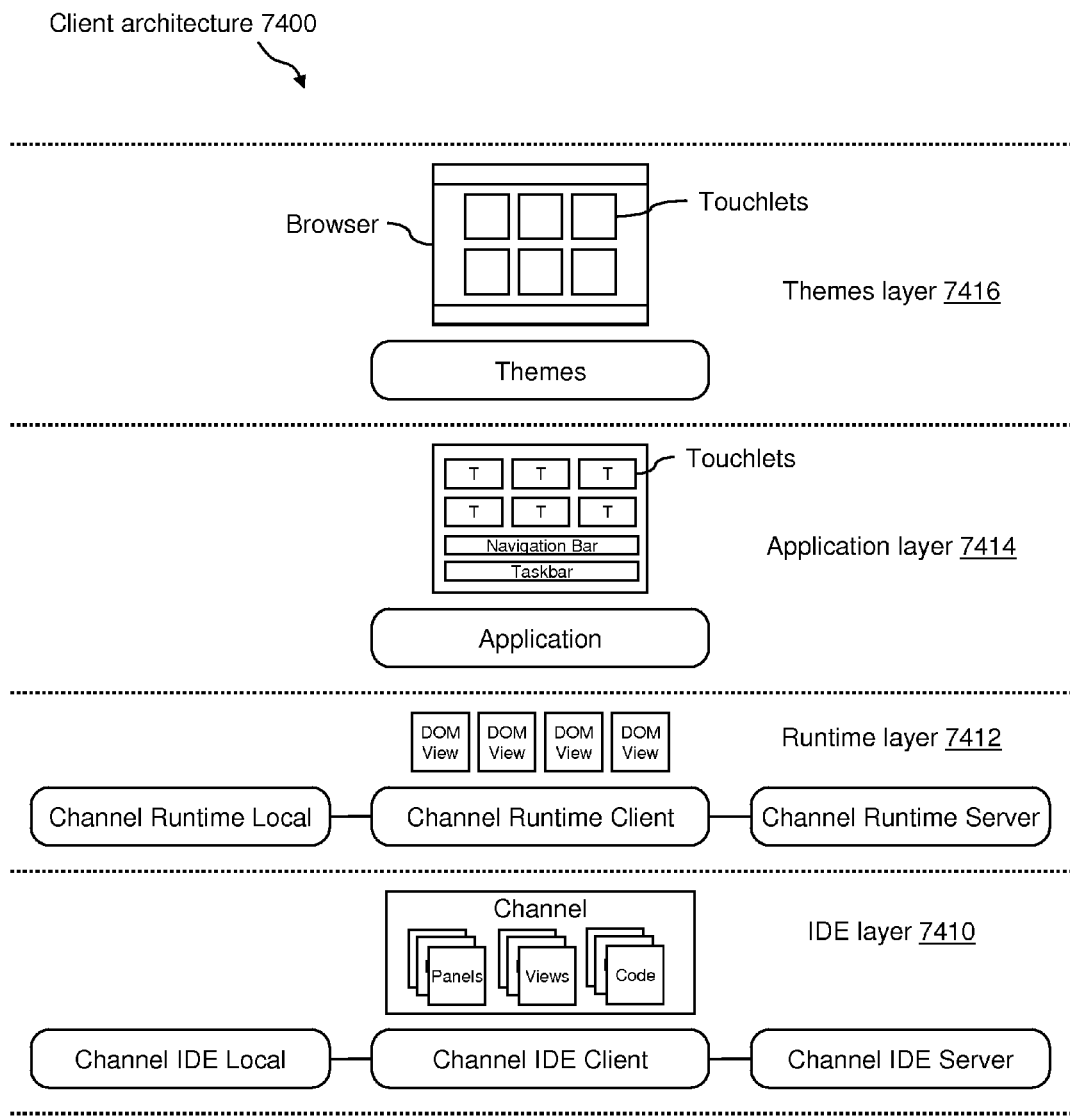
FIG. 41 illustrates a functional block diagram of an example of a client architecture of the personal information delivery application for supporting the web presentation framework, according to an exemplary embodiment.

Referring to FIG. 41, a functional block diagram of an example of client architecture 7400 of PID application 112 for supporting the web presentation framework is presented. Client architecture 7400 is another example of the application architecture of the client side of PID application 112. In this example, client architecture 7400 may include an integrated development environment (IDE) layer 7410, a runtime layer 7412, an application layer 7414, and a themes layer 7416.

IDE layer 7410 is the layer of client architecture 7400 in which developers may develop channels and/or content of PID application 112 for running in the web presentation framework. There may be a channel IDE local component, a channel IDE client component, and a channel IDE server component. Developers may use writing panels, creating panels, developing panels, views, code, and the like when developing channels and/or content.

Runtime layer 7412 provides the engine for processing the channels and/or content that is created using the IDE layer 7410. There may be a channel runtime local component, a channel runtime client component, and a channel runtime server component. There may be, for example, document object model (DOM) views in runtime layer 7412. A DOM view provides the hierarchy of a web page. With respect to the channel runtime local component and the channel IDE local component, when creating channels and/or content for information delivery system 100, a developer may, optionally, have a local copy of certain components of the server loaded and executing on his/her user device 7310. This simply provides convenience to the developer to not have to continuously access, for example, the server-side portion of PID application 112 at application server 110 when creating channels and/or content.

Application layer 7414 contains the rules for the look and feel of the PID application 112 in the browser. For example, application layer 7414 contains the rules for displaying the channel grid that contains touchlets, a taskbar, a navigation bar, and the like. Application layer 7414 processes the raw application data and organizes the data into a complete application picture for the user.

Themes layer 7416 transforms the raw application data into the actual GUI presentation in the browser to the user. For example, a theme may be a company-based theme. In one example, the theme may be the XYZ Corporation theme.

Using the web presentation framework of PID application architecture 7300 and/or client architecture 7400, a user 116 may access PID application 112 of information delivery system 100 by launching the web browser 7312 on his/her user device 7310. Then the user 116 may enter the URL address of PID application 112 (e.g., http://www.PIDapplication.com/) and perform a login process. That is, by entering the URL address of PID application 112, the user 116 is connected via HTTP to facilitation server 616, which is the HTTP server. The user 116 then enters a username and password in a login window that is presented in web browser 7312 of his/her user device 7310. During the login process, the user may be asked whether he/she is using a public or private computer. If a public computer, no information is cached on the computer. That is, once the browser is closed, no trace of the user's activity is left behind on the computer.

Once authenticated, a session begins and the user 116 may access the resources of the rest of the server stack. Web browser 7312 connects to messaging server 7316 via WSS protocol and bidirectional communication begins. Based on user identity, a certain channel grid and/or channel application is retrieved and launched in the web browser 7312 on his/her user device 7310. For example, configuration server 654 accesses the schema-less database 7318 for user configuration and preference information with regard to the user's grid, and any other information needed to render the grid. This information is passed back to the client and the grid is rendered at the web browser 7312.

Subsequently, the user 116 may access one or more channel grids to which he/she is authorized to use. The user may select a certain touchlet of a certain channel grid in web browser 7312 and interact with a certain channel within the environment of the web browser 7312. Examples of channel grids, touchlets, and/or channels that are operating in web browser 7312 per the web presentation framework are shown with reference to FIGS. 42 through 45.

Additionally, dynamic updates may occur. For example, there may be circumstances where the user's grid is updated. That is, the user himself makes a change, or some other user modifies a shared grid (e.g., adds a channel). In this example, the schema-less database 7318 may be updated with the change and the change is then pushed to the user who is running the grid in their web browser 7312. Additionally, if someone updates configuration preferences in integration and process server 646, the schema-less database 7318 is updated and the changes are also pushed to other clients that are subscribed to be notified of these changes. Changes are routed through JMS (a publish/subscribe mechanism) through facilitation server 616, which is the HTTP server, to the web browser 7312. Then, the web browser 7312 refreshes to implement the changes. In one example, if a user 116 no longer has access to certain content, that user 116 is immediately blocked from the content. In another example, if a new touchlet has been added to a channel grid, a new touchlet immediately appears on the grid in the user's web browser 7312.

In another example of performing dynamic updates, a "Stock Watch" channel (e.g., a "Stock Watch" channel 7800 of FIG. 45) uses dynamic updates to periodically push stock content to the "Stock Watch" channel at the web browser 7312. When first launched, an initial request is made for current stock data through messaging server 7316 via WSS protocol, and then via JMS protocol to the integration and process server 646, and then to the external data sources. The current stock data that has been archived in the schema-less database 7318 is transmitted back to the web browser 7312 and displayed. The integration and process server 646 is not passive, it polls the external feeds for updates, stores the latest data in the schema-less database 7318, and pushes the updates back to the subscribing clients. The updates are also published to the eventing and alerting subsystem 652 and analyzed with respect to certain events that have been set up and that are being monitored. If certain conditions are met, alert notifications are triggered.

Figure 42:
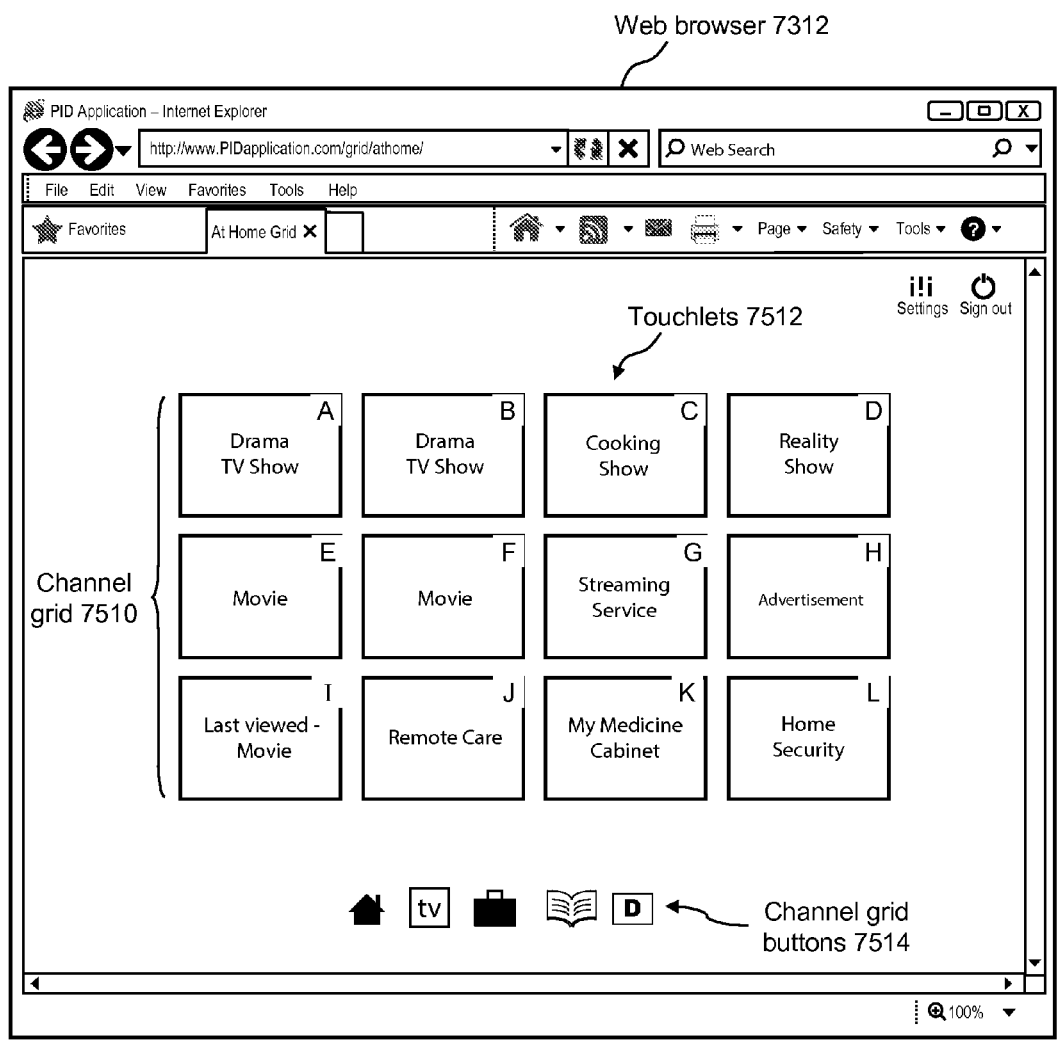
FIG. 42 illustrates a screenshot of an example of a web browser, which is running on a user device, for displaying a web page of a channel grid to the user, according to an exemplary embodiment.

Referring to FIG. 42, a screenshot of an example of a web browser 7312, which is running on a user device 7310, is presented for displaying a web page of a channel grid to the user. In this example, web browser 7312 may be a Microsoft Internet Explorer® web browser, but may be any type of browser, such as, but not limited to, a Google Chrome, Firefox, Safari, or Opera web browser. The web page that is displayed in web browser 7312 shows, for example, a channel grid 7510 that includes one or more touchlets 7512. The web page in web browser 7312 also shows a set of one or more channel grid buttons 7514 for selecting a certain channel grid to be displayed in web browser 7312. In one example, channel grid buttons 7514 may include an "At Home" channel grid button, a "My TV" channel grid button, an "At Work" channel grid button, a "Catalog" channel grid button, and a "Developer" channel grid button. In one example, when a user selects a certain channel grid button 7514, the corresponding channel grid web page is displayed in web browser 7312. The set of touchlets 7512 shown in channel grid 7510 of web browser 7312 of FIG. 42 is an example of the touchlets of the user's "At Home" channel grid, meaning the channel grid that the user is likely to use when at home. When the user 116 selects a certain touchlet 7512, the web browser 7312 is updated (i.e., refreshed) with the corresponding channel application web page.

In this example, channel grid 7510 of FIG. 42 (i.e., the user's "At Home" channel grid) includes, for example, one or more television media touchlets, such as a drama TV show touchlet 7512A, a drama TV show touchlet 7512B, a cooking show touchlet 7512C, and a reality show touchlet 7512D; one or more movie media touchlets, such as touchlet 7512E, touchlet 7512F, and a streaming service touchlet 7512G; and one or more other channel application touchlets, such as an "Advertising" touchlet 7512H, a "Last Viewed" touchlet 7512I, a "Remote Care" touchlet 7512J, a "My Medicine Cabinet" touchlet 7512K, and a "Home Security" touchlet 7512L. Each touchlet 7512 is associated with its corresponding channel application. More details of an example of a "Home Security" channel that is associated with "Home Security" touchlet 7512L and that is operating in the web presentation framework are described with reference to FIG. 43.

Figure 43:
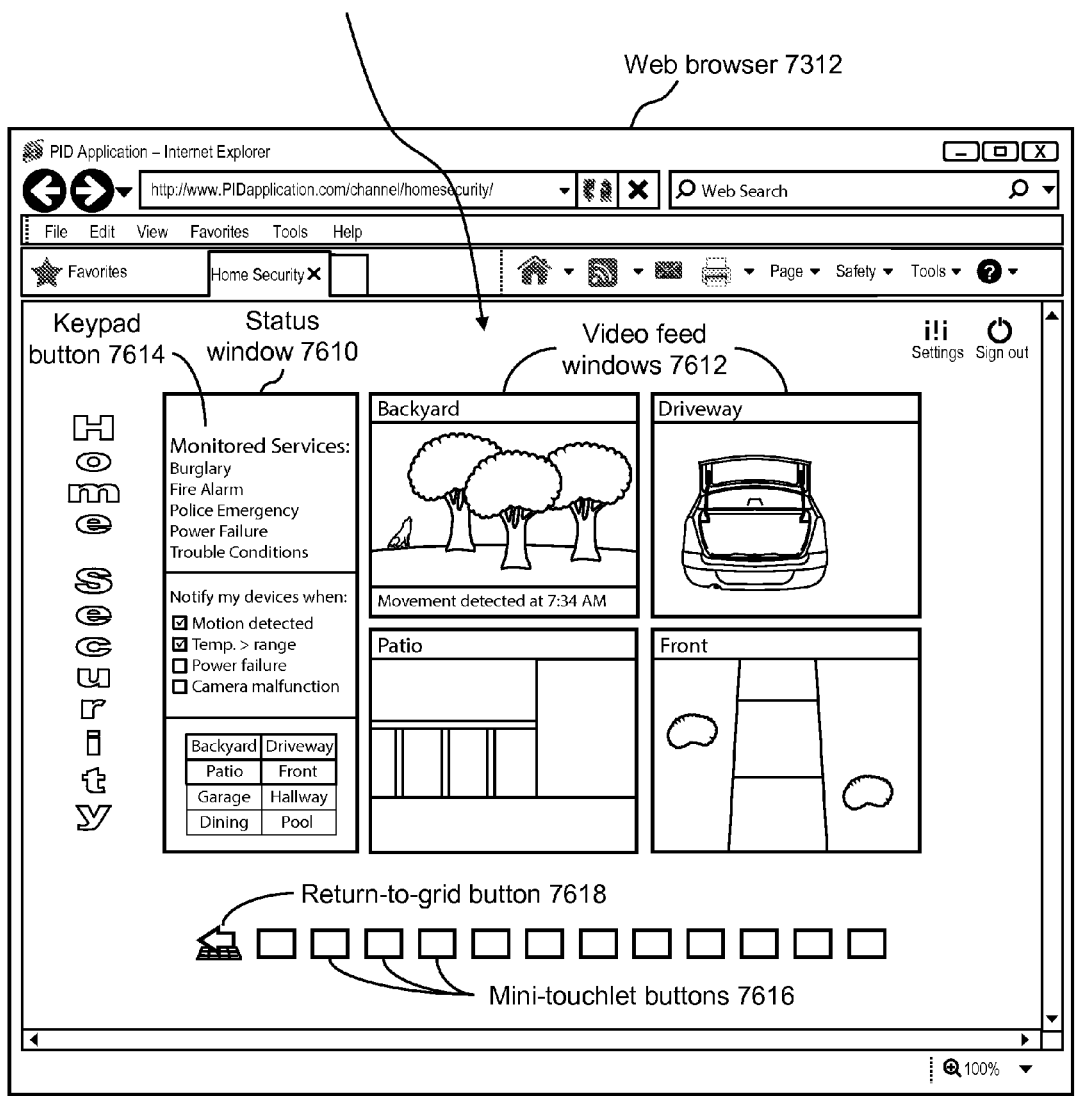
FIG. 43 illustrates a screenshot of the web browser displaying a web page of a "Home Security" channel that is operating in a substantially full-screen mode, according to an exemplary embodiment.

Referring to FIG. 43, a screenshot of web browser 7312 displaying a web page of a "Home Security" channel 7600 that is operating in a substantially full-screen mode is presented. "Home Security" channel 7600 is the channel application associated with "Home Security" touchlet 7512L of FIG. 42. "Home Security" channel 7600 provides a mechanism for monitoring and/or reporting information about the user 116's home security system. The web page of "Home Security" channel 7600 may include, for example, a status window 7610 and one or more video feed windows 7612. The status window 7610 shows in text form any alert conditions that are present as well as any useful control buttons. For example, a keypad button 7614 may be provided for launching a keypad window (not shown).

The web page of "Home Security" channel 7600 and/or of any other channel may also include a set of mini-touchlet buttons 7616 and a return-to-grid button 7618. When the user 116 selects a certain mini-touchlet button 7616, the web browser 7312 is updated (i.e., refreshed) with the web page of the corresponding channel application. Similarly, when the user 116 selects the return-to-grid button 7618, the web browser 7312 is updated (i.e., refreshed) with the channel grid web page, such as the channel grid web page shown in FIG. 42.

From the user's perspective, "Home Security" touchlet 7512L of FIG. 42 and "Home Security" channel 7600 of FIG. 43 may be substantially the same as a "Home Security" touchlet and "Home Security" channel shown to a user in a non-web-based interface. However, "Home Security" channel 7600 of FIG. 43 may be implemented using the web presentation framework, while other "Home Security" channels may be implemented using a different presentation framework, such as the Flex presentation framework.

Figure 44:
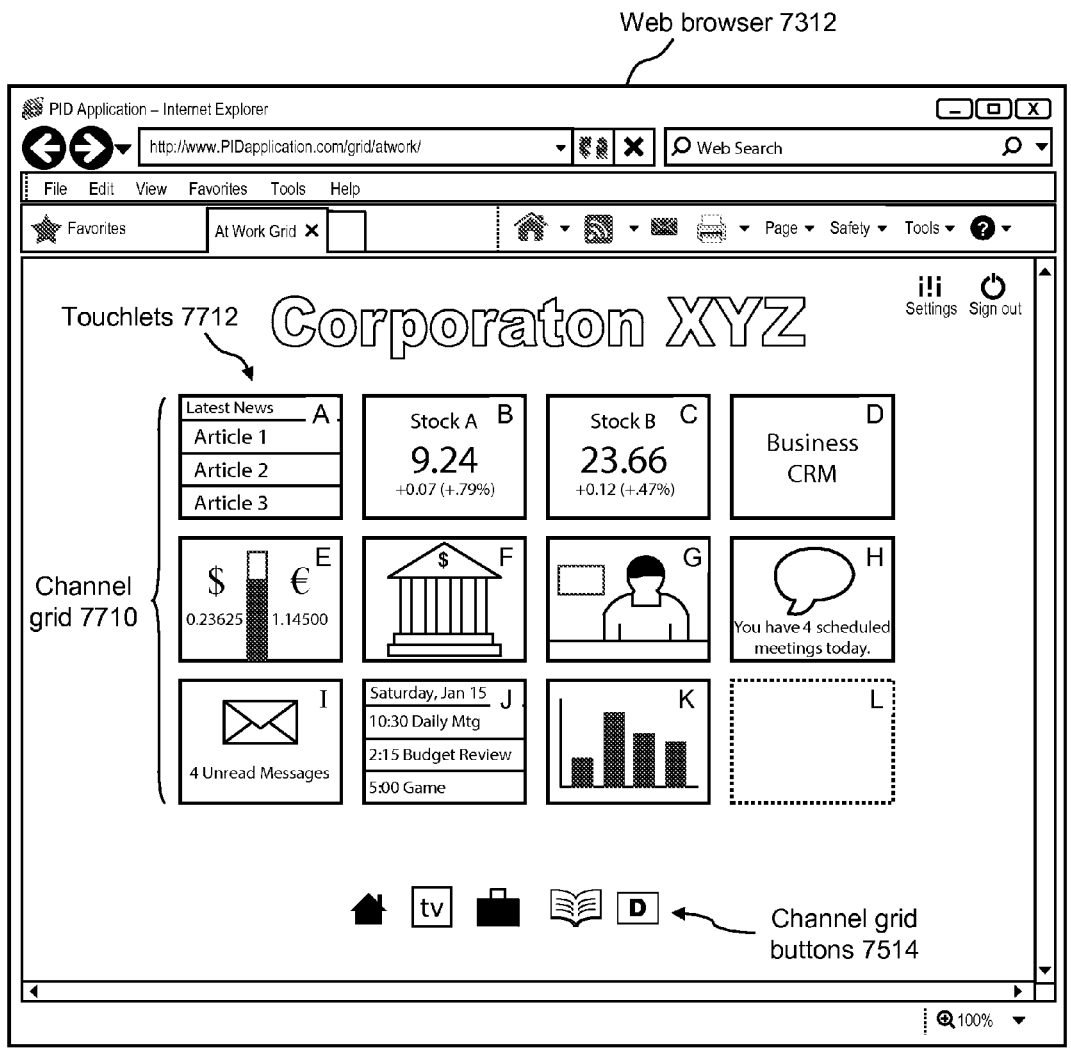
FIG. 44 illustrates another screenshot of the web browser, which is running on a user device, for displaying a web page of another channel grid to the user, according to an exemplary embodiment.

Referring to FIG. 44, another screenshot of web browser 7312, which is running on a user device 7310, is presented for displaying a web page of another channel grid to the user. In this example, the web browser 7312 displays a web page that includes the user's "At Work" channel grid. That is, a channel grid 7710 displays touchlets 7712 associated with the user's "At Work" channel grid, meaning the channel grid that the user is likely to use when at work.

In this example, channel grid 7710 of FIG. 44 (i.e., the user's "At Work" channel grid) includes, for example, a "News Reader" touchlet 7712A, a "Stock Watch" touchlet 7712B, another "Stock Watch" touchlet 7712C, a "Business CRM" touchlet 7712D, a "Currency" touchlet 7712E, a "Banking" touchlet 7712F, a "Live News" touchlet 7712G, a "Business Calendar" touchlet 7712H, an "Email" touchlet 7712I, a "Personal Calendar" touchlet 7712J, and a "Business Finance" touchlet 7712K. More details of an example of a "Stock Watch" channel that is associated with "Stock Watch" touchlet 7712B and that is operating in the web presentation framework are described with reference to FIG. 45.

Figure 45:
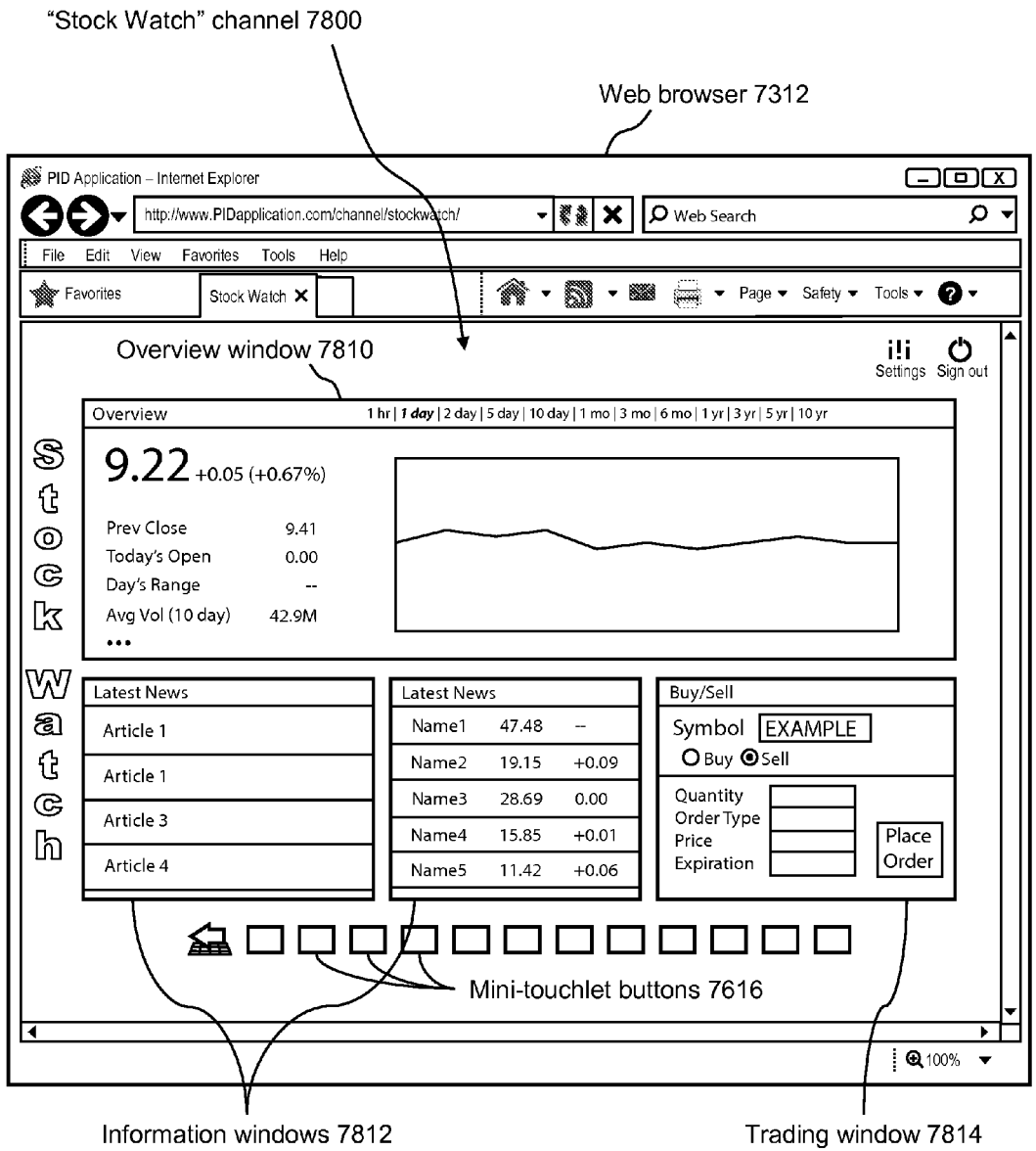
FIG. 45 illustrates a screenshot of the web browser displaying a web page of a "Stock Watch" channel that is operating in a substantially full-screen mode, according to an exemplary embodiment.

Referring to FIG. 45, a screenshot of web browser 7312 displaying a web page of a "Stock Watch" channel 7800 that is operating in a substantially full-screen mode is presented. "Stock Watch" channel 7800 is the channel application associated with "Stock Watch" touchlet 7712B of FIG. 44. "Stock Watch" channel 7800 provides a mechanism for monitoring and/or reporting certain stock and/or financial information of a company of interest. In this example, "Stock Watch" channel 7800 is monitoring an example stock (EXAMPLE). The web page of "Home Security" channel 7800 may include, for example, an overview window 7810, one or more information windows 7812, and a trading window 7814.

From the user's perspective, "Stock Watch" touchlet 7712B of FIG. 44 and "Stock Watch" channel 7800 of FIG. 45 may be substantially the same as a "Stock Watch" touchlet and "Stock Watch" channel shown to a user in a non-web-based interface. However, "Stock Watch" channel 7800 of FIG. 45 may be implemented using the web presentation framework, while other "Stock Watch" channels may be implemented using a different presentation framework, such as the Flex presentation framework.

Referring to FIGS. 40 through 45, from the user's perspective, while implemented using the web presentation framework, the operations of channel grid 7510 and touchlets 7512 (and the underlying channel applications) of FIG. 42 and of channel grid 7710 and touchlets 7712 (and the underlying channel applications) of FIG. 44 are substantially the same as channel grids, touchlets, and channels that are implemented using the Flex presentation framework. For example, a web page is designed to display channel grid 7510 that contains one or more touchlets 7512 in web browser 7312. Each touchlet 7512 may be used for presenting dynamic information of, interacting with, and/or launching its underlying channel application. Once launched, a substantially full-screen view of the channel is presented via a web page in web browser 7312.

Additionally, eventing and alerting functions may occur in the web presentation framework of information delivery system 100. Further, both consumer and enterprise scenarios may be implemented using the web presentation framework. Further still, the web presentation framework of information delivery system 100 supports a channel/content developer environment in which developers may create channels/content using HTML5, JavaScript, and Cascading Style Sheets (CSS), such as CSS3.

Flex Presentation Framework Vs. Web Presentation Framework

Referring again to FIGS. 1 through 11, in the Flex presentation framework embodiment of information delivery system 100, the user device 118 is the "client" in the client-server system architecture. As a result, a client portion of PID application 112 must be installed on each user device 118.

Referring again to FIGS. 40 and 41, in the web presentation framework embodiment of information delivery system 100, the web browser (e.g., web browser 7312) is the "client" in the client-server system architecture. As a result, a web browser application must be installed on each user device 7310.

Referring again to FIGS. 1 through 11, when developing channels and/or content for the Flex presentation framework embodiment of information delivery system 100, developers are writing applications (i.e., channels and/or content) that are compiled into an executable. Because of this, developers are (1) limited to the APIs that are exposed through Adobe proprietary software; (2) able to easily distribute an application with little more than a double-click install; and (3) able to control the precise look and feel of the application with minimal effort at production time.

Referring again to FIGS. 40 and 41, when developing channels and/or content for the web presentation framework embodiment of information delivery system 100, developers are writing applications (i.e., channels and/or content) that is interpreted by the browser. Because of this, developers are (1) able to build a full scale web application with nothing more than a text editor (and a browser); (2) required to test applications in all supported browsers; and (3) unrestricted by a third party feature release schedule (except as it pertains to standards implementation). Additionally, because there is no compilation step, HTML/JavaScript/CSS is quick and easy to create/edit on the fly.

Referring again to FIGS. 1 through 11, when developing channels and/or content for the Flex presentation framework embodiment of information delivery system 100, such as when using Adobe's RIA development tool, there are, for example, three ways to build an application: (1) a web-based application that is meant for distributing over HTTP; (2) an Adobe AIR-based application, which is an application that runs on the desktop; and (3) a mobile application, which is an application meant to be used in a mobile device (e.g., smart phone, tablet). The development process for these three is more or less the same. However, the developer must choose which of these "project types" to use before building the application. Although, there may be ways to convert a web-based application into an Adobe AIR-based application.

Referring again to FIGS. 40 and 41, when developing channels and/or content for the web presentation framework embodiment of information delivery system 100, such as when using HTML5, JavaScript, and CSS, developers have only one choice for distribution of the application, which is the web. Therefore, the application must be interpreted by a web browser application in order to be used.

Referring again to FIGS. 1 through 11, the Flex presentation framework embodiment of information delivery system 100, provides the capability to access any information that is exposed at the device level (e.g., to determine the presence of a camera, microphone, speaker, etc). Accordingly, channels and/or content may make use of this device level information.

Referring again to FIGS. 40 and 41, currently HTML5 does not provide the ability to interrogate the client device with respect to device level information (e.g., to determine the presence of a camera, microphone, speaker, etc). The HTML5 specification is not yet certified, therefore its full functionality is still to be determined. Therefore, in the web presentation framework embodiment of information delivery system 100, native applications may be written (using native code) to run on any user device 7310. For example, in order to use a camera that is present on a certain user device 7310 for a web-conferencing application, a native application may be written to activate the camera of the certain type, brand, and/or model of device. The web presentation framework of PID application 112 of information delivery system 100 can use HTML5 to interact with the native application at the user device 7310. In this example, a camera touchlet of a channel grid may be used for presenting dynamic information of, interacting with, and/or launching its underlying camera channel application (or any channel application using the camera), which may be used to interact with the native camera application.

Further, with respect to the various examples of channel grids, touchlets, and channels (e.g., shown in FIGS. 12 through 39) and that are depicted using the Flex presentation framework of information delivery system 100, those skilled in the art will recognize that these examples may also be implemented using the web presentation framework of information delivery system 100.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments disclosed herein are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the disclosure can be implemented in any of numerous ways. For example, some embodiments may be implemented via one or more controllers, which may employ hardware, software or a combination thereof. In some embodiments discussed herein, one or more controllers may be implemented, at least in part, as a state machine.

When any aspect of an embodiment is implemented at least in part in software, the software code can be executed on any suitable processor or collection of processors, whether provided in a single device or computer or distributed among multiple devices/computers.

In this respect, various aspects of the disclosure, may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for providing advertising information relating to a media program, the apparatus comprising:
    at least one communication interface;
    a memory configured to store processor-executable instructions; and
    at least one processing unit communicatively coupled to the memory and the at least one communication interface, wherein upon execution of the processor-executable instructions, the at least one processing unit is configured to:
    A) determine that the media program is currently being presented using a first user viewing device that is communicatively coupled to the at least one communication interface; and
    B) transmit an ad programming signal to a second user viewing device communicatively coupled to the at least one communication interface, so as to configure the second user viewing device to present at least one first advertisement while the media program is being presented on the first user viewing device;
    wherein the ad programming signal transmitted from the at least one processing unit to the second user viewing device represents an interactive advertisement, and wherein, responsive to receiving the signal, the second user viewing device is configured to present the at least one first advertisement as an interactive advertisement;
    wherein the at least one processing circuit is further configured to receive data from the second user viewing device relating to the interaction of a user of the second user viewing device with the interactive advertisement; and
    wherein the interaction of the user with the interactive advertisement is a single tap or click, and wherein the at least one processing unit is configured to:
    receive an input signal indicating the single tap or click by the user;
    determine, based on options provided by the user and stored in a user profile, whether an advertiser associated with the interactive advertisement is eligible to receive one or more information elements from the user profile; and
    provide the one or more information elements from the user profile to the advertiser in response to the single tap or click of the user without requiring further input from the user after the single tap or click to provide the one or more information elements when it is determined that the advertiser is eligible to receive the one or more information elements.

2. The apparatus of claim 1, wherein the ad programming signal is based on a context of the media program currently being presented.

3. The apparatus of claim 2, wherein the context comprises one or more characteristics of the media program.

4. The apparatus of claim 3, wherein a product or service to which the at least one first advertisement is directed is based on a subject matter of the media program.

5. The apparatus of claim 2, wherein the context comprises one or more characteristics of a second advertisement included within the media program presented on the first user viewing device.

6. The apparatus of claim 5, wherein a first product or service to which the at least one first advertisement presented on the second user viewing device is directed is based on a second product or service to which the second advertisement included within the media program presented on the first user viewing device is directed.

7. The apparatus of claim 6, wherein the first product or service is the same as the second product or service.

8. The apparatus of claim 6, wherein the first product or service and the second product or service are associated with a same brand.

9. The apparatus of claim 6, wherein the first product or service and the second product or service are produced by a same entity.

10. The apparatus of claim 6, wherein:
the second advertisement included within the media program is a national advertisement; and
the at least one first advertisement presented on the second user viewing device is a local advertisement related to content of the national advertisement.

11. The apparatus of claim 1, wherein the ad programming signal is based on a current time context.

12. The apparatus of claim 1, wherein the ad programming signal is based on a geographic location of at least one of the first user viewing device or the second user viewing device.

13. The apparatus of claim 1, wherein the ad programming signal is based on a user profile for a user of at least one of the first user viewing device or the second user viewing device.

14. The apparatus of claim 13, wherein the user profile comprises demographic data associated with the user.

15. The apparatus of claim 13, wherein the user profile comprises historical data relating to an interaction of the user with previously presented advertisements.

16. The apparatus of claim 13, wherein the at least one processing unit is configured to determine one or more user information elements of the user profile to which an advertiser is permitted access and to generate the ad programming signal to be transmitted to the second user viewing device based on the determined one or more user information elements.

17. The apparatus of claim 16, wherein the at least one processing unit is configured to receive user selectable privacy options from at least one of the first user viewing device and the second user viewing device, and wherein the at least one processing unit is configured to determine the one or more user information elements of the user profile to which the advertiser is permitted access based at least in part on the user selectable privacy options.

18. The apparatus of claim 17, wherein the user selectable privacy options comprise at least one of:
one or more types of user information elements to which one or more advertisers may be permitted access, wherein the one or more types of user information elements comprise at least one of a name of the user, an age of the user, a gender of the user, a geographic location of the user, a mailing address of the user, an email address of the user, a telephone number of the user, financial data associated with the user, and data regarding family members or contacts of the user; and
one or more classes of advertisers that may be permitted access to user information elements in the user profile.

19. The apparatus of claim 1, further comprising the first user viewing device, wherein the first user viewing device comprises a television set or a set top box.

20. The apparatus of claim 1 further comprising the second user viewing device, wherein the second user viewing device comprises a mobile computing device.

21. The apparatus of claim 20, wherein the second user viewing device comprises a tablet device, a smartphone, or a laptop computer.

22. The apparatus of claim 1, wherein the at least one processing unit is further configured to:
receive a control command from the second user viewing device, wherein the control command comprises one of a play command, pause command, fast forward command, rewind command, increase volume command, decrease volume command, mute command, channel change command, and first user viewing device on/off command, and
transmit a control signal to the first user viewing device based on the control command, wherein, responsive to receiving the control signal, the first user viewing device is configured to alter the presentation of the media program based on the control signal.

23. The apparatus of claim 1, wherein the ad programming signal further represents information relating to the media program, and wherein, responsive to receiving the ad programming signal, the second user viewing device is configured to present both the at least one first advertisement and the information relating to the media program.

24. The apparatus of claim 1, wherein the at least one processing unit is configured to:
receive a signal from the second user viewing device representing a user selection of an option to display the media program on the second user viewing device, and
responsive to receiving the signal from the second user viewing device, transmit display data to the second user viewing device based on the media program, wherein, responsive to receiving the display data, the second user viewing device is configured to present the media program in substantial synchronization with the presentation of the media program on the first user viewing device.

25. The apparatus of claim 1, wherein the at least one processing unit is configured to:
receive a signal from the second user viewing device representing a user selection of an option to swap display images between the first user viewing device and the second user viewing device, and
responsive to receiving the signal from the second user viewing device, transmit first display data to the first user viewing device and second display data to the second user viewing device,
wherein, responsive to receiving the first display data, the first user viewing device is configured to display a first display image that is based on a display image that was displayed on the second user viewing device immediately prior to receipt of the signal by the at least one processing unit, and
wherein, responsive to receiving the second display data, the second user viewing device is configured to display a second display image that is based on a display image that was displayed on the first user viewing device immediately prior to receipt of the signal by the at least one processing unit.

26. The apparatus of claim 25, wherein the at least one processing unit is further configured to perform at least one of the following:
generate the first display data based on a first device type of the first user viewing device, so as to reconfigure the display image previously displayed on the second user viewing device based on the first device type, and
generate the second display data based on a second device type of the second user viewing device, so as to reconfigure the display image previously displayed on the first user viewing device based on the second device type.

27. The apparatus of claim 25, wherein the first display data represents a video chat interface.

28. The apparatus of claim 1, wherein the interactive advertisement includes a link to a website that is selectable by the user of the second user viewing device to present the website on the second user viewing device, and wherein the data received by the at least one processing unit from the second user viewing device comprises an indication that the user selected the link.

29. The apparatus of claim 1, wherein the interactive advertisement comprises a game that is playable by the user of the second user viewing device.

30. The apparatus of claim 1, wherein the at least one first advertisement presented on the second user viewing device comprises at least one of a discount on merchandise or services and rewards points associated with a customer profile of a user of the second user viewing device.

31. In a system comprising a server computing device, a first user viewing device communicatively coupled to the server computing device, and a second user viewing device communicatively coupled to the server computing device, a method of providing advertising information relating to a media program, the method comprising:
    A) determining, at the server computing device, that the media program is currently being presented using the first user viewing device; and
    B) transmitting, from the server computing device, an ad programming signal to the second user viewing device, wherein, responsive to receiving the ad programming signal, the second user viewing device is configured to present at least one first advertisement while the media program is being presented on the first user viewing device;
    wherein the ad programming signal transmitted from the server device to the second user viewing device represents an interactive advertisement, and wherein, responsive to receiving the signal, the second user viewing device is configured to present the at least one first advertisement as an interactive advertisement;
    wherein the method further comprises receiving data from the second user viewing device relating to the interaction of a user of the second user viewing device with the interactive advertisement;
    wherein the interaction of the user with the interactive advertisement is a single tap or click; and
    wherein the method further comprises:
        receiving an input signal indicating the single tap or click by the user;
        determining, based on options provided by the user and stored in a user profile, whether an advertiser associated with the interactive advertisement is eligible to receive one or more information elements from the user profile; and
        providing the one or more information elements from a user profile stored in a memory operably coupled to the server computing device to the advertiser in response to the single tap or click of the user without requiring further input from the user after the single tap or click to provide the one or more information elements when it is determined that the advertiser is eligible to receive the one or more information elements.

32. At least one non-transitory computer-readable storage medium encoded with processor-executable instructions that, when executed by at least one processing unit, perform a method of providing advertising information relating to a media program, the method comprising:
    A) determining that the media program is currently being presented using a first user viewing device; and
    B) transmitting an ad programming signal to a second user viewing device, wherein, responsive to receiving the ad programming signal, the second user viewing device is configured to present at least one first advertisement while the media program is being presented on the first user viewing device;
    wherein the ad programming signal transmitted to the second user viewing device represents an interactive advertisement, and wherein, responsive to receiving the signal, the second user viewing device is configured to present the at least one first advertisement as an interactive advertisement;
    wherein the method further comprises receiving data from the second user viewing device relating to the interaction of a user of the second user viewing device with the interactive advertisement;
    wherein the interaction of the user with the interactive advertisement is a single tap or click; and
    wherein the method further comprises:
        receiving an input signal indicating the single tap or click by the user;
        determining, based on options provided by the user and stored in a user profile, whether an advertiser associated with the interactive advertisement is eligible to receive one or more information elements from the user profile; and
        providing the one or more information elements from a user profile to the advertiser in response to the single tap or click of the user without requiring further input from the user after the single tap or click to provide the one or more information elements when it is determined that the advertiser is eligible to receive the one or more information elements.

33. The apparatus of claim 1, wherein the one or more information elements from the user profile provided in response to the single tap or click of the user are configured to cause the advertiser to complete a deal with the user without requiring further input from the user after the single tap or click to complete the deal.

34. The apparatus of claim 33, wherein the one or more information elements from the user profile provided in response to the single tap or click of the user are configured to cause the advertiser to complete a purchase of a product by the user without requiring further input from the user after the single tap or click to complete the purchase of the product.

35. The apparatus of claim 1, wherein the one or more information elements from the user profile provided in response to the single tap or click of the user are configured to cause the advertiser to provide the user with a reward without requiring further input from the user after the single tap or click for the user to receive the reward.

36. The apparatus of claim 1, wherein the at least one processing unit is further configured to:
    determine, based on the options stored in the user profile, one or more restricted information elements that the user has disallowed disclosing to at least one category of advertisers;
    determine whether the at least one category of advertisers includes the advertiser associated with the interactive advertisement; and
    exclude the restricted information elements from the one or more information elements provided to the advertiser when the at least one category of advertisers includes the advertiser.

37. The apparatus of claim 1, wherein the at least one processing unit is further configured to:
    determine, based on the options stored in the user profile, a category of advertisers for which the user must grant permission before at least one of the one or more information elements can be provided to an advertiser included in the category of advertisers;
    determine whether the category of advertisers includes the advertiser associated with the interactive advertisement;

when the category of advertisers does not include the advertiser, provide the one or more information elements to the advertiser without requiring further input from the user; and when the category of advertisers includes the advertiser:
   prompting the user to provide an indication of whether the at least one information element should be provided to the advertiser; and
   providing the at least one information element to the advertiser in response to receiving an indication from the user that the at least one information element should be provided to the advertiser.

* * * * *